US010676615B2

(12) United States Patent
Semba et al.

(10) Patent No.: US 10,676,615 B2
(45) Date of Patent: Jun. 9, 2020

(54) FIBER-REINFORCED RESIN COMPOSITION COMPRISING CHEMICALLY MODIFIED CELLULOSE NANOFIBERS AND THERMOPLASTIC RESIN

(71) Applicants: Kyoto University, Kyoto (JP);
KYOTO MUNICIPAL INSTITUTE OF INDUSTRIAL TECHNOLOGY AND CULTURE, Kyoto (JP);
NIPPON PAPER INDUSTRIES CO., LTD., Tokyo (JP)

(72) Inventors: Takeshi Semba, Kyoto (JP); Akihiro Ito, Kyoto (JP); Takahiro Uesaka, Kyoto (JP); Kazuo Kitagawa, Kyoto (JP); Fumiaki Nakatsubo, Kyoto (JP); Hiroyuki Yano, Kyoto (JP)

(73) Assignees: Kyoto University, Kyoto (JP);
KYOTO MUNICIPAL INSTITUTE OF INDUSTRIAL TECHNOLOGY AND CULTURE, Kyoto (JP);
NIPPON PAPER INDUSTRIES CO., LTD., Tokyo (JP)

( * ) Notice: Subject to any disclaimer, the term of this patent is extended or adjusted under 35 U.S.C. 154(b) by 20 days.

(21) Appl. No.: 15/556,220

(22) PCT Filed: Mar. 17, 2016

(86) PCT No.: PCT/JP2016/058481
§ 371 (c)(1),
(2) Date: Oct. 20, 2017

(87) PCT Pub. No.: WO2016/148233
PCT Pub. Date: Sep. 22, 2016

(65) Prior Publication Data
US 2018/0037737 A1 Feb. 8, 2018

(30) Foreign Application Priority Data

Mar. 19, 2015 (JP) .................................. 2015-056278
Dec. 9, 2015 (JP) .................................. 2015-240084

(51) Int. Cl.
*C08L 77/02* (2006.01)
*C08L 1/08* (2006.01)
(Continued)

(52) U.S. Cl.
CPC ................ *C08L 77/02* (2013.01); *C08B 3/06* (2013.01); *C08B 3/20* (2013.01); *C08J 5/045* (2013.01);
(Continued)

(58) Field of Classification Search
CPC .......... C08L 77/02; C08L 23/06; C08L 23/12; C08L 25/06; C08L 51/06; C08L 55/02;
(Continued)

(56) References Cited

U.S. PATENT DOCUMENTS 5,322,901 A * 6/1994 Kato ....................... B29C 35/08
428/34.9
2008/0118765 A1* 5/2008 Dorgan ................... B82Y 30/00
428/532

(Continued)

FOREIGN PATENT DOCUMENTS

EP          2554588 A1      2/2013
JP       2012-214563       11/2012
(Continued)

OTHER PUBLICATIONS

Mindaugas Bulota, et al. "Acetylated Microfibrillated Cellulose as a Toughening Agent in Poly(lactic acid)," 126 J. Applied Polymer Sci. E448 (2012). (Year: 2012).*

(Continued)

*Primary Examiner* — Nicholas E Hill
(74) *Attorney, Agent, or Firm* — Cesari and McKenna, LLP

(57) ABSTRACT

An object of the present invention is to provide a fiber-reinforced resin composition in which fibers with good (Continued)

dispersibility and a resin in which the fibers are easily dispersed have been suitably composited; and a method for producing the fiber-reinforced resin composition. Specifically, the object is to provide a fiber-reinforced resin composition that comprises chemically modified CNFs and a thermoplastic resin, and that has improved physical properties due to the suitable compositing of the fibers with the resin; and a method for producing the fiber-reinforced resin composition. The fiber-reinforced resin composition comprises chemically modified CNFs (A) and a thermoplastic resin (B), wherein the chemically modified CNFs and the thermoplastic resin satisfy the following conditions: (a) the ratio R of the solubility parameter ($SP_{cnf}$) of the chemically modified CNFs (A) to the solubility parameter ($SP_{pol}$) of the thermoplastic resin (B), $SP_{cnf}/SP_{pol}$, is in the range of 0.87 to 1.88; and (b) the chemically modified CNFs (A) have a degree of crystallinity of 42.7% or higher.

10 Claims, 9 Drawing Sheets

(51) Int. Cl.
| | |
|---|---|
| C08L 101/00 | (2006.01) |
| C08L 23/12 | (2006.01) |
| C08L 67/04 | (2006.01) |
| C08J 5/04 | (2006.01) |
| C08B 3/06 | (2006.01) |
| C08B 3/20 | (2006.01) |
| C08L 23/06 | (2006.01) |
| C08L 25/06 | (2006.01) |
| C08L 51/06 | (2006.01) |
| C08L 55/02 | (2006.01) |
| C08L 59/02 | (2006.01) |
| B82Y 30/00 | (2011.01) |

(52) U.S. Cl.
CPC ............... *C08L 1/08* (2013.01); *C08L 23/06* (2013.01); *C08L 23/12* (2013.01); *C08L 25/06* (2013.01); *C08L 51/06* (2013.01); *C08L 55/02* (2013.01); *C08L 59/02* (2013.01); *C08L 67/04* (2013.01); *C08L 101/00* (2013.01); *B82Y 30/00* (2013.01); *C08L 2205/06* (2013.01); *C08L 2205/16* (2013.01)

(58) Field of Classification Search
CPC . C08L 59/02; C08L 67/04; C08L 1/08; C08B 3/06; C08B 3/20; B82Y 30/00
See application file for complete search history.

(56) References Cited

U.S. PATENT DOCUMENTS

| | | |
|---|---|---|
| 2012/0214911 A1 | 8/2012 | Yano et al. |
| 2012/0328877 A1 | 12/2012 | Shiramizu et al. |
| 2014/0073722 A1* | 3/2014 | Shiramizu ............... C08B 3/06 524/35 |
| 2014/0073776 A1 | 3/2014 | Shiramizu et al. |
| 2015/0031804 A1 | 1/2015 | Shiramizu et al. |
| 2015/0376298 A1 | 12/2015 | Fumiaki et al. |
| 2016/0168272 A1* | 6/2016 | Retsina ................... C08B 15/02 162/9 |

FOREIGN PATENT DOCUMENTS

| | | |
|---|---|---|
| JP | 2013-166818 | 8/2013 |
| JP | 2016-169382 A | 9/2016 |
| WO | WO 2011/049162 | 4/2011 |
| WO | WO 2011/108461 | 9/2011 |
| WO | WO 2013/031391 | 3/2013 |
| WO | WO 2013/031444 | 3/2013 |
| WO | WO 2013/133436 | 9/2013 |
| WO | WO 2014/054779 | 4/2014 |
| WO | WO 2014/119745 | 8/2014 |

OTHER PUBLICATIONS

S. Panthapulakkal & M. Sain, "Preparation and Characterization of Cellulose Nanofibril Films from Wood Fibre and Their Thermoplastic Polycarbonate Composites," Int'l J. Polymer Sci., Article ID 381342, 6 pages (2012). (Year: 2012).*
D. J. David & T. F. Sincock, "Estimation of Miscibility of Polymer Blends Using the Solubility Parameter Concept," 33 Polymer 4505 (1992).*
Ana Carolina Correa et al., "Obtaining Nanocomposites of Polyamide 6 and Cellulose Whiskers Via Extrusion and Injection Molding," 21 Cellulose 311 (2014).*
Extended European Search Report issued to European counterpart Application No. 16 765 062.1 by the EPO dated Nov. 15, 2018.
Fedors, "A Method for Estimating Both the Solubility Parameters and Molar Volumes of Liquids", Polymer Engineering and Science, Feb. 1974, vol. 14, No. 2, pp. 147-154.
New Energy and Industrial Technology Development Organization, Green Sustainable Chemical Process Kiban Gijutsu Kaihatsu, Heisei 22 Nendo to Heisei 24 Nendo Seika Hokoku, 2013, pp. 1-84.
Kitano et al "Reinforcement of Polypropylene (PP) Resin with Chemically Modified Cellulose Nanofibers (CNF)" 64th Annual Meeting of the Japan Wood Research Society, p. Z14-01-1405, 2014.
Nakatsubo "Strategy for Chemical Modification of Cellulose Nanofibers" Dai 220 Kai Seizonken Symposium, Dai 9 Kai Bio Zairyo Project, pp. 1-7, 2013.
Sato et al "Development of Modified CNF-Reinforced Resin Materials" Dai 170 Kai Seizonken Symposium, Dai 6 Kai Bio Zairyo Project, pp. 1-4, 2011.
Watanabe et al "Creation of Thermoplastic Nanocomposites Using Wood Cell Wall Nanostructure" 64th Annual Meeting of the Japan Wood Research Society, p. Z14-01-1100, 2014.
Office Action dated Oct. 8, 2019 in Corresponding Japanese Patent Application No. 2016-208783.

* cited by examiner

FIBER-REINFORCED RESIN COMPOSITION COMPRISING CHEMICALLY MODIFIED CELLULOSE NANOFIBERS AND THERMOPLASTIC RESIN

This application is the National Stage of International Application No. PCT/JP2016/058481, filed on Mar. 17, 2016, which claims the benefit of Japanese Application No. 2015-056,278, filed on Mar. 19, 2015 and Japanese Application No. 2015-240,084, filed on Dec. 9, 2015. The contents of all prior applications are hereby incorporated by reference in their entirety.

TECHNICAL FIELD

The present invention relates to a fiber-reinforced resin composition comprising chemically modified cellulose nanofibers and a thermoplastic resin.

BACKGROUND ART

Plant fibers are as light as about ⅕ the weight of steel and at least about five times stronger than steel, with a linear thermal expansion coefficient as low as ¹⁄₅₀ the linear thermal expansion coefficient of glass.

A technique of producing microfibrillated plant fibers (MFC) by mechanically or chemically defibrating plant fibers is known. MFC is a fiber having a fiber diameter of about 100 nm, a fiber length of about 5 μm or more, and a specific surface area of 250 m²/g. MFC is stronger than undefibrated plant fibers.

However, cellulose contained in plant fibers has three hydroxyl groups per repeating unit in the molecule, and cellulose as the entire plant fiber contains many hydroxyl groups. As a result, cellulose has strong intermolecular cohesion due to hydrogen bonding.

To obtain a plant fiber composite material by compositing plant fibers or MFC with a resin, a technique of fully dispersing plant fibers or MFC in a resin is known. Patent Literature (PTL) 1 discloses a composition comprising a polymeric compound having a primary amino group, a polymeric compound modified with maleic anhydride, microfibrillated plant fibers, and a polyolefin.

PTL 2 discloses a resin composition comprising modified microfibrillated plant fibers esterified with alkyl succinic anhydride and a thermoplastic resin. PTL 3 discloses a dispersion comprising cellulose nanofibers (CNF), a thermoplastic resin, a nonionic surfactant, and a resin composition formed using this dispersion.

In this way, fiber-reinforced composite resin compositions devised to disperse fine cellulose fibers in the resin and reinforced by fine cellulose fibers are disclosed. To obtain an improved fiber-reinforced resin composition, a suitable combination of satisfactorily dispersible fibers and a resin in which the fibers are easily dispersed is necessary.

CITATION LIST

Patent Literature

PTL 1: WO2011/049162A1
PTL 2: JP2012-214563A
PTL 3: JP2013-166818A

SUMMARY OF INVENTION

Technical Problem

An object of the present invention is to provide a fiber-reinforced resin composition comprising a composite of fibers having good dispersibility with a resin in which the fibers are easily dispersed; and a method for producing the fiber-reinforced resin composition.

More specifically, the object is to provide a fiber-reinforced resin composition that comprises chemically modified CNFs and a thermoplastic resin, and that has improved physical properties due to the suitable compositing of the fibers with the resin; and a method for producing the fiber-reinforced resin composition.

Solution to Problem

The present inventors conducted extensive research on a fiber-reinforced resin composition comprising chemically modified cellulose nanofibers and a thermoplastic resin.

As a result, the inventors found that when chemically modified CNFs having a specific solubility parameter (SP) value (hereinafter referred to as "SP value") and a specific crystallinity are suitably combined with a resin having a specific SP value, a fiber-reinforced resin composition that has an excellent dispersibility of chemically modified CNFs in the resin and that has improved physical properties can be obtained. The present invention has been accomplished based on this finding.

The term "cellulose nanofibers" as used herein refers to nanofibers composed of cellulose (cellulose nanofibers) and/or nanofibers composed of lignocellulose (lignocellulose nanofibers), which are also collectively referred to as "CNFs."

The term "CNFs" may be interchangeably used with microfibrillated cellulose fibers and/or microfibrillated lignocelluloses.

The "chemically modified cellulose nanofibers" refer to chemically modified CNFs and/or chemically modified ligno CNF, which are also collectively referred to as "chemically modified CNFs."

A feature of the chemically modified CNFs dispersed in the resin composition of the present invention is that one or more hydrogen atoms of hydroxyl groups in sugar chains constituting cellulose are substituted with alkanoyl, such as acetyl (that is, hydroxyl groups are chemically modified), to block hydroxyl groups of cellulose molecules and thereby suppress the hydrogen bonding force of cellulose molecules; and also maintain the crystal structure intrinsic to cellulose fibers in a specific proportion.

Another feature of the present invention is a combination (compositing) of such chemically modified CNFs with a resin having a specific SP value.

The above features of the present invention are based on the following findings: the SP values and crystallinity inherent in cellulose fibers and/or lignocellulose can be controlled by changing the degree of chemical modification (e.g., by substitution with acetyl or the like) of hydroxyl groups present in sugar chains on the surface of cellulose fibers or lignocellulose fibers; and chemically modified CNFs having a SP value and crystallinity controlled in this manner has enhanced compatibility with a resin by cellulose having a specific SP value.

The present invention provides the following fiber-reinforced resin compositions comprising chemically modified CNFs and a thermoplastic resin, and methods for producing the composition.

Item 1.

A fiber-reinforced resin composition comprising chemically modified cellulose nanofibers (A) and a thermoplastic resin (B), wherein the chemically modified cellulose nanofibers and the thermoplastic resin satisfy the following conditions:

(a) the ratio R of the solubility parameter ($SP_{cnf}$) of the chemically modified cellulose nanofibers (A) to the solubility parameter ($SP_{pol}$) of the thermoplastic resin (B) ($SP_{cnf}/SP_{pol}$) is in the range of 0.87 to 1.88; and (b) the chemically modified cellulose nanofibers (A) have a crystallinity of 42.7% or more.

Item 2.

The fiber-reinforced resin composition according to Item 1, wherein the ratio R ($SP_{cnf}/SP_{pol}$) in the condition (a) is in the range of 1.03 to 1.88.

Item 3.

The fiber-reinforced resin composition according to Item 1 or 2, wherein the crystallinity of the chemically modified cellulose nanofibers in the condition (b) is 55.6% or more.

Item 4.

The fiber-reinforced resin composition according to any one of Items 1 to 3, wherein the chemically modified cellulose nanofibers (A) are cellulose nanofibers wherein one or more hydroxyl groups in sugar chains constituting the cellulose nanofibers are modified with alkanoyl.

Item 5.

The fiber-reinforced resin composition according to any one of Items 1 to 4, wherein the thermoplastic resin (B) is at least one resin selected from the group consisting of polyamide, polyacetal, polypropylene, maleic anhydride-modified polypropylene, polylactic acid, polyethylene, polystyrene, and ABS resins.

Item 6.

The fiber-reinforced resin composition according to any one of Items 1 to 4, wherein the thermoplastic resin (B) is at least one resin selected from the group consisting of polyamide, polyacetal, and polylactic acid, the ratio R in the condition (a) is in the range of 1.03 to 1.32, and the crystallinity of the chemically modified cellulose nanofibers in the condition (b) is 55.6% or more.

Item 7.

The fiber-reinforced resin composition according to any one of Items 1 to 4, wherein the thermoplastic resin (B) is at least one resin selected from the group consisting of polypropylene, maleic anhydride-modified polypropylene, polyethylene, and polystyrene; the ratio R in the condition (a) is in the range of 1.21 to 1.88; and the crystallinity of the chemically modified cellulose nanofibers in the condition (b) is 42.7% or more.

Item 8.

The fiber-reinforced resin composition according to any one of Items 1 to 7, wherein the chemically modified cellulose nanofibers (A) are cellulose nanofibers wherein one or more hydroxyl groups in sugar chains constituting the cellulose nanofibers are modified with acetyl.

Item 9.

The fiber-reinforced resin composition according to any one of Items 1 to 8, wherein the cellulose of the chemically modified cellulose nanofibers and cellulose nanofibers is lignocellulose.

Item 10.

A method for producing a fiber-reinforced resin composition comprising chemically modified cellulose nanofibers (A) and a thermoplastic resin (B), the method comprising the steps of:

(1) selecting chemically modified cellulose nanofibers (A) and a thermoplastic resin (B) satisfying the following conditions:

(a) the ratio R of the solubility parameter ($SP_{cnf}$) of the chemically modified cellulose nanofibers (A) to the solubility parameter ($SP_{pol}$) of the thermoplastic resin (B) ($SP_{cnf}/SP_{pol}$) is in the range of 0.87 to 1.88; and (b) the chemically modified cellulose nanofibers (A) have a crystallinity of 42.7% or more;

(2) blending the chemically modified cellulose nanofibers (A) and the thermoplastic resin (B) selected in step (1); and (3) kneading the chemically modified cellulose nanofibers (A) and the thermoplastic resin (B) blended in step (2) to obtain a resin composition.

Item 11.

A method for producing a fiber-reinforced resin composition comprising chemically modified cellulose nanofibers (A) and a thermoplastic resin (B), the method comprising the steps of:

(1) selecting a chemically modified pulp (A1) that forms chemically modified cellulose nanofibers (A) after defibration treatment and a thermoplastic resin (B), the chemically modified nanofibers (A) and the thermoplastic resin (B) satisfying the following conditions:

(a) the ratio R of the solubility parameter ($SP_{cnf}$) of the chemically modified cellulose nanofibers (A) to the solubility parameter ($SP_{pol}$) of the thermoplastic resin (B) ($SP_{cnf}/SP_{pol}$) is in the range of 0.87 to 1.88;

(b) the chemically modified cellulose nanofibers have a crystallinity of 42.7% or more; and (2) blending the chemically modified pulp (A1) and the thermoplastic resin (B) selected in step (1); and (3) kneading the chemically modified pulp (A1) and the thermoplastic resin (B) blended in step (2), and simultaneously defibrating the chemically modified pulp (A1) to obtain a resin composition comprising the chemically modified cellulose nanofibers (A) and thermoplastic resin (B).

Item 12.

A method for producing a fiber-reinforced resin composition comprising chemically modified cellulose nanofibers (A) and a thermoplastic resin (B), the method comprising the steps of:

(1) selecting a chemically modified pulp (A1) and a thermoplastic resin (B);

(2) blending the chemically modified pulp (A1) and the thermoplastic resin (B) selected in step (1); and (3) kneading the chemically modified pulp (A1) and the thermoplastic resin (B) blended in step (2) and simultaneously defibrating the chemically modified pulp (A1) to obtain a resin composition comprising the chemically modified cellulose nanofibers (A) and thermoplastic resin (B);

the chemically modified cellulose nanofibers (A) and the thermoplastic resin (B) satisfying the following conditions:

(a) the ratio R of the solubility parameter ($SP_{cnf}$) of the chemically modified cellulose nanofibers (A) to the solubility parameter ($SP_{pol}$) of the thermoplastic resin (B) ($SP_{cnf}/SP_{pol}$) is in the range of 0.87 to 1.88; and (b) the chemically modified cellulose nanofibers have a crystallinity of 42.7% or more.

Item 13.

The production method according to any one of claims 10 to 12, wherein the ratio R ($SP_{cnf}/SP_{pol}$) in the condition (a) is in the range of 1.03 to 1.82.

Item 14.

Acetylated cellulose nanofibers (A2) having a crystallinity of 42.7% or more and a solubility parameter ($SP_{cnf}$) of 9.9 to 15, hydroxyl groups in sugar chains constituting the acetylated cellulose nanofibers (A2) being substituted with acetyl at a degree of substitution of 0.29 to 2.52.

Item 15.
A fiber-reinforced resin composition comprising the acetylated cellulose nanofibers (A2) according to Item 14 and a thermoplastic resin (B).
Item 16.
The fiber-reinforced resin composition according to Item 15, wherein the acetylated cellulose nanofibers (A2) are present in an amount of 0.1 to 30 parts by mass per 100 parts by mass of the thermoplastic resin (B).
Item 17.
The fiber-reinforced resin composition according to Item 15 or 16, wherein the thermoplastic resin (B) is at least one resin selected from the group consisting of polyamide resins, polyacetal resins, polypropylene, maleic anhydride-modified polypropylene, polylactic acid, polyethylene, polystyrene, and ABS resins.
Item 18.
The fiber-reinforced resin composition according to Item 15 or 16, wherein the acetylated cellulose nanofibers are acetylated lignocellulose nanofibers.
Item 19.
A method for producing a fiber-reinforced resin composition comprising acetylated cellulose nanofibers (A2) and a thermoplastic resin (B),
the method comprising the step of:
(1) kneading an aggregate of fibers (A4) comprising acetylated cellulose (A3) and a thermoplastic resin (B), and simultaneously defibrating the acetylated cellulose (A3) to obtain a resin composition comprising the acetylated cellulose nanofibers (A2) and thermoplastic resin (B), the acetylated cellulose nanofibers (A2) having a crystallinity of 42.7% or more and a solubility parameter ($SP_{cnf}$) of 9.9 to 15, and hydroxyl groups in sugar chains constituting the acetylated cellulose nanofibers (A2) being substituted with acetyl at a degree of substitution of 0.29 to 2.52.

Advantageous Effects of Invention

The fiber-reinforced resin composition of the present invention is such that one or more hydroxyl groups on the surface of sugar chains constituting cellulose are substituted (i.e., chemically modified) with alkanoyl, such as acetyl to inhibit self-aggregation of cellulose by hydrogen bonding.

Furthermore, since the fiber-reinforced resin composition of the present invention comprises a suitable combination of such a matrix component (resin) and chemically modified CNFs, the chemically modified CNFs in resin have a high affinity for the resin, and exhibit excellent dispersibility in the resin.

As a result, the fiber-reinforced resin composition of the present invention has optimum strength.

For example, a comparison of the fiber-reinforced resin composition of the present invention containing a resin and 10 mass % of chemically modified CNFs with a fiber-reinforced resin composition comprising the same resin and 10 mass % of unmodified CNFs shows that the elastic modulus of the fiber-reinforced resin composition of the present invention is at least 1.05 times the elastic modulus of the fiber-reinforced resin composition containing unmodified CNFs when the ratio R of the solubility parameter of chemically modified CNFs ($SP_{cnf}$) to the solubility parameter of the thermoplastic resin ($SP_{pol}$) is in the range of 0.87 to 1.88.

The chemically modified CNFs and resin can also be designed so as to exhibit optimum strength within the above range of the ratio R.

The fiber-reinforced resin composition of the present invention can be produced by kneading chemically modified CNFs and a resin. When a cellulose fiber aggregate, such as pulp, is chemically modified and then melt-mixed with a resin, chemically modified (e.g., acetylated) pulp having a fiber diameter of several tens to several hundreds of micrometers is easily defibrated into chemically modified CNFs having a fiber diameter of several tens to several hundreds of nanometers upon kneading during this step, to thereby easily produce the fiber-reinforced resin composition of the present invention.

The chemically modified CNFs used in the present invention may be CNFs chemically modified with an inexpensive chemical modifier, such as an acetylating agent, in a simple manner. The fiber-reinforced resin composition of the present invention can be easily produced by a combination with an optimum resin, and is thus low cost and can be easily put into practical use.

The fiber-reinforced resin composition of the present invention exhibits good dispersibility of chemically modified CNFs in the resin, and thus has good characteristics.

To produce the fiber-reinforced resin composition of the present invention, chemically modified CNFs (acetylated CNFs etc.) having an optimal solubility parameter (SP) value for each resin can be easily selected according to how many hydroxyl groups in cellulose or lignocellulose are chemically modified (for example, substituted with a modifying group, such as acetyl) and used to produce the fiber-reinforced resin composition.

Since the fiber-reinforced resin composition of the present invention, which comprises cellulose having a crystallinity of about 42% or more and an appropriate solubility parameter (SP) value, allows chemically modified CNFs to be highly dispersible in the resin and cellulose has an enhanced reinforcing effect on a resin, a fiber-reinforced composite material with excellent mechanical properties can be obtained.

According to the fiber-reinforced resin composition of the present invention, a resin (matrix), such as polyamide 6 (PA6), polyacetal (polyoxymethylene, POM), polypropylene (PP), or maleic anhydride-modified polypropylene (MAPP), and a chemically modified (e.g., acetylated) pulp are melt-kneaded, and can be defibrated using shear stress. The chemically modified pulp is formed into nanofibers, and chemically modified CNFs are dispersed well in the resin.

The fiber-reinforced resin composition of the present invention containing the resin and chemically modified CNFs has a higher elastic modulus than the resin alone. For example, the composition containing 10 mass % of chemically modified CNFs has the following elastic modulus.

When the composition contains PA-6 and chemically modified CNFs, the elastic modulus is at least 2.2 times higher; when the composition contains POM and chemically modified CNFs, the elastic modulus is at least 2.1 times higher; when the composition contains PP and chemically modified CNFs, the elastic modulus is at least 1.2 times higher; when the composition contains MAPP and chemically modified CNFs, the elastic modulus is at least 1.5 times higher than the elastic modulus of the resin alone.

The fiber-reinforced resin composition of the present invention, which comprises the resin and chemically modified CNFs, also has higher elastic modulus than the unmodified CNF-containing fiber-reinforced resin composition. For example, when the composition contains 10 mass % of chemically modified CNFs, the elastic modulus is at least 1.1 times higher.

Specifically, when the composition contains PA-6 and chemically modified CNFs, the elastic modulus is at least 1.4 times higher; when the composition contains POM and chemically modified CNFs, the elastic modulus is at least 1.5 times higher; when the composition contains PP and chemically modified CNFs, the elastic modulus is at least 1.1 times higher; when the composition contains MAPP and chemically modified CNFs, the elastic modulus is at least 1.1 times higher; when the composition contains PLA and chemically modified CNFs, the elastic modulus is at least 1.1 times higher; when the composition contains PS and chemically modified CNFs, the elastic modulus is at least 1.1 times higher; and when the composition contains PE and chemically modified CNFs, the elastic modulus is 1.3 times as high as that of the unmodified CNF-containing fiber-reinforced resin composition. The magnification of the elastic modulus is a value rounded to the nearest tenth.

The fiber-reinforced resin composition has a high reinforcing effect of chemically modified CNFs on the resin.

DESCRIPTION OF EMBODIMENTS

Figure 1:
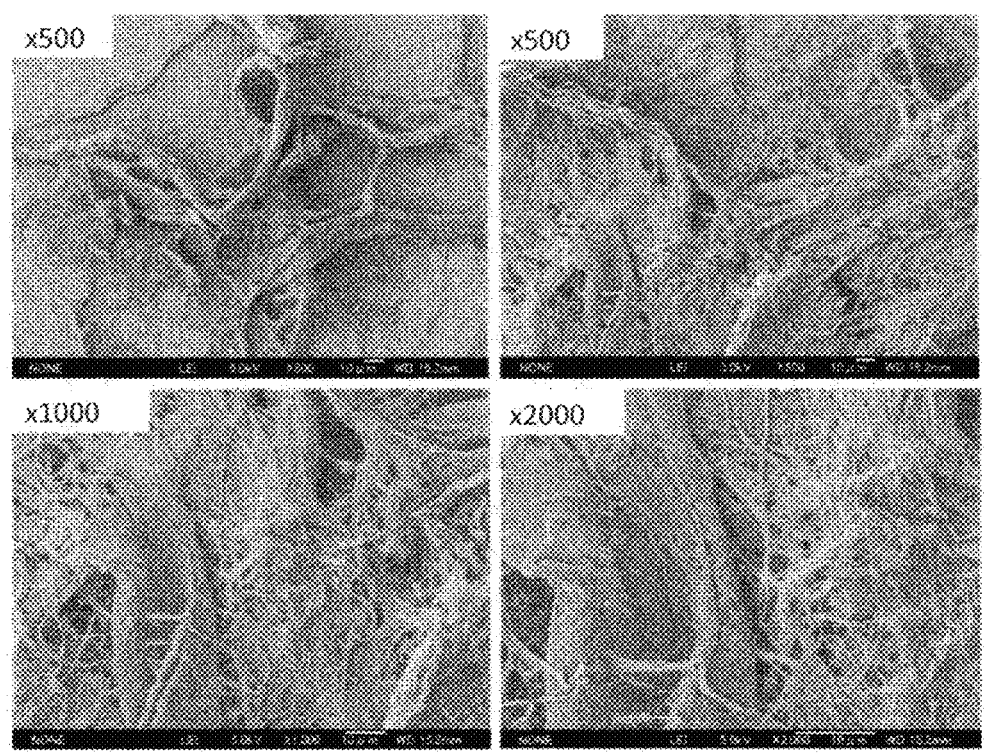
FIG. 1 shows SEM photographs of NBKP, which is a raw material.

The fiber-reinforced resin composition of the present invention is described below in detail.
(1) Fiber-Reinforced Resin Composition The fiber-reinforced resin composition comprises (A) chemically modified cellulose nanofibers and (B) a thermoplastic resin, wherein the chemically modified cellulose nanofibers and the thermoplastic resin satisfy the following conditions:
(a) the ratio R of the solubility parameter ($SP_{cnf}$) of the chemically modified cellulose nanofibers (A) to the solubility parameter ($SP_{pol}$) of the thermoplastic resin (B) ($SP_{cnf}/SP_{pol}$) is in the range of 0.87 to 1.88; and
(b) the chemically modified cellulose nanofibers (A) have a crystallinity of 42.7% or higher.

The ratio R ($SP_{cnf}/SP_{pol}$) stated above in (a) is preferably in the range of about 1.03 to 1.88, and more preferably about 1.03 to 1.82.

Three hydroxyl groups are present in a repeating unit of a cellulose molecule. In the present invention, depending on how many hydroxyl groups in the cellulose molecule are chemically modified (for example, substituted with acetyl), chemically modified CNFs (e.g., acetylated CNFs) having the optimal solubility parameter (SP) value for each resin can be obtained.

The chemical modification treatment promotes dispersibility of chemically modified CNFs in the resin of the fiber-reinforced resin composition of the present invention, and enhances the reinforcing effect of chemically modified CNFs on the resin, thus providing a CNF composite material with excellent mechanical properties.

(1-1) (A) Chemically Modified Cellulose Nanofibers (Chemically Modified CNFs)

The fiber-reinforced resin composition of the present invention contains (A) chemically modified CNFs.

The chemically modified CNFs (A) have a crystallinity of 42.7% or more.

Plant Fibers (Cellulose and Lignocellulose)

Examples of plant fibers used as a raw material for modified cellulose CNFs include fibers obtained from natural plant raw materials containing cellulose and/or lignocellulose, such as wood, bamboo, hemp, jute, kenaf, cotton, beat, agricultural waste, and cloth. Examples of the wood include, but are not limited to, Sitka spruce, *Cryptomeria japonica, Chamaecyparis obtusa*, eucalyptus, acacia, and the like. Examples of paper include, but are not limited to, deinked recycled waste-paper, cardboard recycled waste-paper, magazines, copy paper, and the like. Plant fibers may be used singly, or in a combination of two or more selected from these.

Lignocellulose can also be used as a raw material for chemically modified CNFs.

Lignocellulose is a composite hydrocarbon polymer, and forms cell walls of plants. Lignocellulose is known to be mainly composed of cellulose, hemicellulose, and lignin, which is an aromatic polymer polysaccharide.

Reference Example 1: Review Article, Conversion of lignocellulosic biomass to nanocellulose: structure and chemical process, H. V. Lee, S. B. A. Hamid, and S. K. Zain, Scientific World Journal, Volume 2014, Article ID 631013, 20 pages, http://dx.doi.org/10.1155/2014/631013

Reference Example 2: New lignocellulose pretreatments using cellulose solvents: a review, Noppadon Sathitsuksanoh, Anthe George and Y-H Percival Zhang, J Chem Technol Biotechnol 2013; 88: 169-180

The term "lignocellulose" as used herein refers to lignocellulose having a chemical structure naturally occurring in a plant and/or a mixture of such lignocellulose, or an artificially modified lignocellulose and/or a mixture of such lignocelluloses.

The mixture refers to, for example, a mixture of lignocelluloses and lignocelluloses having chemical structures contained in wood obtained from natural plants or contained in various types of pulp obtained by mechanically and/or chemically treating wood. Lignocellulose is not limited to lignocellulose having a naturally occurring chemical structure. The lignin content of lignocellulose is also not limited.

That is, the terms lignocellulose and ligno pulp as used herein include cellulose and pulp containing only a trace amount of a lignin component.

As a raw material of lignocellulose, fibers containing lignocellulose or an aggregate of fibers containing lignocellulose can be used. Examples of the aggregate of fibers containing lignocellulose include plant-derived pulp, wood flour, and wood chips, and aggregates of fibers containing lignocellulose of any shape, such as plant-derived pulp, wood flour, and wood chips.

Examples of plant raw materials include plant-derived materials such wood, bamboo, hemp, jute, and kenaf; and agricultural production wastes such as bagasse, straw, and beat bagasse. The plant raw materials containing lignocellulose can be formed into flaky, powdery, fibrous, or like shape, and used. The cell walls of plants mainly comprise lignocellulose.

The cell walls of plants usually have a structure such that about 40 cellulose molecules are bound together by hydrogen bonding to form a cellulose microfibril (single CNF) of usually about 4 to 5 nm in width, and several cellulose microfibrils gather to form cellulose microfibers (a bundle of cellulose microfibrils).

It is known that hemicellulose is present in gaps between or around cellulose microfibrils, and that lignin exists in such a manner as to fill the gaps between cellulose microfibrils.

A representative example of raw materials for producing plant fibers or lignocellulose is pulp. Pulp is obtained by chemically and/or mechanically treating plant-derived materials, such as wood, and obtaining fibers by extraction from the plant-derived materials.

By adjusting the degree of chemical and biochemical treatment of the plant-derived material, the hemicellulose and lignin contents are reduced, and fibers containing cellulose as a main component are obtained.

Examples of wood for producing pulp include Sitka spruce, *Cryptomeria* japonica, *Chamaecyparis* obtusa, eucalyptus, acacia, and the like. Examples of the raw material for chemically modified CNFs include used paper such as deinked recycled waste-paper, cardboard recycled waste-paper, magazines, and copy paper. As a raw material for chemically modified CNFs used in the fiber-reinforced resin composition of the present invention, plant fibers can also be used singly, or in a combination of two or more.

Pulp and fibrillated cellulose obtained by fibrillating pulp can be mentioned as examples of preferable raw materials for chemically modified CNFs used in the fiber-reinforced resin composition of the present invention. Pulp comprises lignocellulose and is mainly composed of cellulose, hemicellulose, and lignin.

Pulp can be obtained by treating a plant raw material by a mechanical pulping method, a chemical pulping method, or a combination of mechanical pulping and chemical pulping methods. The mechanical pulping method is a method of pulping by the mechanical power of a grinder, refiner, or the like, while maintaining lignin. The chemical pulping method is a method of pulping by adjusting lignin content using a chemical.

Examples of mechanical pulp (MP) include ground pulp (GP), refiner GP (RGP), thermomechanical pulp (TMP), chemithermomechanical pulp (CTMP), bleached chemical thermomechanical pulp (BCTMP), and the like.

As pulp produced by a combination of a mechanical pulping method and a chemical pulping method, chemimechanical pulp (CMP), chemiground pulp (CGP), semichemical pulp (SCP), etc., can be used. Examples of semichemical pulp (SCP) include pulp produced by a sulfite method, a cold-soda method, a kraft method, a soda method, etc.

Examples of chemical pulp (CP) include sulfite pulp (SP), soda pulp (AP), kraft pulp (KP), dissolving craft pulp (DKP), and the like.

Deinked recycled pulp, cardboard recycled pulp, and magazine recycled pulp, which comprise a pulp such as mechanical pulp or chemical pulp as a main component, can also be used as a raw material for chemically modified CNFs.

These raw materials may optionally be subjected to delignification or bleaching to adjust the lignin content of the pulp.

Among these pulps, various kraft pulps derived from softwood with high fiber strength (needle-leaf-tree unbleached kraft pulp ("NUKP"), oxygen-prebleached needle-leaf-tree kraft pulp ("NOKP"), and needle-leaf-tree bleached kraft pulp ("NBKP")) are particularly preferable as the raw material of chemically modified CNFs used for the fiber-reinforced resin composition of the present invention.

When pulp is used, pulp produced by a pulping method from which plant-derived lignin is not completely removed and in which lignin is moderately present can also be used without limitation. For example, a mechanical pulping method of mechanically pulping a plant raw material is preferably used.

Examples of the pulp preferably used to produce chemically modified CNFs, which are used to produce the fiber-reinforced resin composition of the present invention, include mechanical pulp (MP), such as ground pulp (GP), refiner GP (RGP), thermomechanical pulp (TMP), and chemithermomechanical pulp (CTMP).

When lignocellulose fibers are used as a raw material of the fiber-reinforced resin composition of the present invention, the content of lignin in lignocellulose fibers or an aggregate of lignocellulose fibers (e.g., ligno pulp) is not particularly limited, as long as lignin is present in these raw materials in an amount that can be chemically modified.

From the viewpoint of strength of the obtained chemically modified lignocellulose and thermal stability, the lignin content is preferably about 1 to 40 mass %, more preferably about 3 to 35 mass %, and even more preferably about 5 to 35 mass %. The lignin content can be measured by the Klason method.

Compared with lignin-free cellulose or pulp, lignocellulose and ligno pulp are simple in terms of the production process, and can be obtained from the raw material (e.g. wood) with a high yield. Lignocellulose and ligno pulp are also advantageous in terms of cost because they can be produced with low energy, and are useful as raw materials for the fiber-reinforced resin composition of the present invention.

The method for preparing CNFs and microfibrillated lignocellulose (MFLC, herein also referred to as lignocellulose nanofibers (ligno CNFs)) by defibrating plant fibers may be, for example, a method of defibrating a cellulose fiber containing-material, such as pulp.

Examples of defibration methods include a method in which an aqueous suspension or slurry of a cellulose-fiber-containing material is mechanically milled or beaten using a refiner, a high-pressure homogenizer, a grinder, a single-screw or multi-screw kneader (preferably a twin-screw kneader), a bead mill, or the like. These defibration methods may optionally be combined. As these defibration methods, known defibration methods may be used.

When the chemically modified cellulose fiber-containing material (e.g., chemically modified pulp or chemically modified ligno pulp) is kneaded with a thermoplastic resin using a single-screw or multi-screw kneader (preferably multi-screw kneader) while heating to melt the resin, the chemically modified cellulose fiber-containing material is defibrated into nanofibrils, and chemically modified CNFs and/or chemically modified ligno CNFs can be created in the thermoplastic resin.

Therefore, to produce the fiber-reinforced resin composition of the present invention, defibrating the chemically modified cellulose fiber-containing material in a molten thermoplastic resin in this manner is advantageous.

CNFs and MFLC are hereinafter sometimes collectively referred to as CNFs.

CNFs are obtained by raveling (defibrating) the fibers of a cellulose-containing material (e.g., wood pulp) to a nano-size level. The CFC preferably has an average fiber diameter (fiber width) of about 4 to 200 nm, and an average fiber length of about 5 μm or more. The average of the fiber diameter of CNF is preferably about 4 to 150 nm, and more preferably about 4 to 100 nm.

The preferable range and more preferable range of the average fiber length and the average fiber diameter of chemically modified CNFs used in the present invention are the same as those of CNF described above.

The fiber diameter and fiber length can be measured using a Kajaani fiber length analyzer produced by Metso Automation Co., Ltd. The average of the fiber diameter (average fiber diameter) and the average of the fiber length (average fiber length) of CNFs and chemically modified CNFs is determined by measuring the fiber diameter of at least 50 CNFs within the visual field of an electron microscope, and calculating the average.

The defibration improvement of the fibers can be observed with a scanning electron microscope (SEM).

As long as the object of the present invention is achieved (for example, the flexural modulus of chemically modified CNF- and/or chemically modified ligno CNF-reinforced composition is at least 1.1 times the flexural modulus of the unmodified CNF- and/or unmodified ligno CNF-reinforced composition), the fiber-reinforced composition that is insufficient in defibrillation and that contains chemically modified cellulose fibers and/or chemically modified lignocellulose fibers having a fiber diameter larger than the above chemically modified CNFs is included within the scope of the present invention.

The specific surface area of chemically modified CNFs is preferably about 70 to 300 m$^2$/g, more preferably about 70 to 250 m$^2$/g, and even more preferably about 100 to 200 m$^2$/g. When chemically modified CNFs with an increased specific surface area are combined with a resin (matrix), the contact area can be increased, and the resulting resin molding material can have an increased strength. The chemically modified CNFs do not aggregate in the resin, but enhance the strength of the resin molding material.

Chemical Modification

In the chemically modified CNFs (including chemically modified MFLCs) contained in the fiber-reinforced resin composition, hydroxyl groups present on the CNF surface are hydrophobized according to the resin used.

Examples of chemically modified CNFs include hydrophobized CNFs in which hydroxyl groups present on the surface of nanofibers are hydrophobized by modification with a group such as acyl or alkyl; modified CNFs in which hydroxy groups present on the surface of nanofibers are cationically modified with a silane coupling agent having an amino group, glycidyl trialkyl ammonium halide, or a halohydrin-type compound; modified CNFs in which hydroxyl groups present on the surface of nanofibers are anionically modified by monoesterification with a cyclic anhydride, such as succinic anhydride or alkyl or alkenyl succinic anhydride, modification with a carboxyl-containing silane coupling agent, etc.; and the like.

Among these, CNFs in which hydroxyl groups in sugar chains constituting CNFs are modified with alkanoyl groups (alkanoyl-modified CNFs) are preferable as chemically modified CNFs in the present invention due to ease of production. The chemically modified CNFs are more preferably CNFs in which hydroxyl group(s) in sugar chains constituting CNFs are modified with lower alkanoyl group(s) (lower alkanoyl-modified CNFs).

Further, from the viewpoint of ease of production and production costs, chemically modified CNFs used in the present invention are preferably CNFs in which hydroxyl group(s) in sugar chains constituting CNFs are modified with lower acetyl group(s) (also referred to as Ac-CNF).

In the present invention, chemically modified CNFs can be obtained by chemically modifying the above CNFs or defabricating an aggregate of fibers, such as chemically modified pulp or chemically modified cellulose, by a known defibrillation method.

Alternatively, when a composite with a resin (a matrix material, described later) is produced, an aggregate of fibers, such as chemically modified pulp or chemically modified cellulose, can be kneaded with a resin and microfibrillated in the resin by a shear force during kneading.

Chemically modified CNFs are preferably such that hydroxyl group(s) present in at least one of cellulose and hemicellulose (including lignocellulose) (namely, hydroxyl groups in sugar chains) are substituted with the residue remaining after removing hydrogen atoms from carboxy groups of at least one compound selected from the group consisting of saturated fatty acids, unsaturated carboxylic acids, monounsaturated fatty acids, diunsaturated fatty acids, triunsaturated fatty acids, tetraunsaturated fatty acids, pentaunsaturated fatty acids, hexaunsaturated fatty acids, dicarboxylic acids, amino acids, male imide compounds:

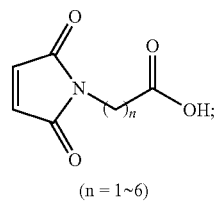

(n = 1~6)

phthalimide compounds represented by:

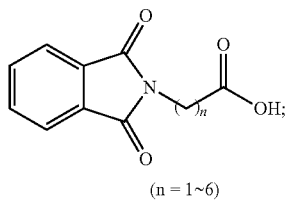

(n = 1~6)

That is, chemically modified CNFs are preferably such that one or more hydroxyl groups in sugar chains of cellulose and lignocellulose are acylated with the residue remaining after removing hydroxyl groups from carboxyl groups of the above carboxylic acids (acyl).

Examples of preferable saturated fatty acids include formic acid, acetic acid, propionic acid, butyric acid, valeric acid, pivalic acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, and the like.

Examples of preferable unsaturated carboxylic acids include acrylic acid, methacrylic acid, and the like.

Examples of preferable monounsaturated fatty acids include crotonic acid, myristoleic acid, palmitoleic acid, oleic acid, ricinoleic acid, and the like.

Examples of diunsaturated fatty acids include sorbic acid, linolic acid, eicosadienoic acid, and the like.

Examples of preferable triunsaturated fatty acids include linolenic acid, pinolenic acid, eleostearic acid, and the like.

The tetraunsaturated fatty acids are preferably selected, for example, from stearidonic acid and arachidonic acid.

Examples of preferable pentaunsaturated fatty acids include bosseopentaenoic acid, eicosapentaenoic acid, and the like.

Examples of preferable hexaunsaturated fatty acids include docosahexaenoic acid, nisinic acid, and the like.

Examples of preferable aromatic carboxylic acids include benzoic acid, phthalic acid, isophthalic acid, terephthalic acid, salicylic acid, gallic acid (3,4,5-trihydroxybenzenecarboxylic acid), cinnamic acid (3-phenylprop-2-enoic acid), and the like.

Examples of preferable dicarboxylic acids include oxalic acid, malonic acid, succinic acid, glutaric acid, adipic acid, fumaric acid, maleic acid, and the like.

Examples of amino acids include glycine, β-alanine, ε-aminocaproic acid (6-aminohexanoic acid), and the like.

Among the chemically modified CNFs modified with various carboxylic acids mentioned above, CNFs in which hydroxyl group(s) in sugar chains constituting CNFs are modified with a lower alkanoyl group (CNFs in which hydroxyl group(s) in sugar chains constituting CNFs are substituted with a lower alkanoyl group; referred to as lower alkanoylated CNFs; corresponding to CNFs of a chemical structure in which hydroxyl groups in sugar chains constituting CNFs are substituted with a lower alkanoyloxy group) are preferable as chemically modified CNFs used in the present invention because such CNFs are easily produced.

CNFs or ligno CNFs acylated with the residue (acyl group) remaining after removing hydroxyl groups from carboxy groups of branched alkyl carboxylic acids (e.g., pivalic acid, 3,5,5-trimethylhexanoic acid, etc.), cyclic alkane carboxylic acids (e.g., cyclohexane carboxylic acid, t-butylcyclohexane carboxylic acid, etc.), and substituted or unsubstituted phenoxyalkylcarboxylic acids (e.g., phenoxyacetic acid, 1,1,3,3-tetramethylbutylphenoxyacetic acid, bornane phenoxyacetic acid, bornane phenoxyhexanoic acid, etc.) have high reinforcing effects even on resins (in particular, PP, PE, or like olefin resins with low SP values) can be advantageously used.

Further, in view of ease of production and manufacturing cost, chemically modified CNFs used in the present invention are more preferably CNFs in which hydroxyl groups in sugar chains constituting CNFs are modified with an acetyl group (chemically modified CNFs in which hydroxyl groups in sugar chains constituting CNFs are acetylated; also referred to as Ac-CNFs).

The chemically modified CNFs used in the present invention are preferably such that hydroxyl groups of cellulose and/or hemicellulose (hydroxyl groups of sugar chains) used as a raw material are acylated in such a state that the crystal structure of cellulose present in raw cellulose and/or lignocellulose fibers are maintained as much as possible.

That is, the chemically modified CNFs used in the present invention are preferably such that hydroxyl groups present on the surface of raw fibers, such as hydroxyl groups of cellulose or hydroxyl groups of hemicellulose, are acylated in such a manner that the crystal structure of cellulose originally present in raw cellulose and/or lignocellulose fibers is not destroyed.

By the chemical modification treatment, chemically modified CNFs with excellent mechanical properties intrinsic to CNFs can be obtained and dispersibility of chemically modified CNFs in the resin can also be promoted, thus enhancing the reinforcing effect of chemically modified CNFs on the resin.

The acylation reaction is preferably performed by suspending the raw material in an anhydrous aprotic polar solvent capable of swelling raw material fibers (CNFs or pulp), such as N-methylpyrrolidone or N,N-dimethylformamide, and acylating the suspended raw material with an anhydride or an acid chloride of a carboxylic acid as mentioned above in the presence of a base.

Examples of bases used in this acylation reaction include pyridine, N,N-dimethylaniline, sodium carbonate, sodium hydrogen carbonate, potassium carbonate, and the like.

This acylation reaction can be preferably performed, for example, at a temperature in the range of room temperature to 100° C. with stirring.

The degree of acylation of hydroxyl groups in sugar chains of chemically modified CNFs used in the present invention (also referred to as DS, the degree of substitution, or the degree of modification) is described.

The degree of acylation (the degree of modification, DS) of hydroxyl groups in sugar chains of chemically modified CNFs obtained by an acylation reaction is preferably about 0.05 to 2.5, more preferably about 0.1 to 1.7, and even more preferably 0.15 to 1.5. The maximum level of the degree of substitution (DS) varies depending on the amount of hydroxyl groups in sugar chains of CNFs, and is about 2.7.

Setting the degree of substitution (DS) to about 0.05 to 2.5 can provide chemically modified CNFs with a moderate crystallinity and SP value. For example, acetylated CNFs preferably have a DS of 0.29 to 2.52. When the CNFs have a DS in this range, crystallinity can be maintained at about 42.7% or more.

The degree of substitution (DS) can be analyzed by various analytical methods, such as elementary analysis, neutralization titration method, FT-IR, and two-dimensional NMR ($^1$H and $^{13}$C-NMR).

Crystallinity of Chemically Modified CNFs

The chemically modified CNFs in fiber-reinforced resin composition have a crystallinity of about 42.7% or more.

Chemically modified CNFs have a high crystallinity of 42.7% or more, and preferably have cellulose type I crystals. The "crystallinity" refers to the percentage of crystals (mainly cellulose type I crystals) present in the total cellulose. The crystallinity of chemically modified CNFs (preferably cellulose type I crystals) is preferably about 50% or more, more preferably about 55% or more, even more preferably about 55.6% or more, still even more preferably about 60% or more, and particularly preferably about 69.5% or more.

The upper limit of the crystallinity of chemically modified CNFs is generally about 80%. Chemically modified CNFs maintain a cellulose I type crystal structure and exhibit properties, such as high strength and low thermal expansion.

Among these crystals, the cellulose type I crystalline structure is as defined in "Cellulose no Jiten" (published by Asakura Shoten, new cover, first edition, pages 81 to 86 or 93 to 99). Most natural celluloses have a cellulose type I crystalline structure.

Cellulose fibers having, for example, cellulose type II, type III, or type IV cellulose crystalline structure are derived from cellulose having a cellulose type I crystalline structure. Among these, the type I crystalline structure has a higher crystalline elastic modulus than the other structures.

When cellulose having a cellulose type I crystalline structure is used, a composite material formed using CNFs and a resin (a matrix resin) can have a low linear thermal expansion coefficient and high elastic modulus.

Cellulose having a crystalline type I structure can be identified by detecting typical peaks at two regions around $2\theta=14$ to $17°$ and around $2\theta=22$ to $23°$ in the diffraction profile obtained by wide-angle X-ray diffraction image analysis.

The degree of polymerization of natural cellulose is about 500 to 10,000, and that of regenerated cellulose is about 200 to 800. Cellulose is formed by extended-chain crystals in which bundles of β-1,4 linked, linearly extended cellulose fibers are fixed by intramolecular or intermolecular hydrogen bonds.

Although X-ray diffraction or solid-state NMR spectroscopy reveals that cellulose crystals have a variety of crystalline structures, natural cellulose has only type-I crystalline structure. From analysis such as X-ray diffraction, the proportion of the crystalline region in wood pulp cellulose is estimated to be about 50 to 60%, and that of bacterial cellulose is estimated to be higher, about 70%.

Because of its extended-chain crystal form, cellulose is not only highly elastic, but is also five times stronger than steel, while having a linear thermal expansion coefficient equal to or below 1/50 that of glass.

(1-2) (B) Thermoplastic Resin

The fiber-reinforced resin composition of the present invention comprises (B) a thermoplastic resin in addition to (A) chemically modified CNFs. A molded article with excellent strength can be produced by using this fiber-reinforced resin composition.

The fiber-reinforced resin composition of the present invention preferably contains acylated cellulose nanofibers (acylated CNFs) as (A) chemically modified CNFs. From the viewpoint of the production method and cost, the fiber-reinforced resin composition preferably contains lower alkanoyl cellulose nanofibers (lower alkanoyl CNFs), and more preferably contains acetylated cellulose nanofibers (acetylated CNFs).

Examples of thermoplastic resins include thermoplastic resins such as polyethylene (PE), polypropylene (PP), polyvinyl chloride, polystyrene, polyvinylidene chloride, fluororesin, (meth)acrylic resins, polyamide resins (nylon resin, PA), polyester, polylactic resins, a copolymer resin of polylactic acid and polyester, an acrylonitrile-butadiene-styrene copolymer (ABS resin), polycarbonate, polyphenylene oxide, (thermoplastic) polyurethane, polyacetal (POM), vinyl ether resins, polysulfone resins, cellulose resins (e.g., triacetylated cellulose, diacetylated cellulose), and the like.

Fluororesin

Examples of fluororesins include homopolymers or copolymers of tetrachloroethylene, hexafluoropropylene, chlorotrifluoroethylene, vinylidene fluoride, vinyl fluoride, perfluoroalkyl vinyl ether, and the like.

(Meth)Acrylic Resins

Examples of (meth)acrylic resins include homopolymers or copolymers of (meth)acrylic acid, (meth)acrylonitriles, (meth)acrylic acid esters, (meth)acrylamides, and the like. In this specification, "(meth)acrylic" refers to "acrylic and/or methacrylic." (Meth)acrylic acid includes acrylic acid and methacrylic acid.

Examples of (meth)acrylonitriles include acrylonitrile and methacrylonitrile.

Examples of (meth)acrylic acid esters include (meth) acrylic acid alkyl esters, (meth)acrylic acid monomers having a cycloalkyl group, (meth)acrylic acid alkoxy alkyl esters, and the like.

Examples of (meth)acrylic acid alkyl esters include methyl (meth)acrylate, ethyl (meth)acrylate, butyl (meth) acrylate, 2-ethylhexyl (meth)acrylate, cyclohexyl (meth) acrylate, benzyl (meth)acrylate, lauryl (meth)acrylate, stearyl (meth)acrylate, hydroxyethyl (meth)acrylate, and the like.

Examples of (meth)acrylic acid monomers having a cycloalkyl group include cyclohexyl (meth)acrylate, isobornyl (meth)acrylate, and the like.

Examples of (meth)acrylic acid alkoxy alkyl esters include 2-methoxyethyl (meth) acrylate, 2-ethoxyethyl (meth)acrylate, 2-butoxyethyl (meth)acrylate, and the like.

Examples of (meth)acrylamides include (meth)acrylamide; N-substituted (meth)acrylamides such as N-methyl (meth)acrylamide, N-ethyl (meth)acrylamide, N,N-dimethyl (meth)acrylamide, N,N-diethyl (meth)acrylamide, N-isopropyl (meth)acrylamide, and N-t-octyl (meth)acrylamide; and copolymers of these (meth)acrylic resins.

Polyester

Examples of preferable polyesters include aromatic polyesters, aliphatic polyesters, unsaturated polyesters, and the like.

Examples of aromatic polyesters include copolymers of diols described below, such as ethylene glycol, propylene glycol, and 1,4-butanediol, and aromatic dicarboxylic acids, such as terephthalic acid.

Examples of aliphatic polyesters include copolymers of diols described below and aliphatic dicarboxylic acids, such as succinic acid and valeric acid; homopolymers and copolymers of hydroxycarboxylic acids, such as glycolic acid and lactic acid; copolymers of diols described below, aliphatic dicarboxylic acids, and hydroxycarboxylic acids described above; and the like.

Examples of unsaturated polyesters include copolymers of diols described above, unsaturated dicarboxylic acids such as maleic anhydride, and, if necessary, vinyl monomers such as styrene.

Polycarbonate

Examples of preferable polycarbonates are reaction products of bisphenols, such as bisphenol A or derivatives of bisphenol A, and phosgene or phenyl dicarbonate.

Polysulfone Resin

Examples of polysulfone resins include copolymers of 4,4'-dichlorodiphenylsulfone and bisphenol A or the like.

Polyphenylene Sulfide

Examples of preferable polyphenylene sulfides include copolymers containing p-dichlorobenzene, sodium sulfide, etc.

Polyurethane

Examples of preferable polyurethanes include copolymers of diisocyanates and diols.

Examples of diisocyanates include dicyclohexylmethane diisocyanate, 1,6-hexamethylene diisocyanate, isophorone diisocyanate, 1,3-cyclohexylene diisocyanate, 1,4-cyclohexylene diisocyanate, 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, and the like.

Examples of diols include diols having a relatively low molecular weight, such as ethylene glycol, propylene glycol, 1,3-propanediol, 1,3-butanediol, 1,4-butanediol, 1,5-pentanediol, 3-methyl-1,5-pentanediol, 1,6-hexanediol, neopentyl glycol, diethylene glycol, trimethylene glycol, triethylene glycol, tetraethylene glycol, dipropylene glycol, tripropylene glycol, and cyclohexane dimethanol; and polyester diols, polyether diols, polycarbonate diols, and the like.

Amide Resin (Polyamide Resin)

Examples of preferable amide resins include aliphatic amide resins such as nylon 66 (polyamide 66, PA66), nylon 6 (polyamide 6, PA6), nylon 11 (polyamide 11, PA11), nylon 12 (polyamide 12, PA12), nylon 46 (polyamide 46, PA46), nylon 610 (polyamide 610, PA610), and nylon 612 (polyamide 612, PA612); aromatic polyamides comprising an aromatic diamine, such as phenylene diamine, and an aromatic dicarboxylic acid, such as terephthaloyl chloride or isophthaloyl chloride, or a derivative of an aromatic dicarboxylic acid.

Polyacetal

Examples of preferable polyacetals include a polymer or a copolymer of trioxane, formaldehyde, ethylene oxide, and the like.

These thermoplastic resins can be used singly, or in a combination of two or more.

Among the thermoplastic resins, at least one resin selected from the group consisting of polyamide, polyacetal, polypropylene, maleic anhydride-modified polypropylene, polyethylene, polylactic acid, copolymers of polylactic acid and polyester, ABS resins, and polystyrene is preferable in view of excellent mechanical properties, heat resistance, surface smoothness, and appearance.

Polyamide resins (PA), which have an amide bond with high polarity in a molecular structure, have high affinity with a cellulose material, and are thus preferable. Examples of such preferable polyamide resins include PA6 (an ε-caprolactam ring-opening polymer), PA66 (polyhexamethylene adipamide), PA11 (polyamide obtained by ring-opening polycondensation of undecanelactam), PA12 (polyamide obtained by ring opening polycondensation of lauryl lactam), and the like; and polyamide copolymer resin, and the like.

Further, polypropylenes (PP) and polyethylenes (PE, in particular, high-density polyethylene: HDPE), which are versatile as structural members; and maleic anhydride-modified polypropylenes that are highly compatible with these versatile polyolefins, are preferable.

(1-3) Relationship between $SP_{cnf}$ of the Chemically Modified CNFS (A) and $SP_{pol}$ of the Thermoplastic Resin (B)

The fiber-reinforced resin composition of the present invention has a ratio R of the solubility parameter ($SP_{cnf}$) of the chemically modified CNFs (A) to the solubility parameter ($SP_{pol}$) of the thermoplastic resin (B), $SP_{cnf}/SP_{pol}$, in the range of about 0.87 to 1.88, preferably about 1.03 to 1.88, and more preferably about 1.03 to 1.82.

The fiber-reinforced resin composition of the present invention preferably comprises, as the thermoplastic resin (B), polyamide (PA), polyacetal (POM), polylactic acid (PLA), or a mixed resin thereof.

In this case, the ratio R ($SP_{cnf}/SP_{pol}$) is preferably about 1.04 to 1.32. The crystallinity of chemically modified CNFs is preferably about 69.5% or more.

Alternatively, the fiber-reinforced resin composition of the present invention may comprise a thermoplastic resin having a polarity lower than the above thermoplastic resin (i.e., having a small $SP_{pol}$ value), such as polypropylene (PP), polyethylene (PE), maleic anhydride modified polypropylene (MAPP), or polystyrene (PS).

In this case, the ratio R of $SP_{cnf}$ of chemically modified CNFs to $SP_{pol}$ of the thermoplastic resin ($SP_{cnf}/SP_{pol}$) is about 1.21 to 1.88, and preferably 1.21 to 1.82, and the crystallinity of chemically modified CNFs is preferably 42.7% or more.

The fiber-reinforced composition of the present invention preferably comprises, as a versatile thermoplastic resin (B), an olefin resin, such as polypropylene (PP) or polyethylene (PE); and a modified polyolefin highly compatible with such an olefin resin, such as maleic anhydride-modified polypropylene (MAPP).

In this case, the ratio R of the solubility parameter ($SP_{cnf}$) of the chemically modified CNFs (A) to the solubility parameter ($SP_{pol}$) of the thermoplastic resin (B), $SP_{cnf}/SP_{pol}$, is preferably about 1.21 to 1.88, and more preferably about 1.21 to 1.82. The crystallinity of chemically modified CNFs is preferably about 42.7% or more.

By selecting the relationship between $SP_{cnf}$ of the chemically modified CNFs (A) and $SP_{pol}$ of the thermoplastic resin (B) in this way, a fiber-reinforced composition comprising a suitable combination and having optimum mechanical properties can be obtained.

The relationship between $SP_{cnf}$ of chemically modified CNFs (A) and $SP_{pol}$ of the thermoplastic resin (B) was exemplified above mainly by referring to the relationship between $SP_{cnf}$ of acylated CNFs and $SP_{pol}$ of each of the 6 types of thermoplastic resins (PA6, POM, PP, MAPP, PLA, and PS) shown in the Examples.

Even when CNFs modified with a modified group different from the above, such as various alkanoyl groups, for example, propionylated CNFs or myristoylated CNFs, are used, a combination of suitable chemically modified CNFs and a suitable resin can be selected by selecting a combination of various alkanoylated CNFs, such as propionylated CNFs, and a thermoplastic resin, which satisfy the ratio R ($SP_{cnf}/SP_{pol}$) described above, thus producing a fiber-reinforced resin composition comprising an optimum combination of chemically modified CNFs and a thermoplastic resin.

(A) Solubility Parameter ($SP_{cnf}$) of Chemically Modified CNF

Solubility parameter (SP, unit $(cal/cm^3)^{1/2}$) (according to the Fedors method)

Method of Calculating the SP Value of Acetylated NBKP (Ac-NBKP)

With respect to acetylated NBKP, the SP value of acetylated cellulose of each DS was calculated by linear approximation using SP values of cellulose and cellulose diacetate disclosed in literature, i.e., assuming that cellulose has a DS of 0 and cellulose diacetate has a DS of 2. The validity of the calculation and SP values used were confirmed by the Fedors SP value calculation method.

The results show that the SP value of the acetylated cellulose obtained by the above linear approximation fell within ±10% of the value obtained by the Fedors calculation value, and is thus considered to be a reasonable value.

Method for Calculating SP Values of Acetylated Ligno Pulp (LP)

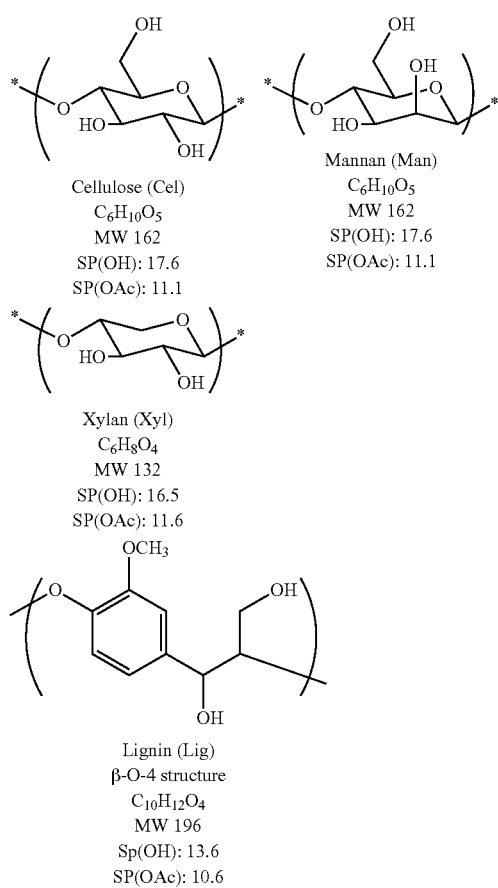

Cellulose (Cel)
$C_6H_{10}O_5$
MW 162
SP(OH): 17.6
SP(OAc): 11.1

Mannan (Man)
$C_6H_{10}O_5$
MW 162
SP(OH): 17.6
SP(OAc): 11.1

Xylan (Xyl)
$C_6H_8O_4$
MW 132
SP(OH): 16.5
SP(OAc): 11.6

Lignin (Lig)
β-O-4 structure
$C_{10}H_{12}O_4$
MW 196
Sp(OH): 13.6
SP(OAc): 10.6

An example of ligno pulp is ligno pulp 150-1 (GP150-1), obtained by digesting ground pulp (GP) at 150° C. for 1 hour, that roughly comprises 66% of cellulose, 12% of hemicellulose (HCel) (7% of mannan (Man), and 5% of xylan (Xyl)), and 22% of lignin (Lig) in terms of molar ratio. Ligno pulp is explained below using this ligno pulp as an example.

In the present invention, this lignin is assumed to consist only of β-O-4 lignin. When this lignin is acetylated, acetylated lignin is formed, and the maximum DS of ligno pulp is 2.73. This lignin contains two hydroxy groups, and the maximum DS of lignin is 2.

Ligno pulp 150-3 formed by digesting ground pulp (GP) for 3 hours at 150° C. in the same manner comprises 87.4 mass % of cellulose and hemicellulose containing 3 hydroxyl groups, and 12.6 mass % of lignin containing 2 hydroxyl groups. The maximum DS value is thus 2.87.

The mass fraction of each of cellulose, hemicellulose, and lignin components contained in ligno pulp (150-3) is converted to a mole fraction to estimate the number of moles of each atom or each group of atoms contained in cellulose, hemicellulose, and lignin. The SP value of ligno pulp can be calculated by the Fedors SP value calculation method using evaporation energy per mole and the volume per mole.

As an example, a case in which ligno pulp (LP) (150-1: digesting at 150° C. for 1 hour) is acetylated is explained.

The method of calculating the SP of ligno pulp (wherein the degree of acetylation (modification) is 0.88 (DS=0.88)) is also explained.

This DS value (0.88) is based on cellulose contained in ligno pulp. Acetyl content (g/mol) is 0.88 mol/162 g (in terms of g/mol of cellulose).

The average molecular weight (g/mol) of ligno pulp is calculated as follows, in consideration of the abundance ratio (molar ratio) of cellulose, hemicellulose, and lignin: 162×0.66 (Cel)+HCel [162×0.07 (Man)+147×0.05 (Xyl)]+196×0.22 (Lig)=168.2.

Accordingly, DS of LP (150-1) is 88×168.73/162=0.92.

SP (LP150-1-OH) is 17. 6×0.73 (Cel+Man)+16.5×0.05 (Xyl)+13.6×0.22 (Lig)=16.62, ca.16.6.

SP (LP150-1-OAC) is 11. 1×0.73 (Cel+Man)+11.1×0.05 (Xyl)+10.6×0.22 (Lig)=10.99, ca.11.0.

The DS of SP (LP150-1-OAC) is 3×0.73 (Cel+Man)+2×0.05 (Xyl)+2×0.22 (Lig)=2.73.

The SP of SP (LP150-1-OAC, DS=0.88) is −(16.6−11.0)/2.73)×0.92+16.6=14.713, ca.14.7.

A general calculation formula of the SP value (Y) of acetylated ligno pulp with DS=d can be expressed as follows:

$$Y=[-(a-b)/c]*d+a$$

(wherein * refers to the arithmetic symbol of multiplication (×), and a, b, c, and d each represent the following)

a: SP value of unmodified ligno pulp (LP-OH)
=$SP_{cel}$ (SP value of cellulose)*(Cel+Man)
+$SP_{xyl}$ (SP value of xylan)*(Xyl)
+$SP_{lig}$ (SP value of lignin)*(Lig)

b: SP value of ligno pulp in which all of the hydroxyl values are acetylated (LP-OAC)
=$SP_{celac3}$ (SP value of cellulose triacetate)*(Cel+Man)
+$SP_{xylac}$ (SP value of xylan diacetate)*(Xyl)
+$SP_{ligac}$ (SP value of lignin diacetate)*(Lig)

c: (DS of ligno pulp in which all of the hydroxyl groups were acetylated)
=3*(Cel)+3*(Man)+2*(Xyl)+2*(Lig).

(Cel), (Man), (Xyl), and (Lig) represent the molar fractions of cellulose, mannan, xylan, and lignin in ligno pulp.

d: (DS of lignocellulose at the degree of acetylation (DS value determined by a titration method; referred to as ds))
=ds*(average formula weight of the ligno pulp repeating unit)/(formula weight of the cellulose repeating unit)

In the above, literature values disclosed in "Jitsuyo Polymer Alloy Sekkei" ("Practical Design of Polymer Alloys"), written by Fumio Ide, Kogyo Chosakai Publishing, Inc., published on Sep. 1, 1996, page 19, was used.

$Sp_{celac3}$ (SP value of cellulose triacetate) is obtained by using $SP_{cel}$ (SP value of cellulose, literature value) and $SP_{celac2}$ (SP value of cellulose diacetate, literature value).

More specifically, the relationship of $SP_{cel}$ value (DS=0) and $SP_{celac2}$ (DS=2) is assumed to be on a linear function obtained by plotting these SP values on the ordinate and the corresponding DS values on the abscissa. The value at a DS of 3 is obtained as $SP_{celac3}$ (SP value of cellulose triacetate) from the linear function obtained.

$SP_{xy}$ (SP value of xylan), $SP_{lig}$ (SP value of lignin), $SP_{xylac}$ (SP value of xylan diacetate), and $SP_{ligac}$ (SP value of lignin diacetate) were calculated in accordance with the Fedors method (Robert F. Fedors, Polymer Engineering and Science, February, 1974, vol. 14, No. 2, 147-154).

In the Fedors calculation, the $\Delta_{ei}$ (evaporation energy) and $\Delta_{vi}$ (molar volume) of hydroxyl groups of cellulose, mannan, xylan, and lignin used were all values of secondary hydroxyl groups.

Since it can be reasonably assumed that mannan (Man) and xylan (Xyl) are present in an equimolar amount in hemicelluloses, a calculation can be made based on this assumption without any practical problem.

For lignocellulose containing lignin in an amount of less than 1 mass %, lignin can be substantially ignored without any substantial problem (calculation can be made based on the assumption that the lignin content is 0).

The SP values of lignocelluloses and acetylated lignocellulose having a total content of cellulose and glucomannan of 92 mass % or more and a lignin content of 0.5 mass % or less can be calculated using the above SP literature values of cellulose and cellulose diacetate, with the assumption that the lignocellulose consists only of cellulose.

The optimal solubility parameter range of chemically modified CNFs ($SP_{cnf}$) depends on the solubility parameter of the resin (matrix) ($SP_{pol}$) composited with chemically modified CNFs, and is preferably about 9.9 to 15. The optimal solubility parameter range of chemically modified CNFs ($SP_{cnf}$) is preferably 11.5 to 15 when a hydrophilic resin having a solubility parameter ($SP_{pol}$) of about 11 to 13 is used.

The optimal solubility parameter ($SP_{cnf}$) range of chemically modified CNFs is about 9.9 to 15 when a hydrophobic resin (matrix) having a solubility parameter ($SP_{pol}$) of about 8 to 9 is used.

In summary, the solubility parameter ($SP_{cnf}$) of chemically modified CNFs is preferably determined depending on the solubility parameter $SP_{pol}$ of the resin (matrix). The ratio R ($SP_{cnf}/SP_{pol}$) of the solubility parameter ($SP_{cnf}$) of chemically modified CNFs to solubility parameter ($SP_{pol}$) of the resin is preferably in the range of about 0.87 to 1.88.

The ratio R ($SP_{cnf}/SP_{pol}$) is preferably in the range of about 1.03 to 1.88, and more preferably in the range of about 1.03 to 1.82.

When the ratio R is within this range, the effect of enhancing dispersibility of chemically modified CNFs to the resin (matrix) and increasing the strength of the resin composition containing chemically modified CNFs are provided.

Solubility Parameter of (B) Thermoplastic Resin ($SP_{pol}$)

As the solubility parameter ($SP_{pol}$) value of the thermoplastic resin, SP values disclosed in "*Jitsuyo Polymer Alloy Sekkei*" ("Practical Design of Polymer Alloys"), written by Fumio Ide, Kogyo Chosakai Publishing, Inc., first edition, published on Sep. 1, 1996, can be consulted. The SP values of representative thermoplastic resins are as follows.

| Material name | SP $(cal/cm^3)^{1/2}$ |
|---|---|
| Nylon 6 (PA6) | 11.6 to 12.7 |
| Polyoxymethylene (Polyacetal, POM) | 11.1 |
| Polypropylene (PP) | 8.1 |
| Cellulose | 15.65 |
| Cellulose diacetate | 10.9 to 11.35 |

For the materials whose SP values are indicated by numerical ranges in the literature, the average of the numerical range was used as the SP value of the material in this invention. For example, when the literature SP value of nylon 6 (PA6) is 11.6 to 12.7, the average of 11.6 and 12.7 (rounded to two decimal points), 12.2, was used as the SP value of nylon 6 (PA6).

The thermoplastic resin to be used in the fiber-reinforced resin composite is selected according to the purpose of use of the fiber-reinforced complex formed using the thermoplastic resin. The solubility parameter ($SP_{pol}$) range of the thermoplastic resin is specific to each resin.

For example, the solubility parameter ($SP_{pol}$) of polyamides, which are frequently used in automobile components, such as engine covers and manifolds, and household appliance components, is about 12 to 13, and the $SP_{pol}$ of nylon 6 (PA6) is 12.2. The $SP_{pol}$ of polyacetal (POM), which is frequently used for housing, casing, and mechanism elements of electric/electronic products, for which strength is required, is about 11.1.

On the other hand, the $SP_{pol}$ of polypropylene (PP), which has a small specific gravity, is hydrophobic, and is frequently used for automobile components, electric household appliance components, packaging films, and food containers, is about 8.1. $SP_{pol}$ of maleic anhydride-modified polypropylene (MAPP), which is used for enhancing the adhesion of hydrophobic polyolefins, such as PP and polyethylene (PE), and dispersibility is about 8.2.

Chemically modified CNFs to be used with the resin having such a $SP_{pol}$ value as to achieve a ratio R ($SP_{cnf}/SP_{pol}$) of about 1.03 to 1.32 are selected, thus producing a fiber-reinforced resin composition of the present invention. Ratio R of $SP_{cnf}$ of (A) to $SP_{pol}$ of (B) ($SP_{cnf}/SP_{pol}$)

The fiber-reinforced resin composition of the present invention has a ratio R of the $SP_{cnf}$ of (A) to the $SP_{pol}$ of B ($SP_{cnf}/SP_{pol}$) in the range of about 0.87 to 1.88, preferably about 1.03 to 1.88, and more preferably about 1.03 to 1.82. Within this range (1.03 to 1.82), when the $SP_{pol}$ of a thermoplastic resin is high, R ($SP_{cnf}/SP_{pol}$) is preferably low; and when $SP_{pol}$ is low, R ($SP_{cnf}/SP_{pol}$) is preferably high.

For example, when polyamide (PA6, $SP_{pol}$=12.2), polyacetal (POM, $SP_{pol}$=11.1), polylactic acid, or a mixed resin thereof is used, the ratio R ($SP_{cnf}/SP_{pol}$) is preferably 1.03 to 1.32.

On the other hand, when a resin having a low $SP_{pol}$, such as polypropylene (PP, $SP_{pol}$=8.1), maleic anhydride-modified polypropylene (MAPP, $SP_{pol}$=8.2), or a mixed resin thereof is used, the ratio R ($SP_{cnf}/SP_{pol}$) is preferably in the range of 1.21 to 1.82. This provides the effect of enhancing dispersibility of chemically modified CNFs to the resin (matrix), and increasing the strength of the resin composition comprising chemically modified CNFs.

Specifically, when polyamide (PA6, SP=12.2) is used as a thermoplastic resin, acetylated cellulose having a DS of about 0.29 to 1.17, an SP of about 14.2 to 13.0, and a crystallinity of about 69.5% or more is preferably used as a thermoplastic resin.

Adding acetylated cellulose having a DS of about 0.46 to 0.88, an SP of about 14.6 to 13.7, and a crystallinity of about 72.1% is more preferable in terms of imparting good flexural properties.

When polyacetal (POM, SP=11.1) is used as a thermoplastic resin, acetylated cellulose having a DS of about 0.46 to 1.84, an SP of about 14.6 to 11.5, and a crystallinity of about 55.6% or more is preferable. Adding acetylated cellulose having a DS of about 0.64 to 1.17, an SP of about 14.2 to 13.0, and a crystallinity of about 69.5% or more is more preferable in terms of imparting good flexural properties.

When polypropylene (PP, SP=8.1) is used as a thermoplastic resin, the DS is preferably about 0.46 or more, and more preferably 1.84 or more. The resin is considered to have a peak at a DS of about 2.52 or more, and the crystallinity does not affect flexural properties.

When maleic anhydride-modified polypropylene (MAPP, $SP_{pol}$=8.2) is used as a thermoplastic resin, acetylated cellulose having a DS of about 0.32 to 2.52, an SP of about 15.0 to 9.90, and a crystallinity of about 42.7% or more is preferable.

Adding acetylated cellulose having a DS of about 0.88 to 1.57, an SP of about 13.7 to 12.1, and a crystallinity of about 55.6%, is preferable in terms of imparting good flexural properties.

When polylactic acid (PLA, $SP_{pol}$=11.4) is used as a thermoplastic resin, acetylated cellulose with a DS of about 0.32 to 2.52, an SP of about 15.0 to 9.9, a crystallinity of about 42.7% is preferable, and acetylated cellulose with a DS of about 0.32 to 1.57, a SP of about 15.0 to 12.1, and a crystallinity of about 55.6% or more is more preferable. Adding these acetylated celluloses can provide excellent flexural properties.

When polyethylene (PE, SP=8.0) is used, acetylated cellulose with a DS of about 0.30 to 2.02, an SP of about 15.0 to 11.1, and a crystallinity of about 42.7% or more is preferable. This combination can provide excellent flexural properties.

When polystyrene (PS, SP=8.85) is used, acetylated cellulose with a DS of 0.30 to 2.02, an SP of about 15.0 to 11.0, and a crystallinity of about 42.7% is preferable. This combination can provide excellent flexural properties.

When an acrylonitrile-butadiene-styrene copolymer (ABS resin) is used, although this cannot be defined generally because the SP value varies depending on the copolymerization ratio of the acrylonitrile-butadiene-styrene copolymer, acetylated cellulose having a DS of about 0.30 to 1.57, an SP of about 15.0 to 12.1, and a crystallinity of about 55.6% or more is preferable in terms of imparting excellent flexural properties.

When a polar material, such as polyamide (PA6) or polyacetal (POM), which has a high SP, is used, compatibility with cellulose is sufficiently improved by an acetylation treatment to a DS of 1.2, and the crystallinity of cellulose can be maintained at about 70% or more; i.e., the strength of cellulose fibers is maintained at a high level, thus providing a material with the highest flexural properties.

When a nonpolar material, such as polypropylene (PP), which has a low SP, is used, acetylated cellulose with a DS of up to about 1.0, which has high crystallinity and high fiber strength, has excessively low interface strength, thus resulting in insufficient flexural properties. The acetylated NBKP/PP composite material, even with reduced crystallinity, must have a high DS. More specifically, using highly acetylated cellulose is preferable.

(1-4) Formulation of the Fiber-Reinforced Resin Composition

The fiber-reinforced resin composition of the present invention contains (A) chemically modified CNFs and (B) a thermoplastic resin.

The content of chemically modified CNFs (A) in the fiber-reinforced resin composition is preferably about 1 to 300 parts by mass, more preferably about 1 to 200 parts by mass, and still more preferably about 1 to 100 parts by mass, per 100 parts by mass of the thermoplastic resin (B).

The content of chemically modified CNFs (A) in the fiber-reinforced resin composition (preferably acetylated CNF) is preferably about 0.1 to 30 parts by mass.

The fiber-reinforced resin composition with excellent kinetic properties, heat resistance, surface smoothness, and appearance can be obtained by incorporating chemically modified CNFs into a thermoplastic rein (B).

The chemically modified CNFs (A), like plant fibers, are lightweight and strong, and have a low linear thermal expansion coefficient. The composition (A), even containing chemically modified CNFs, has a property of being softened upon heating, and being easily molded and returning to a solid upon cooling, like the property of general-purpose plastic; and can exhibit excellent processability (thermoplasticity).

In addition to the chemically modified CNFs (A) and thermoplastic resin (B), the fiber-reinforced resin composition may comprise, for example, the following additives: compatibilizers; surfactants; polysaccharides, such as starch and alginic acid; natural proteins, such as gelatin, glue, and casein; inorganic compounds, such as tannin, zeolite, ceramics, and metal powder; colorants; plasticizers; flavoring agents; pigments; flow-regulating agents; leveling agents; conducting agents; antistatic agents; UV absorbers; UV dispersers; and deodorants.

The content of such optional additives may be suitably selected from the range such that the effect of the present invention is not impaired.

Since the fiber-reinforced resin composition of the present invention contains (A) chemically modified CNFs, the chemically modified CNFs are inhibited from being aggregated by hydrogen bonding.

Therefore, in the step of mixing chemically modified CNFs and a thermoplastic resin (matrix material), the chemically modified CNFs (A) are inhibited from aggregation and uniformly dispersed in a thermoplastic resin, thus providing a fiber-reinforced resin composition comprising chemically modified CNFs (A) with excellent mechanical properties, heat resistance, surface smoothness, and appearance.

In relation to the mechanical properties, the fiber-reinforced resin composition containing (A) chemically modified CNFs of the present invention can perform well-balanced improvement of static properties such as a flexure test, and dynamic properties such as an impact test.

(1-5) Preferable Embodiment of the Crystallinity of Chemically Modified CNFs

The chemically modified CNFs contained in the fiber-reinforced resin composition are preferably (A2) acetylated cellulose nanofibers (acetylated CNFs).

The acetylated CNFs have a crystallinity of about 42.7%, and are configured such that hydroxyl groups of sugar chains are acetylated, the degree of substitution is about 0.29 to 2.52, and the solubility parameter ($SP_{cnf}$) is about 9.9 to 15.

When a matrix with low polarity, such as polypropylene or maleic anhydride modified polypropylene, and a polar matrix such as polyamide or polyacetal are used, acetylated CNFs have a crystallinity of about 42.7% or more, a degree of substitution (DS) of about 0.29 to 2.52, and a solubility parameter ($SP_{cnf}$) of about 9.9 to 15.0.

In particular, when polyamide and polyacetal, which are polar polymers, are used, acetylated CNFs preferably have a crystallinity of about 55.6% or more, a degree of substitution (DS) of about 0.29 to 1.84, and a solubility parameter ($SP_{cnf}$) of about 11.5 to 15.0.

The acetylated CNFs can endure melt-kneading with a high-melting point resin of 200° C. or higher, and repeated melt-kneading.

When the fiber-reinforced resin composition comprises a polar resin (a polyamide resin, a polyacetal resin) as a thermoplastic resin (B), chemically modified CNFs having a crystallinity of about 65% or more, a degree of substitution (DS) of about 0.4 to 1.2, and a solubility parameter ($SP_{cnf}$) of about 12 to 15 are preferably used. As raw pulp to produce the chemically modified CNFs, NBKP is preferably used.

When the fiber-reinforced resin composition comprises a nonpolar resin (polypropylene, PP) as a thermoplastic resin (B), chemically modified CNFs having a crystallinity of about 40% or more and a degree of substitution (DS) of about 1.2 or more, and a solubility parameter ($SP_{cnf}$) of about 8 to 12 are preferably used. As raw pulp to produce the chemically modified CNFs, NBKP is preferably used.

(2) Production of Fiber-Reinforced Resin Composition

The fiber-reinforced resin composition can be produced by mixing (A) chemically modified CNFs and (B) a thermoplastic resin (matrix material). Further, a molded article can be produced by molding the fiber-reinforced resin composition.

Although the fiber-reinforced resin composition of the present invention can be produced by kneading chemically modified CNFs and a resin, the composition can also be produced by kneading chemically modified pulp (a material from which chemically modified CNFs are obtained) and (B) a thermoplastic resin using a kneading machine or the like; and compositing the pulp and the resin.

Fibrillation of chemically modified pulp is advanced by shear stress during kneading, and a uniformly mixed composition of (A) chemically modified CNFs and (B) a thermoplastic resin can be obtained.

The contents of (A) chemically modified CNFs and (B) a thermoplastic resin in the fiber-reinforced resin composition are as follows.

When (A) chemically modified CNFs or chemically modified pulp is mixed with (B) a thermoplastic resin, both components may be mixed at room temperature without heating, and then be heated; or both components may be mixed while heating. When heating, the mixing temperature can be suitably adjusted according to the thermoplastic resin (B) used.

The heating temperature is preferably set within the range from the lowest processing temperature recommended by thermoplastic resin suppliers (225 to 240° C. for PA6, 170 to 190° C. for POM, 160 to 180° C. for PP and MAPP) to the temperature higher than the recommended processing temperature by 20° C. When the mixing temperature is set within this range, the chemically modified CNFs or chemically modified pulp (A) and the thermoplastic resin (B) can be uniformly mixed.

As a mixing method, the mixing is preferably performed by a kneading method using a mixer, such as a bench roll, a Banbury mixer, a kneader, or a planetary mixer, a mixing method using agitating blades, a mixing method using a revolution or rotation agitator, and the like.

In the method for producing the fiber-reinforced resin composition, hydrogen bonding of cellulose is inhibited (chemically modified) by introducing a lower alkanoyl group, such as acetyl, into hydroxyl groups of sugar chains constituting CNF (acetylated).

In the step of melt-mixing chemically modified (acetylated) cellulose and resin, chemically modified (e.g., acetylated) pulp having a fiber diameter of several tens to several hundreds of micrometers can be defibrated into chemically modified CNFs having a fiber diameter of several tens of nanometers to several hundred of nanometers.

The chemical modification treatment, such as acetylation, is at low cost and excellent in simplicity of treatment, and can be easily put into practical use. That is, the chemical modification treatment can promote the dispersibility of chemically modified cellulose fibers, and also promote defibrillation (conversion into nanofibers).

In the present invention, depending on what number of hydroxyl groups in the cellulose molecule are chemically modified (substituted with, for example, acetyl groups), chemically modified CNFs (e.g., acetylated CNFs) having the optimal SP value for each resin are used to obtain a fiber-reinforced resin composition.

The fiber-reinforced resin composition maintains crystallinity of cellulose at about 42% or more and achieves an appropriate SP value, thus obtaining a CNF composite material that is highly dispersible in a cellulose resin and that has improved reinforcing effects on the cellulose resin and excellent mechanical properties.

In the production method, the kneading treatment and the mixing treatment are also referred to as "compositing."

The method for producing the fiber-reinforced resin composition of the present invention is characterized in that the fiber-reinforced resin composition comprises (A) cellulose nanofibers and (B) a thermoplastic resin, the method comprising the steps of:

(1) selecting chemically modified cellulose nanofibers and a thermoplastic resin satisfying the following conditions:
(a) the ratio R of the solubility parameter of the chemically modified cellulose nanofibers (A) ($SP_{cnf}$) to the solubility parameter of the thermoplastic resin (B) ($SP_{pol}$) ($SP_{cnf}/SP_{pol}$) is in the range of 0.87 to 1.88; and
(b) the chemically modified cellulose nanofibers (A) have a degree of crystallinity of 42.7% or more;
(2) blending the chemically modified cellulose nanofibers (A) and the thermoplastic resin (B) selected in step (1); and
(3) kneading the chemically modified cellulose nanofibers (A) and the thermoplastic resin (B) blended in step (2) to obtain a resin composition.

The ratio R ($SP_{cnf}/SP_{pol}$) of the above condition (a) is preferably in the range of about 1.03 to 1.88, and more preferably in the range of about 1.03 to 1.82.

In this production process, CNFs prepared and produced for the fiber-reinforced resin composition of the present invention or commercially available unmodified CNFs can be directly chemically modified, and used. That is, CNFs of various states are chemically modified and composited with a thermoplastic resin.

Further, a high-performance CNF reinforced thermoplastic resin composition can be produced by considering the ratio R ($SP_{cnf}/SP_{pol}$).

Another method for producing a fiber-reinforced resin composition according to the present invention is characterized in that the fiber-reinforced resin comprises (A) chemically modified cellulose nanofibers and (B) a thermoplastic resin, and the method comprises the steps of:

(1) selecting (A1) a chemically modified pulp that forms chemically modified cellulose nanofibers after defibrillation treatment and (B) a thermoplastic resin, the chemically modified pulp and the thermoplastic resin satisfying the following conditions:
(a) the ratio R of the solubility parameter of the chemically modified cellulose nanofibers (A) ($SP_{cnf}$) to the solubility parameter of the thermoplastic resin (B) ($SP_{pol}$) ($SP_{cnf}/SP_{pol}$) is in the range of 0.87 to 1.88; and
(b) the chemically modified cellulose nanofibers (A) have a degree of crystallinity of 42.7% or higher;
(2) blending the chemically modified pulp (A1) and the thermoplastic resin (B) selected in step (1); and
(3) kneading the chemically modified pulp (A1) and the thermoplastic resin (B) blended in step (2), and simultaneously defibrillating the chemically modified pulp (A1) to obtain a resin composition comprising (A) chemically modified cellulose nanofibers and (B) a thermoplastic resin.

The ratio R ($SP_{cnf}/SP_{pol}$) in the above (a) is preferably in the range of about 1.03 to 1.88, and more preferably in the range of about 1.03 to 1.82 range.

The method for producing the fiber-reinforced resin composition of the present invention is characterized in that the fiber-reinforced resin comprises (A) chemically modified cellulose nanofibers and (B) a thermoplastic resin, the method comprising the steps of:
(1) selecting (A1) a chemically modified pulp and (B) a thermoplastic resin;
(2) blending the chemically modified pulp (A1) and the thermoplastic resin (B) selected in step (1); and
(3) kneading the chemically modified pulp (A1) and the thermoplastic resin (B) blended in step (2), and simultaneously defibrillating the chemically modified pulp (A1) to obtain a resin composition comprising the chemically modified cellulose nanofibers (A) and the thermoplastic resin (B); wherein the chemically modified fibers (A) and the thermoplastic resin (B) satisfy the following conditions:
(a) the ratio R of the solubility parameter of the chemically modified cellulose nanofibers (A) ($SP_{cnf}$) to the solubility parameter of the thermoplastic resin (B) ($SP_{pol}$) ($SP_{cnf}/SP_{pol}$) is in the range of 0.87 to 1.88; and (b) the chemically modified cellulose nanofibers (A) have a degree of crystallinity of 42.7% or higher.

The ratio R ($SP_{cnf}/SP_{pol}$) of the above condition (a) is preferably in the range of about 1.03 to 1.88, and more preferably in the range of about 1.03 to 1.82.

In the production of CNFs, in general, pulp or the like is chemically defibrated by a high-pressure homogenizer or the like. However, because a slurry containing pulp at a low concentration is used, and the equipment used is expensive and large in size, CNFs produced thereby are expensive.

In the production method of the present invention, undefibrated pulp is chemically modified and defibrated by the shear stress of a thermal melting mixer while the pulp is composited with a resin. Therefore, production costs can be reduced; furthermore, a high-performance fiber-reinforced resin composition in which low-damage CNFs are dispersed can be obtained.

A high-performance CNF-reinforced thermoplastic resin composition can be produced by considering the ratio R ($SP_{cnf}/SP_{pol}$)

The method for producing the fiber-reinforced resin composition is characterized in that the fiber-reinforced resin composition comprises (A2) acetylated cellulose nanofibers and (B) a thermoplastic resin, and the method comprises the steps of:
(1) kneading (A4) an aggregate of fibers comprising (A3) acetylated cellulose and (B) a thermoplastic resin, and simultaneously defibrating the acetylated cellulose (A3) to obtain a resin composition comprising (A2) acetylated cellulose nanofibers and (B) a thermoplastic resin, and
the acetylated cellulose nanofibers (A2) have a degree of crystallinity of 42.7% or more, have hydroxyl groups of sugar chains substituted with acetyl groups at a degree of substitution of 0.29 to 2.52, and have a solubility parameter ($SP_{cnf}$) of 9.9 to 15.

In the production of CNFs, in general, pulp or the like is chemically defibrated by a high-pressure homogenizer or the like. However, since a slurry containing pulp at a low concentration is used, and the equipment used is expensive and large in size, CNFs produced thereby are expensive.

In the production process of the present invention, undefibrated pulp is chemically modified and composited with a resin by the shear stress of a thermal melting mixer while the pulp is composited with a resin. Therefore, production cost can be reduced; furthermore, a high-performance fiber-reinforced resin composition in which low-damage CNFs are dispersed can be obtained.

Any matrix in the range from a non-polar matrix to a polar matrix can be produced by controlling the degree of substitution with acetyl and the solubility parameter.

(3) Molding Material and Molded Article Formed using the Fiber-Reinforced Resin Composition (Moulding Material and Moulded Article)

Using the fiber-reinforced resin composition of the present invention, a molding material and a molding article (a moulding material and a moulded article) can be produced. The molded article may be formed into any of various shapes, such as films, sheets, plates, pellets, powders, and three-dimensional configurations.

Examples of usable molding methods include metallic molding, injection molding, extrusion molding, blow molding, foam molding, and the like.

The molded article (moulded article) can be used not only in the field of fiber-reinforced plastics, in which matrix moldings (mouldings) containing plant fibers are used, but also in fields in which thermoplasticity and mechanical strength (e.g., tensile strength) are required.

For example, the molded article can be effectively used for interior materials, exterior materials, structural materials, etc. of transportation vehicles, such as automobiles, trains, ships, and airplanes; housings, structural materials, internal parts, etc., of electrical appliances such as personal computers, televisions, telephones, and watches; housings, structural materials, internal parts, etc., of mobile communication devices, such as mobile phones; housings, structural materials, internal parts, etc., of devices such as portable music players, video players, printers, copiers, and sporting equipment; building materials; office supplies such as writing supplies; tanks; containers, and the like.

In the step of mixing chemically modified CNFs and the resin, chemically modified CNFs do not aggregate with each other, and are uniformly dispersed in the resin. Therefore, a chemically modified CFC-containing resin composition and molded article with excellent mechanical properties, heat resistance, surface smoothness, appearance, etc., can be provided.

In relation to the mechanical properties, the resin composition can perform well-balanced improvement of static properties such as a flexure test, and dynamic properties such as an impact test. In relation to the heat resistance, the resin composition can achieve improvement of several tens of degrees in heat distortion temperature. The molded product obtained from the resin composition containing the modified cellulose nanofibers of the present invention does not suffer from aggregation of chemically modified CNFs, and has excellent surface smoothness and appearance.

EXAMPLES

The present invention is described below in more detail with reference to Examples and Comparative Examples. The present invention is not limited to these Examples.

In the Examples, the contents of pulp, chemically modified pulp, chemically modified CNFs, and thermoplastic resin are expressed by mass %.

I. Test Method

The test methods used in the Examples, Comparative Examples, etc. are as follows.

(1) Lignin Quantification Method (the Klason Lignin Method)

A glass fiber filter paper (GA55) was dried in a 110° C. oven to constant weight. After the filter paper was allowed to cool in a desiccator, the weight was measured. The sample completely dried at 110° C. (about 0.2 g) was precisely weighed and placed in a 50-mL volume tube, and 3 mL of 72% concentrated sulfuric acid was added. While the content in the tube was crushed with a glass rod to make a uniform mixture, the tube was placed in 30° C. warm water to maintain the temperature for 1 hour.

Subsequently, after the tube content and 84 g of distilled water were poured into an Erlenmeyer flask and mixed, a reaction was allowed to proceed in an autoclave at 120° C. for 1 hour. The content was allowed to cool, and then filtered through a glass fiber filter paper to remove the insoluble matter by filtration. The filtrate was washed with 200 ml of distilled water. The washed product was dried in a 110° C. oven to a constant weight and weighed.

(2) Method for Quantifying Cellulose and Hemicellulose (Sugar Analysis)

A glass fiber filter paper (GA55) was dried in a 110° C. oven to constant weight. After the filter paper was allowed to cool in a desiccator, the weight was measured. The sample completely dried at 110° C. (about 0.2 g) was precisely weighed and placed in a 50-mL volume tube, and 3 mL of 72% concentrated sulfuric acid was added.

While the content in the tube was crushed with a glass rod to make a uniform mixture, the tube was placed in 30° C. warm water to maintain the temperature for 1 hour. Subsequently, after the tube content and 84 g of distilled water were quantitatively poured into an Erlenmeyer flask and mixed, 1.0 mL of the mixture was placed in a pressure tube, and 100 μL of a 0.2% inositol solution was added as an internal standard. Using a measuring pipette, 72% concentrated sulfuric acid (7.5 μL) was added thereto.

A reaction was allowed to proceed at 120° C. for 1 hour. After the reaction mixture was allowed to cool, 100 μL of the reaction mixture was diluted with ultrapure water, and then subjected to Thermo Fisher Scientific Inc. ion chromatography analysis to analyze the sugar components in the sample.

(3) Method for Determining the Degree of Chemical Modification (DS) of Hydroxyl Groups of Cellulose and Hemicellulose (3-1) Back Titration Method A method for measuring the DS of a sample in which hydroxyl groups of cellulose, hemicellulose, and lignocellulose are acetylated (esterified) is explained below using an acetylated sample as an example. The explanation also applies to other acylated samples.

Preparation, Basis Weight, and Hydrolysis

A sample was dried, and 0.5 g of component (A) was precisely weighed. After 75 mL of ethanol and 50 mL (0.025 mol) of NaOH (B) were added thereto, the mixture was stirred for 3 to 4 hours. The resulting mixture was filtered, washed with water, and dried. The sample on filter paper was subjected to an FTIR measurement. It was confirmed that absorption peaks based on the carbonyl of ester bonds disappeared; that is, ester bonds were hydrolyzed. This filtrate was used for the back titration described below.

Back Titration

The filtrate contains a sodium acetate salt resulting from hydrolysis and an excess of added NaOH. The neutralization titration of NaOH was performed using 1N HCl and phenolphthalein.

The number of moles (D) of cellulose repeating units is calculated by the following formulas:

0.025 mol (B)−(Number of moles of HCl used for neutralization)=Number of moles of acetyl groups esterified to hydroxyl groups of cellulose, etc. (C)

(Molecular weight of cellulose repeating units 162×Number of moles of cellulose repeating units (undetermined (D))+(Molecular weight of acetyl: 43×(C))=0.5 g of the weighed sample (A)

DS is calculated by the following formula:

$$DS=(C)/(D)$$

(3-2) Method for Measuring DS by Infrared (IR) Absorption Spectrum

The DS of esterified cellulose/lignocellulose can also be determined by measuring infrared (IR) absorption spectra. When cellulose/lignocellulose is esterified, a strong absorption band derived from ester carbonyl (C=O) appears around 1733 $cm^{-1}$.

Accordingly, a calibration curve is first prepared by plotting the intensity of this absorption band (area) on the abscissa and plotting the DS value determined by the back titration method described above on the abscissa. The DS value of a sample is obtained by measuring the intensity of the absorption band, and determining the DS of the sample from this value and the calibration curve. In this way, the DS can be determined quickly and easily.

(4) Measurement of Crystallinity of Cellulose etc.

Using a Rigaku model UltraX18HF (produced by Rigaku Corporation), wide-angle X-ray diffraction of samples (refiner-treated pulp and a chemically modified product thereof) was measured in accordance with the method disclosed in *Mokushitu Kagaku Jikken Manual* (Wood Scientific Experiment Manual), 4. Fine structure, (1) X-ray structure analysis (pp. 198 to 202). The crystallinity of samples was thereby obtained. The crystallinity was measured using X-ray as CuKα radiation at an output of 30 kV/200 mA and 2 ⊖=5 to 40°.

II. Preparation of Raw Material (Pulp)

(1) Preparation of Refiner-Treated Needle-Leaved Tree-Derived Bleached Kraft Pulp A slurry of needle-leaved tree bleached kraft pulp (NBKP, available from Oji Holdings, Corporation) (an aqueous suspension with a pulp slurry concentration of 3 mass %) was passed through a single-disc refiner (produced by Aikawa Iron Works Co., Ltd.) and repeatedly subjected to refiner treatment until a Canadian standard freeness (CSF) value of 50 mL was achieved, thus performing defibration treatment.

The fibers were observed under a scanning electron microscope (SEM). Although fibers with a diameter of submicron order were observed, fibers with a coarse fiber diameter of several tens to several hundreds of micrometers were sporadically observed.

(2) Preparation of Refiner-Treated Needle-Leaved Tree-Derived Unbleached Softwood Pulp (NUKP)

A slurry of needle-leaved-tree unbleached kraft pulp (NUKP, available from Nippon Paper Industries Co., Ltd.) (an aqueous suspension with a pulp slurry concentration of 3 mass %) was passed through a single-disc refiner (produced by Aikawa Iron Works Co., Ltd.) and repeatedly subjected to refiner treatment until a Canadian standard freeness (CSF) value of 50 mL was achieved, thus performing defibration.

The fibers were observed under a scanning electron microscope (SEM). Although fibers with a diameter of submicron order were observed, a large number of fibers with a coarse fiber diameter of several tens to several hundreds of micrometers were observed.

(3) Preparation of Refiner-Treated Lignocellulose-Containing Pulp (Ligno Pulp, LP): GP-150-1

A reaction of "grinder-treated needle-leaved tree pulp" (GP, available from Nippon Paper Industries Co., Ltd.) with a chemical (0.8 M-NaOH, 0.2 M-$Na_2S$) was allowed to proceed using 20 g of the chemical per gram of the pulp in an autoclave at 150° C. for 1 hour to obtain a slurry pulp.

The obtained slurry (an aqueous suspension with a pulp slurry concentration of 3 mass %) was passed through a single-disc refiner (produced by Aikawa Iron Works Co., Ltd.) and repeatedly subjected to refiner treatment until a Canadian standard freeness (CSF) value of 50 mL was achieved, thus performing defibration treatment.

The fibers were observed under a scanning electron microscope (SEM). Although fibers with a diameter of submicron order were observed, a large number of fibers with a coarse fiber diameter of several tens of micrometers to about 100 μm were observed.

(4) Preparation of Refiner-Treated Lignocellulose-Containing Pulp (Ligno Pulp (LP) GP (150-3))

A reaction of "grinder-treated needle-leaved tree pulp" (GP, available from Nippon Paper Industries Co., Ltd.) with a chemical (0.8 M-NaOH, 0.2 M-$Na_2S$) was allowed to proceed using 20 g of the chemical per gram of the pulp in an autoclave at 150° C. for 3 hours to obtain a slurry pulp.

The obtained slurry (an aqueous suspension with a pulp slurry concentration of 3 mass %) was passed through a single-disc refiner (produced by Aikawa Iron Works Co., Ltd.) and repeatedly subjected to refiner treatment until a Canadian standard freeness (CSF) value of 50 mL was achieved, thus performing defibration.

The fibers were observed under a scanning electron microscope (SEM). Although fibers with a diameter of submicron order were observed, a large number of fibers with a coarse fiber diameter of several tens of micrometers to about 100 μm were observed.

III. Acetylation of Pulp/Ligno Pulp, and Compositing of the Acetylated Pulp/Ligno Pulp with Various Resins (1) Acetylation of Cellulose, and Compositing with Resin (1-1) Composition of Materials and Acetylation Treatment Needle-leaved tree-derived bleached kraft pulp (NBKP) having the composition shown in Table 1 was used (a specific production method is as described above). The pulp was mainly composed of cellulose (84.3 mass %), and further contained hemicelluloses, pectic polysaccharide, and a trace of lignin.

Further, pulp containing lignocellulose (ligno pulp, LP) was used. Table 2 shows the composition of each lingo pulp. Used were GP150-1-a, GP150-3-a, and GP150-3, which were obtained by digesting needle-leaved tree-derived bleached kraft pulp (NUKP) and ground pulp (GP) at a temperature of 150° C. for 1 hour or 3 hours, and then performing refiner treatment. GP150-1-a was prepared in the same manner as GP150-1 described above in the section "Preparation of raw material (pulp)."

GP150-3 and GP150-3-a were obtained by performing digesting treatment and refiner treatment under the same treatment conditions as GP150-3 described above in the section "Preparation of raw material (pulp)." The results show that the proportions of components were different from batch to batch.

TABLE 1

Formulation of NBKP used

| Component | Mass % |
| --- | --- |
| Cellulose | 84.3 |
| Glucomannan | 7.9 |
| Xylan | 6.9 |
| Arabinan | 0.5 |
| Galactan | 0.3 |
| Lignin | 0.1 |

TABLE 2

Formulation of ligno pulp used

| Sample No. Digesting conditions | Starting material composition (mass %) | | |
| --- | --- | --- | --- |
| | Cellulose | Hemicellulose | Lignin |
| GP150-3 | 78.4% | 9.4% | 12.2% |
| NUKP | 90.1% | 6.8% | 3.1% |
| GP150-1-a | 72.4% | 7.2% | 20.4% |
| GP150-3-a | 82.5% | 7.2% | 10.3% |

Tables 3 and 4 show the procedures for synthesis of acetylated pulp and acetylated ligno pulp.

Acetylated NBKP and acetylated ligno pulp with various DS (different degree of substitution of three hydroxyl groups in the cellulose repeating unit or two hydroxyl groups in β-O-4 lignin) of 0.29 to 2.64 were obtained by changing the amounts of acetic anhydride and potassium carbonate added, reaction temperature, and reaction time.

The DS was calculated by titration of acetic acid formed by adding an alkali to acetylated NBKP and acetylated ligno pulp, and hydrolyzing ester bonds.

TABLE 3

Procedure for acetylation

| 1 | NBKP or ligno pulp was dispersed in N-methylpyrrolidone. |
| --- | --- |
| 2 | Acetic anhydride and potassium carbonate were added in molar equivalents shown in Table 4, and stirred at the reaction temperature for the reaction time shown in Table 4. |
| 3 | The obtained acetylated NBKP was washed, and the degree of substitution (DS) of hydroxyl groups of cellulose was determined by titration. |

TABLE 4

Synthetic conditions of acetylated NBK and acetylated ligno pulp

| DS | Acetic Anhydride (mol) | Potassium Carbonate (mol) | Reaction Temperature (° C.) | Reaction time (minute) |
|---|---|---|---|---|
| NBKP | | | | |
| 0.29 | 0.38 | 0 | 80 | 120 |
| 0.30 | 0.26 | 0.15 | 80 | 90 |
| 0.32 | 0.38 | 0 | 80 | 120 |
| 0.41 | 0.38 | 0.30 | 80 | 90 |
| 0.46 | 0.76 | 0 | 80 | 180 |
| 0.56 | 1.14 | 0 | 80 | 180 |
| 0.64 | 0.76 | 0 | 90 | 180 |
| 0.86 | 0.83 | 0.30 | 80 | 195 |
| 0.87 | 0.76 | 0.30 | 80 | 90 |
| 0.88 | 0.76 | 0.30 | 80 | 90 |
| 1.17 | 1.14 | 0.45 | 80 | 90 |
| 1.47 | 1.87 | 0.70 | 80 | 175 |
| 1.57 | 1.8 | 0.70 | 80 | 100 |
| 1.84 | 2.50 | 0.90 | 80 | 90 |
| 2.02 | 3.00 | 1.40 | 80 | 90 |
| 2.52 | 3.50 | 1.20 | 80 | 60 |
| 2.64 | 3.5 | 1.2 | 80 | 90 |
| Ligno pulp (NUKP) | | | | |
| 0.41 | 0.38 | 0.30 | 80 | 90 |
| 0.61 | 0.68 | 0.30 | 80 | 90 |
| 0.85 | 1.00 | 0.50 | 80 | 165 |
| Ligno pulp (GP150-1-a) | | | | |
| 0.42 | 0.36 | 0.30 | 80 | 90 |
| 0.56 | 1.14 | 0 | 85 | 180 |
| 0.97 | 1.15 | 0.60 | 80 | 180 |
| Ligno pulp (GP150-3-a) | | | | |
| 0.45 | 0.38 | 0.30 | 80 | 90 |
| 0.56 | 0.63 | 0.30 | 80 | 145 |
| 0.60 | 0.63 | 0.30 | 80 | 135 |
| 0.62 | 0.58 | 0.30 | 80 | 210 |
| 0.75 (GP150-3) | 1.33 | 0 | 80 | 240 |
| 0.95 | 1.20 | 0.60 | 80 | 90 |

(1-2) Compositing of Acetylated NBKP and Resin, or Compositing of Ligno Pulp and Resin As matrix resins, commercially available polyamide 6 (PA6, Nylon Resin produced by Unitika Ltd.), polyacetal (POM, (Iupital produced by Mitsubishi Engineering-Plastics Corporation), polypropylene (PP, Novatec PP produced by Japan Polypropylene Corporation), maleic anhydride modified polypropylene (MAPP, Toyo-Tac H1000 produced by Toyobo Co., Ltd., polylactic acid (PLA, Lacea produced by Mitsui Chemicals, Inc.), an acrylonitrile-butadiene-styrene copolymer (ABS, Kralastic produced by Nippon A&L Inc.), polystyrene (PS, PSJ polystyrene produced by PS Japan Corporation), and polyethylene (PE, Suntec, produced by Asahi Kasei Chemicals Corporation) were used.

Table 5 shows properties of each resin (MI: melt index).

Acetylated NBKP was composited with PA6, POM, PP, MAPP, PLA, ABS, PS, and PE. Acetylated ligno pulp was composited with PA6, POM, PP, and MAPP. Acetylated NBKP or acetylated ligno pulp and a resin were placed in a twin-screw extruder and melt-kneaded.

The melt-kneading temperature for PA6 was adjusted to 215° C.; that for POM, PP, MAPP, and PLA to 170° C.; that for ABS and PS to 195° C.; and that for PE to 140° C.

TABLE 5

Characteristics of each resin

| Type of resin | Melting point (° C.) | MI (g/10 min) |
|---|---|---|
| Polyamide 6 (PA6) | 222 | 300 |
| Polyacetal (POM) | 166 | 27 |
| Polypropylene (PP) | 164 | 40 |
| Maleic anhydride-modified PP (MAPP) | — | 100 |
| Polylactic acid (PLA) | 162 | 8 |
| Acrylonitrile-butadiene-styrene copolymer (ABS) | Amorphous | 29 |
| Polystyrene (PS) | Amorphous | 7-8 |
| Polyethylene (PE) | 129 | 12 |

(2) Assessment (2-1) Thermogravimetry Measurement of Acetylated NBKP

The thermal degradation properties of several types of the obtained acetylated NBKPs were evaluated by thermogravimetry. The measurement was performed in a nitrogen atmosphere in a temperature range of 110 to 600° C. and a heating rate of 10° C./min.

(2-2) Measurement of Crystallinity of Acetylated NBKP

The crystallinity of several types of acetylated NBKP and acetylated ligno pulp was calculated by wide-angle X-ray diffraction measurement.

The crystallinity was measured using X-ray as CuKc radiation at an output of 30 kV/200 mA and $2\Theta=5$ to $40°$.

(2-3) Bending Test and Izod Impact Test of Acetylated NBKP/Resin Composite Materials The obtained acetylated NBKP/resin composite materials and acetylated ligno pulp/resin composite materials were subjected to a three-point bending test. The test conditions were a bending rate of 10 mm/min and a support span of 64 mm.

The obtained acetylated NBKP/resin composite materials and acetylated ligno pulp/resin composite materials were subjected to an Izod impact test. A 2-mm-deep V notch was inserted into the central part of each test specimen, and hit with a hammer with a capacity of 2.75 J.

(2-4) Observation of the Dispersion State of Acetylated Cellulose in Acetylated NBKP/Resin Composite Materials The dispersion state of acetylated cellulose dispersed in several types of the obtained acetylated NBKP/resin composite materials was observed. The observation was performed by X-ray computed tomography (X-CT: resolution capability: 1.3 μm, represented by cubes with a size of 1 mm×1 mm×1 mm), and electron microscope (SEM) observation of fibers obtained by extracting a matrix resin in a solvent.

(3) Results and Discussion (3-1) Heat Resistance of Acetylated NBKP

Table 6 shows the 1% mass loss temperature of several types of the obtained acetylated NBKPs determined by thermogravimetric measurement.

To form a composite, melt-kneading was performed at a high setting temperature of, for example, 215° C. for PA6, and 170° C. for POM and PP. The temperature of the kneading zone of the screw is considered to be several tens of degrees higher than the setting temperature due to heat generated from shearing. Since cellulose is exposed to such conditions, the thermal weight loss characteristics of acetylated pulp are important.

When a trace of a degradation product is present as a foreign substance in the resin, the resulting composite is colored and characteristics are considered to be severely impaired. Observation of a trace weight-loss region is important. Accordingly, 1% mass loss temperature was measured.

It was found that the higher the DS, the higher the heat resistance of acetylated NBKP. That is, heat resistance in melt-kneading is imparted.

TABLE 6

| | Characteristics of acetylated NBKP | |
|---|---|---|
| DS | 1% mass loss temperature (° C.) | Crystallinity (%) |
| | NBKP | |
| 0 | 243.0 | 77.4 |
| 0.29 | — | — |
| 0.30 | — | — |
| 0.32 | — | — |
| 0.41 | — | — |
| 0.46 | 254.7 | 73.3 |
| 0.56 | 268.0 | — |
| 0.64 | 273.6 | — |
| 0.86 | — | — |
| 0.87 | — | — |
| 0.88 | 248.0 | 72.4 |
| 1.17 | 276.4 | 69.5 |
| 1.47 | — | — |
| 1.57 | — | — |
| 1.84 | 293.8 | 55.6 |
| 2.02 | — | — |
| 2.52 | 282.5 | 42.7 |
| 2.64 | — | — |

*: — means not determined.

(3-2) Crystallinity of Acetylated NBKP and Acetylated Ligno Pulp

Cellulose is a crystalline material, and reinforcement for resin is considered to greatly vary depending on the crystallinity.

Table 6 shows the crystallinity of acetylated NBKPs having different DS values.

Table 7 shows the crystallinity of acetylated ligno pulps having different DS values.

TABLE 7

| | Characteristics of acetylated ligno pulps |
|---|---|
| DS | Crystallinity (%) |
| | Ligno pulp (NUKP) |
| 0 | 78.3 |
| 0.41 | 75.0 |
| 0.61 | 76.7 |
| 0.85 | 74.4 |
| | Ligno pulp (GP150-1-a) |
| 0 | 78.7 |
| 0.42 | 75.5 |
| 0.56 | — |
| 0.97 | 73.1 |
| | Ligno pulp (GP150-3-a) |
| 0 | 83.1 |
| 0.45 | 78.8 |
| 0.56 | — |
| 0.60 | — |
| 0.62 | 78 |

TABLE 7-continued

| | Characteristics of acetylated ligno pulps |
|---|---|
| DS | Crystallinity (%) |
| 0.75 (GP150-3) | — |
| 0.95 | 75.4 |

*: — means not determined.

Table 6 shows that untreated NBKP (DS=0), which is a starting material, had a crystallinity of 77.4%. In contrast, acetylated NBKP with a DS value of 1.17 had a crystallinity of 69.5%, which is a mild reduction; whereas acetylated NBKP with a further enhanced DS value of 1.84 had a crystallinity of 55.6%, which is a sharp reduction.

In this manner, the higher the DS, the lower the crystallinity. The results confirm that when the DS value is enhanced to the range of 1.17 to 1.84 or more, the reduction in crystallinity is particularly remarkable.

Table 7 shows that NUKP had a crystallinity of 78.3%, that the crystallinity is reduced with an increase of acetylation DS value, and that acetylated NUKP at a DS of 0.85 had a crystallinity of 74.4%.

The crystallinity of GP150-1-a was 78.7%. With an increase in the DS value of acetylated GP150-1-a, crystallinity was reduced. Acetylated GP150-1-a with a DS of 0.97 had a crystallinity of 73.1%. GP150-3-a had a crystallinity of 83.1%. With an increase in the DS value of acetylated GP150-3-a, crystallinity was reduced. Acetylated GP150-3-a with a DS of 0.95 had a crystallinity of 75.4%.

Ligno pulp with a DS value of up to about 1.0 had a crystallinity similar to that of NBKP, and a reduction of crystallinity with an increase in the DS value of acetylated lingo pulp was observed.

(3-3) Bending Test and Izod Impact Test of Acetylated NBKP/Resin Composite Materials
(3-3-1) Influence of DS of Acetylated NBKP and Acetylated Ligno Pulp on Mechanical Properties The relationship between the DS and mechanical properties of each matrix resin composite material was summarized. The total amount of cellulose and hemicellulose components was adjusted to 10 mass %.

For the sake of convenience, the amount of fibers is simply indicated as 10 mass % in the tables below, regardless of whether the fibers are untreated fibers or acetylated fibers.

PA6 Matrix

Tables 8 and 9 show mechanical properties of PA6 resin (polyamide) matrix composite materials.

Table 8 shows properties of NBKP-added materials.

Table 9 shows properties of ligno pulp-added materials.

The NBKP-reinforced PA6 material (Table 8) exhibited great improvement in flexural modulus and bending strength. The acetylated NBKP-added composite material with a DS of 0.64 (No. PA6-225) had a flexural modulus of 5430 MPa, which is 2.5 times higher than that of PA6 (No. PA6) and 1.6 times higher than that of untreated NBKP-added PA6 (No. PA6-15).

The acetylated NBKP-added composite material with a DS of 0.46 (No. PA6-216) had a bending strength of 159 MPa, which is 1.8 times higher than that of neat PA6 (No. PA6) and 1.4 times higher than that of untreated NBKP-added PA6 (No. PA6-15).

With respect to the Izod impact strength, composite materials in the DS region of DS=0.46 (No. 216) to DS=0.88 (No. PA6-205) exhibited an impact resistance equivalent to that of neat PA6 (No. PA6).

The results thus show that when the PA6/NBKP composite materials have a low DS of 0.46 to 0.88, an acetylated cellulose composite material with excellent flexural modulus, bending strength, and impact resistance can be obtained.

TABLE 8

Influence of DS on mechanical properties 1-1
Mechanical properties of PA6 matrix composites
(KBKP-added)

| No. | Material composition | DS | Flexural modulus (MPa) | Bending strength (MPa) | Izod Impact strength (kJ/m$^2$) |
|---|---|---|---|---|---|
| PA6 | PA6 | 0 | 2220 | 91.2 | 3.13 |
| PA6-15 | Untreated NBKP/PA6 = 10/90 | 0 | 3450 | 117 | 2.58 |
| PA6-241 | Acetylated NBKP/PA6 = 10/90 | 0.29 | 4910 | 152 | 2.78 |
| PA6-216 | | 0.46 | 5330 | 159 | 2.94 |
| PA6-226 | | 0.56 | 5340 | 157 | 2.72 |
| PA6-225 | | 0.64 | 5430 | 154 | 2.96 |
| PA6-205 | | 0.88 | 5140 | 151 | 3.08 |
| PA6-230 | | 1.17 | 4800 | 144 | 2.85 |
| PA6-238 | | 1.84 | 3630 | 114 | 2.74 |

The ligno pulp-reinforced PA6 material (Table 9) also exhibited great improvement in flexural modulus and bending strength. Among the NUKP reinforcing materials, the acetylated NUKP-added composite material (No. PA6-263) with a DS of 0.41 had a flexural modulus of 5110 MPa, which is 2.3 times higher than that of neat PA6 (No. PA6) and 1.3 times higher than that of untreated NUKP-added PA6 (No. PA6-265).

The acetylated NUKP-added composite material with a DS of 0.41 (No. PA6-263) had a bending strength of 154 MPa, which is 1.7 times higher than that of neat PA6 (No. PA6) and 1.2 times higher than that of untreated NUKP-added PA6 (No. PA6-265). With respect to the Izod impact strength, the acetylated NUKP-added composite material with a DS of 0.41 (No. 263) exhibited an impact resistance equivalent to that of neat PA6 (No. PA6).

When a GP (150-1)-reinforced material is used, the acetylated GP (150-1)-added composite material with a DS of 0.42 (No. PA6-270) had a flexural modulus of 5000 MPa, which is 2.3 times higher than that of neat PA6 (No. PA6) and 1.3 times higher than that of untreated GP (150-1)-added PA6 (No. PA6-269).

The acetylated GP (150-1)-added composite material with a DS of 0.42 (No. PA6-270) exhibited a bending strength of 150 MPa, which is 1.7 times higher than that of neat PA6 (No. PA6) and 1.1 to 1.2 times higher than that of untreated GP (150-1)-added PA6 (No. PA6-269). With respect to Izod impact strength, the acetylated GP (150-1)-added composite material with a DS of 0.56 (No. 240) exhibited an impact resistance equivalent to that of neat PA6 (No. PA6).

Among the GP (150-3)-reinforced materials, the acetylated GP (150-3)-added composite material with a DS of 0.57 (No. PA6-237) exhibited a flexural modulus of 5380 MPa, which is 2.4 times higher than that of neat PA6 (No. PA6) and 1.4 times higher than that of untreated GP (150-3)-added PA6 (No. PA6-266).

The acetylated GP (150-3)-added composite material with a DS of 0.57 (No. PA6-237) had a bending strength of 161 MPa, which is 1.8 times higher than that of PA6 (No. PA6) and 1.3 times higher than that of untreated GP (150-3)-added PA6 (No. PA6-266). With respect to Izod impact strength, acetylated GP (150-3)-added composite material with a DS of 0.62 (No. 268) had an impact resistance equivalent to or higher than that of neat PA6 (No. PA6).

TABLE 9

Influence of DS on mechanical properties 1-2
Mechanical properties of PA6 matrix composite material
(ligno pulp-added)

| No. | Material composition | DS | Flexural modulus (MPa) | Bending strength (MPa) | Izod impact strength (kJ/m$^2$) |
|---|---|---|---|---|---|
| PA6 | PA6 | 0 | 2220 | 91.2 | 3.13 |
| PA6-265 | Untreated NUKP/PA6 = 10/90 | 0 | 3850 | 130 | 3.28 |
| PA6-263 | Acetylated NUKP/PA6 = 10/90 | 0.41 | 5110 | 154 | 3.28 |
| PA6-264 | | 0.61 | 4970 | 150 | 2.47 |
| PA6-271 | | 0.85 | 4600 | 141 | 2.12 |
| PA6-269 | Untreated GP (150-1-a)/PA6 = 10/90 | 0 | 3990 | 132 | 3.06 |
| PA6-270 | Acetylated GP (150-1-a)/PA6 = 10/90 | 0.42 | 5000 | 150 | 2.87 |
| PA6-240 | | 0.56 | 4790 | 149 | 3.09 |
| PA6-272 | | 0.97 | 4380 | 139 | 2.25 |
| PA6-266 | Untreated GP (150-3-a)/PA6 = 10/90 | 0 | 3950 | 127 | 3.60 |
| PA6-267 | Acetylated GP (150-3-a)/PA6 = 10/90 (GP150-3) | 0.45 | 5090 | 151 | 3.29 |
| PA6-268 | | 0.62 | 4990 | 149 | 3.47 |
| PA6-237 | | 0.75 | 5380 | 161 | 2.95 |
| PA6-273 | | 0.95 | 4350 | 136 | 2.15 |

POM Matrix

Table 10 shows mechanical properties of polyacetal resin (POM) matrix composite materials.

Great improvement was observed in flexural modulus and bending strength. The acetylated NBKP-added composite material (No. POM-134) with a DS of 1.17 had a flexural modulus of 5590 MPa, which is 2.5 times higher than that of neat POM (No. POM) and 1.8 times higher than that of untreated NBKP-added POM (No. POM-148).

Similarly, the acetylated NBKP-added composite material with a DS of 1.17 (No. POM-134) had a bending strength of 129 MPa, which is 1.7 times higher than that of neat POM (No. POM) and 1.4 times higher than that of untreated NBKP-added POM (No. POM-148).

The Izod impact strength of the acetylated NBKP-added composite material with a DS of 1.17 (No. POM-134) was reduced by about 1 kJ/m$^2$, compared with that of neat POM; however, the reduction was suppressed, compared with that of untreated NBKP-added POM (No. POM-148).

The acetylated ligno pulp (GP150-3)-added composite material with a DS of 0.75 (No. POM-138) had a flexural modulus of 5100 MPa, a bending strength of 128 MPa, and a high reinforcing effect. The elastic modulus was reduced by about 10%, compared with that of acetylated NBKP-added No. POM-134 with a DS of 1.17.

The results thus show that when POM matrix resin NBKP composite materials having a DS of around 1.17 are used, acetylated cellulose composite materials with excellent flexural modulus, bending strength, and impact resistance can be obtained, and high reinforcing effects of ligno pulp are also obtained.

TABLE 10

Influence of DS on mechanical properties 2
Mechanical properties of POM matrix composite materials

| No. | Material composition | DS | Flexural modulus (MPa) | Bending strength (MPa) | Izod impact strength (kJ/m$^2$) |
|---|---|---|---|---|---|
| POM | POM | 0 | 2290 | 77.7 | 5.38 |
| POM-148 | Untreated NBKP/POM = 10/90 | 0 | 3220 | 93 | 2.54 |
| POM-129 | Acetylated NBKP/POM = 10/90 | 0.46 | 5170 | 122 | 4.18 |
| POM-132 | | 0.64 | 5260 | 128 | 3.53 |
| POM-134 | | 1.17 | 5590 | 129 | 3.35 |
| POM-142 | | 1.84 | 4700 | 119 | 4.14 |
| POM-138 | Acetylated ligno pulp (GP150-3)/POM = 10/90 | 0.75 | 5100 | 128 | 3.31 |

PP Matrix

Table 11 shows mechanical properties of polypropylene (PP) matrix composite materials.

A certain enhancement was observed in flexural modulus and bending strength.

As can be seen from a comparison of neat PP (No. PP) and untreated NBKP-added material (PP-116), the degree of reinforcement of the PP matrix by cellulose is low. However, the results show that the flexural modulus and bending strength can be improved by using acetylated NBKP with a higher DS as a reinforcing material.

Further, impact resistance of the acetylated NBKP-added composite material with a DS of 0.46 (No. PP-304) was twice that of neat PP (No. PP).

The acetylated ligno pulp (GP(150-3))-added composite material with a DS of 0.6 (No. PP-450) had a flexural modulus of 2620 MPa and a bending strength of 66 MPa and exhibited reinforcing effects.

The results thus show that when highly hydrophobic PP is used as a matrix, flexural properties are enhanced by increasing the DS; and that when a composite material with a low DS of about 0.46 is used, impact resistance is enhanced and a reinforcing effect of ligno pulp is also obtained.

TABLE 11

Influence of DS on mechanical properties 3
Mechanical properties of PP resin matrix composite materials

| No. | Material composition | DS | Flexural modulus (MPa) | Bending strength (MPa) | Izod impact strength (kJ/m$^2$) |
|---|---|---|---|---|---|
| PP | PP | 0 | 2140 | 58 | 1.52 |
| PP-116 | Untreated NBKP/PP = 10/90 | 0 | 2260 | 58.4 | 1.99 |
| PP-304 | Acetylated NBKP/PP = 10/90 | 0.46 | 2460 | 60.5 | 3.05 |
| PP-367 | | 1.84 | 2670 | 66.3 | 1.91 |
| PP-381 | | 2.52 | 2800 | 67.1 | 1.98 |
| PP-450 | Acetylated GP (150-3-a)/PP = 10/90 | 0.6 | 2620 | 66.0 | 2.68 |

MAPP Matrix

Table 12 shows mechanical properties of maleic anhydride-modified PP (MAPP) matrix composite materials.

A large enhancement was observed in flexural modulus and bending strength. The acetylated NBKP-added composite material with a DS of 0.88 (No. PP-382) had a flexural modulus of 3070 MPa, which is 1.8 times the flexural modulus of neat MAPP (No. MAPP) and 1.3 times the flexural modulus of untreated MAPP (No. PP-309).

The acetylated NBKP-added composite material with a DS of 0.88 (No. PP-382) had a bending strength of 76.3 MPa, which is 1.5 times the bending strength of neat MAPP (No. MAPP) and 1.3 times the bending strength of untreated NBKP-added MAPP (No. PP-309).

The acetylated NBKP-added composite material with a DS of 0.88 (No. PP-382) exhibited an Izod impact strength equivalent to or higher than that of neat MAPP.

The acetylated ligno pulp (GP (150-3-a))-added composite material with a DS of 0.56 (No. PP-451) had a flexural modulus of 2730 MPa and a bending strength of 70.2 MPa, and exhibited a reinforcing effect.

TABLE 12

Influence of DS on mechanical properties 4
Mechanical properties of MAPP resin matrix composite materials

| No. | Material composition | DS | Flexural modulus (MPa) | Bending strength (MPa) | Izod impact strength (kJ/m$^2$) |
|---|---|---|---|---|---|
| MAPP | MAPP | 0 | 1670 | 50.2 | 1.55 |
| PP-309 | Untreated NBKP/MAPP = 10/90 | 0 | 2310 | 60.3 | 1.90 |
| PP-383 | Acetylated NBKP/MAPP = 10/90 | 0.32 | 2760 | 68.4 | 1.99 |
| PP-382 | | 0.88 | 3070 | 76.3 | 2.14 |
| PP-384 | | 1.57 | 2890 | 71.2 | 1.92 |
| PP-385 | | 2.52 | 2570 | 64 | 2.09 |
| PP-451 | Acetylated GP (150-3-a)/MAPP = 10/90 | 0.56 | 2730 | 70.2 | 2.88 |

PLA Matrix

Table 13 shows mechanical properties of polylactic acid (PLA) matrix composite materials.

A large enhancement was observed in flexural modulus and bending strength. The acetylated NBKP-added composite material with a DS of 0.88 (No. PLA-2) had a flexural modulus of 6400 MPa, which is 1.9 times the flexural modulus of neat PLA (No. PLA-5) and 1.5 times the flexural modulus of untreated NBKP-added PLA (No. PLA-6).

Similarly, the acetylated NBKP-added composite material with a DS of 0.88 (No. PLA-2) had a bending strength of 119 MPa, which is 1.1 times the bending strength of neat PLA (No. PLA-5) and 1.2 to 1.3 times the bending strength of untreated NBKP-added PLA (No. PLA-6).

The Izod impact strength of the acetylated NBKP-added composite material with a DS of 0.88 (No. PLA-2) was equivalent to or higher than that of neat PLA.

TABLE 13

Influence of DS on mechanical properties 5
Mechanical properties of PLA resin matrix composite materials

| No. | Material composition | DS | Flexural modulus (MPa) | Bending strength (MPa) | Izod impact strength (kJ/m$^2$) |
|---|---|---|---|---|---|
| PLA-5 | PLA | 0 | 3410 | 108 | 2.41 |
| PLA-6 | Untreated NBKP/PLA = 10/90 | 0 | 4250 | 95.7 | 2.81 |
| PLA-1 | Acetylated NBKP/MAPP = 10/90 | 0.32 | 5600 | 117 | 2.48 |
| PLA-2 | | 0.88 | 6400 | 119 | 2.69 |
| PLA-3 | | 1.57 | 5590 | 118 | 2.26 |
| PLA-4 | | 2.52 | 4680 | 113 | 2.59 |

ABS Matrix

Table 14 shows mechanical properties of acrylonitrile-butadiene-styrene copolymer (ABS) matrix composite materials.

A large enhancement was observed in flexural modulus and bending strength. The acetylated NBKP-added composite material (No. ABS-70) with a DS of 0.87 had a flexural modulus of 3780 MPa, which is 1.9 times the flexural modulus of neat ABS (No. ABS) and 1.4 times the flexural modulus of untreated NBKP-added ABS (No. ABS-63).

Similarly, the acetylated NBKP-added composite material with a DS of 0.87 (No. ABS-70) had a bending strength of 87.3 MPa, which is 1.4 times the bending strength of neat ABS (No. ABS) and 1.2 times the flexural modulus of untreated NBKP-added ABS (No. ABS-63).

TABLE 14

Influence of DS on mechanical properties 6
Mechanical properties of ABS resin matrix composite materials

| No. | Material composition | DS | Flexural modulus (MPa) | Bending strength (MPa) | Izod impact strength (kJ/m$^2$) |
|---|---|---|---|---|---|
| ABS | ABS | 0 | 1970 | 62.6 | 21.7 |
| ABS-63 | Untreated NBKP/ABS = 10/90 | 0 | 2730 | 71.1 | 3.39 |
| ABS-69 | Acetylated NBKP/ABS = 10/90 | 0.30 | 2950 | 75.4 | 3.41 |
| ABS-70 | | 0.87 | 3780 | 87.3 | 2.83 |
| ABS-71 | | 1.57 | 3630 | 87.6 | 2.82 |
| ABS-72 | | 2.64 | 3160 | 87.6 | 3.14 |

PS Matrix

Table 15 shows mechanical properties of PS matrix polystyrene (PS) matrix composite materials.

A large enhancement was observed in flexural modulus. The acetylated NBKP-added composite material with a DS of 0.86 (No. PS-3) had a flexural modulus of 4110 MPa, which is 1.3 to 1.4 times the flexural modulus of neat PS (No. PS) and is 1.2 times the flexural modulus of untreated PS (No. PS-1).

TABLE 15

Influence of DS on mechanical properties 7
Mechanical properties of PS resin matrix composite materials

| No. | Material composition | DS | Flexural modulus (MPa) | Bending strength (MPa) | Izod impact strength (kJ/m$^2$) |
|---|---|---|---|---|---|
| PS | PS | 0 | 3100 | 95.2 | 1.66 |
| PS-1 | Untreated NBKP/PS = 10/90 | 0 | 3530 | 28.8 | 1.78 |
| PS-2 | Acetylated NBKP/PS = 10/90 | 0.30 | 3980 | 55.6 | 2.00 |
| PS-3 | | 0.86 | 4110 | 63.7 | 2.22 |
| PS-4 | | 1.47 | 4090 | 66.3 | 1.96 |
| PS-5 | | 2.02 | 3940 | 64.6 | 1.52 |

PE Matrix

Table 16 shows mechanical properties of polyethylene (PE) matrix composite materials.

A large enhancement was observed in flexural modulus and bending strength. The acetylated NBKP-added composite material with a DS of 0.86 (No. PE-184) had a flexural modulus of 2390 MPa, which is 2.2 times the flexural modulus of neat PE (No. PE) and 1.5 times the flexural modulus of the untreated NBKP-added PE (No. PE-182).

Similarly, the acetylated NBKP-added composite material with a DS of 0.86 (No. PE-184) had a bending strength of 42.4 MPa, which is 1.8 times the bending strength of neat PE (No. PE) and 1.4 times the bending strength of untreated NBKP-added PE (No. PE-182).

TABLE 16

Influence of DS on mechanical properties 8
Mechanical properties of PE resin matrix composite materials

| No. | Material composition | DS | Flexural modulus (MPa) | Bending strength (MPa) | Izod impact strength (kJ/m$^2$) |
|---|---|---|---|---|---|
| PE | PE | 0 | 1100 | 24.0 | 3.49 |
| PE-182 | Untreated NBKP/PE = 10/90 | 0 | 1620 | 30.2 | 2.85 |
| PE-183 | Acetylated NBKP/PE = 10/90 | 0.30 | 2210 | 39.1 | 3.02 |
| PE-184 | | 0.86 | 2390 | 42.4 | 3.10 |
| PE-185 | | 1.47 | 2230 | 41.1 | 3.38 |
| PE-186 | | 2.02 | 2090 | 39.9 | 3.10 |

(3-3-2) Influence of Added Amount of Acetylated NBKP on Mechanical Properties of Composite Materials The amount of acetylated NBKP added was changed from 1 to 10 mass %. The mechanical properties of the resulting composite materials were evaluated. PA6 and POM matrix on which acetylated NBKP exhibit particularly high reinforcing effects were investigated.

PA6 Matrix

Table 17 shows mechanical properties of PA6 resin matrix composite materials.

The composite materials containing untreated NBKP in amounts of 1, 3, 5, and 10 mass % (Nos. PA6-242, PA6-243, PA6-244, and PA6-15) had an enhancement in flexural modulus of about 120, 310, 410, and 1230 MPa, respectively, as compared with neat PA6 (No. PA6). The composite materials containing acetylated NBKP in amounts of 1, 3, 5, and 10 mass % (Nos. PA6-234, PA6-235, PA6-236, and PA6-226) had a large enhancement in flexural modulus of 310, 820, 1410, and 3120 MPa, respectively.

The composite materials obtained by adding untreated NBKP in amounts of 1, 3, 5, and 10 mass % (Nos. PA6-242, PA6-243, PA6-244, and PA6-15) had an enhancement in bending strength of about 4.6, 8.3, 9.8, and 25.8 MPa, as compared with neat PA6 (No. PA6). The composite materials containing acetylated NBKP in amounts of 1, 3, 5, and 10 mass % (Nos. PA6-234, PA6-235, PA6-236, and PA6-226) had a large enhancement in bending strength of 9.8, 20.8, 33.8, and 65.8 MPa, respectively.

taining acetylated NBKP in amounts of 1, 3, 5, and 10 mass % (Nos. POM-128-1, POM-128-2, POM-128-3, and POM-129) had a large enhancement in flexural modulus of 410 to 1060, 1760, and 2880 MPa.

The materials containing untreated NBKP in amounts of 1, 3, 5, and 10 mass % (Nos. POM-149, POM-150, POM-151, and POM-148) had an improvement in bending strength of about 2.3, 6.1, 8.7, and 15.3 MPa, respectively,

TABLE 17

Influence of added amount of cellulose on mechanical properties 1
Mechanical properties of PA6 resin matrix composite materials

| No. | Material composition | Fiber amount (mass %) | Flexural modulus (MPa) | Bending strength (MPa) | Izod impact strength (kJ/m$^2$) | DS |
|---|---|---|---|---|---|---|
| PA6 | Neat PA6 | 0 | 2220 | 91.2 | 3.13 | 0 |
| PA6-242 | Untreated NBKP/PA6 = 1/99 | 1 | 2340 | 95.8 | 2.87 | |
| PA6-243 | Untreated NBKP/PA6 = 3/97 | 3 | 2530 | 99.5 | 2.42 | |
| PA6-244 | Untreated NBKP/PA6 = 5/95 | 5 | 2630 | 101 | 2.34 | |
| PA6-15 | Untreated NBKP/PA6 = 10/90 | 10 | 3450 | 117 | 2.58 | |
| PA6-234 | Ac-NBKP/PA6 = 1/99 | 1 | 2530 | 101 | 3.54 | 0.56 |
| PA6-235 | Ac-NBKP/PA6 = 3/97 | 3 | 3040 | 112 | 2.86 | |
| PA6-236 | Ac-NBKP/PA6 = 5/95 | 5 | 3630 | 125 | 2.98 | |
| PA6-226 | Ac-NBKP/PA6 = 10/90 | 10 | 5340 | 157 | 2.72 | |

POM Matrix

Table 18 shows mechanical properties of POM resin matrix composites.

The materials containing untreated NBKP in amounts of 1, 3, 5, and 10 mass % (Nos. POM-149, POM-150, POM-151, and POM-148) had an enhancement in flexural modulus of about 80, 310, 450, and 930 MPa, respectively, as compared with neat POM (No. POM). The materials conas compared with neat POM (No. POM). The materials containing acetylated NBKP in amounts of 1, 3, 5, and 10 mass % (Nos. POM-128-1, POM-128-2, POM-128-3, and POM-129) had a large enhancement in bending strength of 12.5, 28.3, 39.3, and 44.3 MPa.

The acetylated NBKP-added materials also had higher impact resistance than untreated NBKP-added materials.

TABLE 18

Influence of added amount of cellulose on mechanical properties 2
Mechanical properties of POM resin matrix composite materials

| No. | Material composition | Fiber amount (mass %) | Flexural modulus (MPa) | Bending strength (MPa) | Izod impact strength (kJ/m$^2$) | DS |
|---|---|---|---|---|---|---|
| POM | Neat POM | 0 | 2290 | 77.7 | 5.38 | 0 |
| POM149 | Untreated NBKP/POM = 1/99 | 1 | 2370 | 79.3 | 4.41 | |
| POM150 | Untreated NBKP/POM = 3/97 | 3 | 2600 | 83.8 | 3.85 | |
| POM151 | Untreated NBKP/POM = 5/95 | 5 | 2740 | 86.4 | 3.32 | |
| POM-148 | Untreated NBKP/POM = 10/90 | 10 | 3220 | 93 | 2.54 | |

TABLE 18-continued

Influence of added amount of cellulose on mechanical properties 2
Mechanical properties of POM resin matrix composite materials

| No. | Material composition | Fiber amount (mass %) | Flexural modulus (MPa) | Bending strength (MPa) | Izod impact strength (kJ/m$^2$) | DS |
|---|---|---|---|---|---|---|
| POM-128-1 | Ac-NBKP/POM = 1/99 | 1 | 2700 | 90.2 | 4.55 | 0.41 |
| POM-128-2 | Ac-NBKP/POM = 3/97 | 3 | 3350 | 106 | 4.4 | |
| POM-128-3 | Ac-NBKP/POM = 5/95 | 5 | 4050 | 117 | 4.47 | |
| POM-129 | Ac-NBKP/POM = 10/90 | 10 | 5170 | 122 | 4.18 | 0.46 |

The above results of PA6 and POM clearly show that these acetylated NBKP reinforced composite materials are excellent materials, compared with conventional cellulose composite materials; and that adding a trace of acetylated NBKP can efficiently reinforce the resin.

(3-3-3) Influence of the Number of Times of Kneading Acetylated NBKP/Resin Composite Materials on Mechanical Properties The recyclability of acetylated cellulose materials was evaluated. Using PA6 and POM matrices on which acetylated NBKP has a particularly high reinforcing effect, physical property changes by repeated molding (number of times of kneading) were measured.

PA6 Matrix

Table 19 shows mechanical properties of PA6 resin matrix composite materials.

The kneading was performed at 215° C. twice.

The flexural modulus after the first kneading (No. PA6-220-1) was 5120 MPa. The flexural modulus after the second kneading (No. PA6-220-2) was reduced to 4780 MPa. Thus, the reduction was 6.60%, which is equivalent to that of 30 mass % glass fiber-reinforced PA 6 produced by Toray Industries, Inc.

The flexural modulus after the first kneading (No. PA6-220-1) was 154 MPa. The flexural modulus after the second kneading (No. PA6-220-2) was reduced to 150 MPa. Thus, the reduction was 2.60%, which is smaller than the flexural modulus reduction of about 5% of the 30 mass % glass fiber-reinforced PA 6 produced by Toray Industries, Inc.

The Izod impact strength after the first kneading (No. PA6-220-1) was 3.41 kJ/m$^2$. The Izod impact strength after the second kneading (No. PA6-220-2) was 3.60 kJ/m$^2$. Thus, no large changes were observed. The reduction in the Izod impact strength of 30 mass % glass fiber-reinforced PA6 manufactured by Toray Industries, Inc. was about 20%.

However, since the new raw material has excellent impact resistance, a comparison cannot be made.

TABLE 19

Influence of repeated molding of acetylated cellulose-added composite material on mechanical properties 1
Mechanical properties of PA6 resin matrix composite materials

| No. | Material composition | Number of times of kneading Times | Flexural modulus MPa | Reduction (%) | Bending strength MPa | Reduction (%) | Izod impact strength kJ/m$^2$ | Reduction (%) | DS |
|---|---|---|---|---|---|---|---|---|---|
| PA6 | Neat PA6 | 0 | 2220 | — | 91.2 | — | 3.13 | — | 0 |
| PA6-15 | NBKP/PA6 = 10/90 | 1 | 3450 | | 117 | | 2.58 | | |
| PA6-220-1 | Ac-NBKP/PA6 = 10/90 | 1 | 5120 | — | 154 | — | 3.41 | — | 0.46 |
| PA6-220-2 | | 2 | 4780 | −6.60% | 150 | −2.60 | 3.60 | +5.57 | |

POM Matrix

Table 20 shows mechanical properties of POM resin matrix composite materials.

The kneading was performed at 170° C. three times.

The flexural modulus after the first kneading (No. POM129) was 5170 MPa. The flexural modulus after the second kneading (No. POM130) was 5270 MPa. The flexural modulus after the third kneading (No. POM131) was 5290 MPa. The enhancement of the flexural modulus from the first kneading to the second kneading and the enhancement from the first kneading to the third kneading were both about 2%.

The bending strength after the first kneading (No. POM129) was 122 MPa. The bending strength after the second kneading (No. POM130) was 117 MPa. The bending strength after the third kneading (No. POM131) was 120 MPa. Thus, the bending strength was constant.

The Izod impact strength after the first kneading (POM129) was 4.18 kJ/m². The Izod impact strength after the second kneading (No. POM130) was 4.70 kJ/m². The Izod impact strength after the third kneading (No. POM131) increased to 4.95 kJ/m². The Izod impact strength was thus enhanced so that the Izod impact strength after the third kneading was equivalent to that of neat POM (No. POM).

PA6 Matrix

Figure 3:
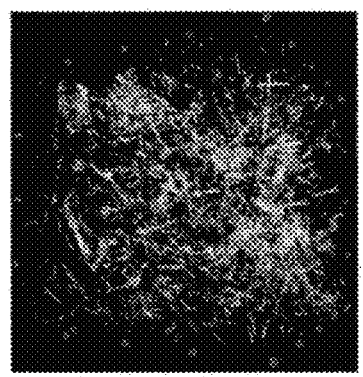
FIG. 3 shows an X-CT image of untreated NBKP-added PA6 (No. PA6-15).
Figure 4:
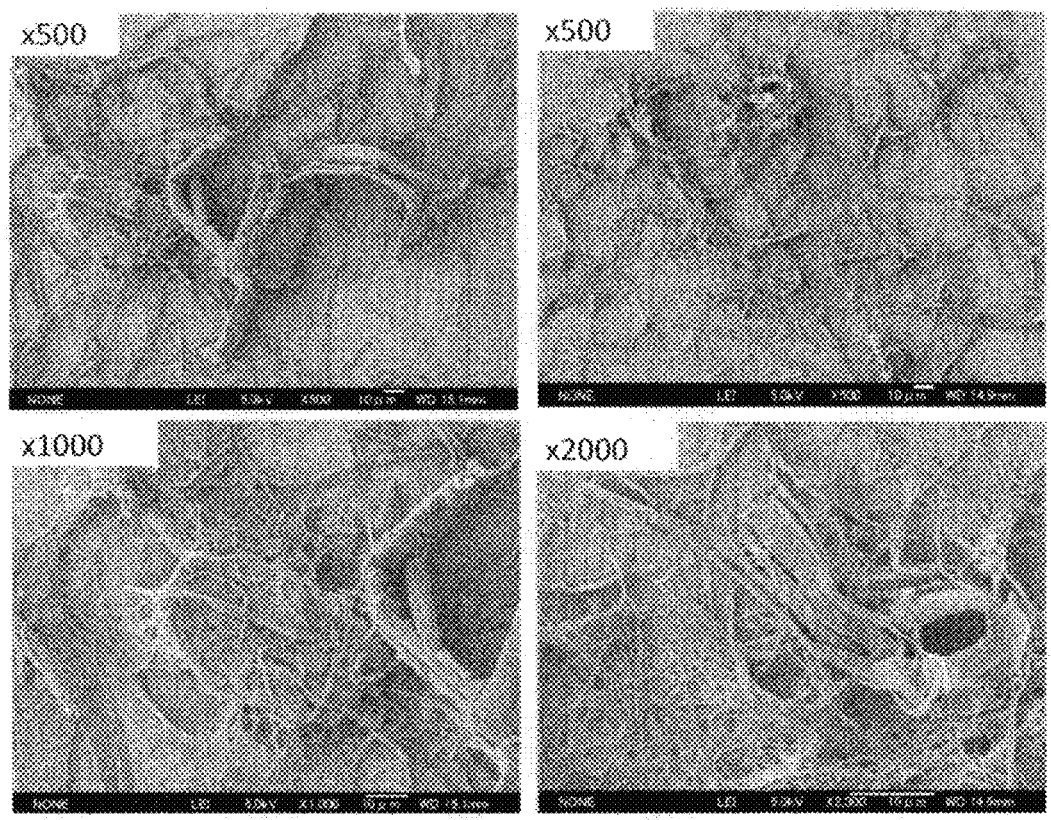
FIG. 4 shows SEM photographs of cellulose obtained by extracting PA 6 from untreated NBKP-added PA6 (No. PA6-15).

FIG. 3 shows an X-CT image of untreated NBKP-added PA6 (No. PA6-15). FIG. 4 shows SEM photographs of cellulose obtained by extracting PA6 from untreated NBKP-added PA6.

Figure 5:
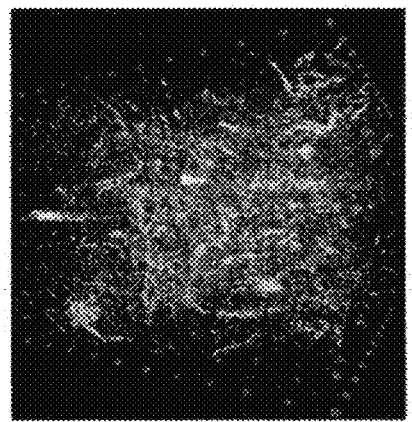
FIG. 5 shows an X-CT image of acetylated NBKP-added PA6 (No. PA6-216).
Figure 6:
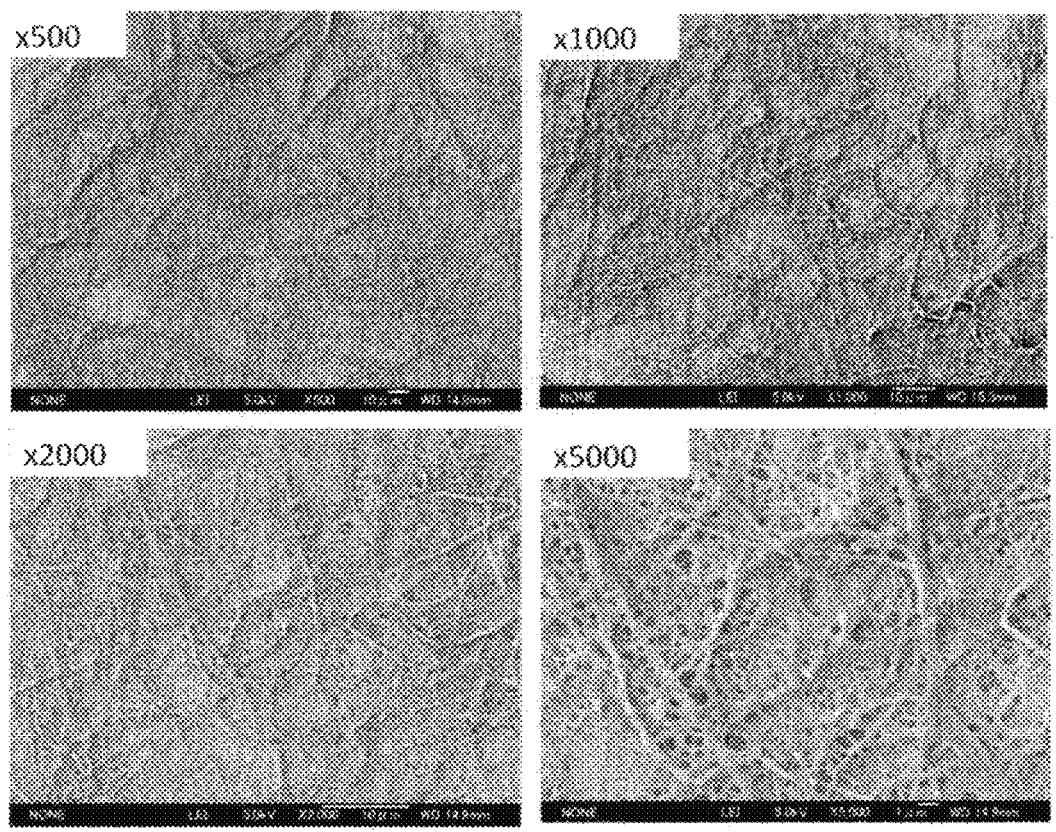
FIG. 6 shows SEM photographs of cellulose obtained by extracting PA 6 from acetylated NBKP-added PA6 (No. PA6-216).

FIG. 5 shows an X-CT image of acetylated NBKP-added PA6 (NO. PA6-216). FIG. 6 shows SEM photographs of

TABLE 20

Influence of repeated molding of acetylated cellulose-added composite material on mechanical properties 2
Mechanical properties of POM resin matrix composite materials

| Material No. | Material composition | Number of times of kneading Times | Flexural modulus MPa | Reduction | Bending strength MPa | Reduction (%) | Izod impact strength kJ/m² | Reduction (%) | DS |
|---|---|---|---|---|---|---|---|---|---|
| POM | Neat POM | 0 | 2290 | — | 77.7 | — | 5.38 | — | 0 |
| POM-148 | NBKP/POM = 10/90 | 1 | 3220 | | 93 | | 2.54 | | |
| POM129 | Ac-NBKP/POM = 10/90 | 1 | 5170 | — | 122 | — | 4.18 | — | 0.46 |
| POM130 | | 2 | 5270 | +1.93 | 117 | −4.10 | 4.70 | +12.4 | |
| POM131 | | 3 | 5290 | +2.32 | 120 | −1.64 | 4.95 | +18.4 | |

The above results of PA6 and POM provide information on recyclability of acetylated NBKP.

The PA6 matrix has a high kneading temperature. Therefore, repeated molding (e.g., melt-kneading) deteriorates the heat resistance of acetylated NBKP, although acetylated NBKP has enhanced heat resistance compared with usual NBKP.

In contrast, the POM matrix has a low kneading temperature. Therefore, acetylated NBKP with enhanced heat resistance barely deteriorates, and repeated molding rather enhances defibration properties, which presumably leads to enhanced flexural modulus and impact resistance.

Composite materials of glass fibers (GF) and carbon fibers (CF), which are general-purpose reinforcing fibers, with a resin are such that fibers may be broken or shortened during recycling processing. Therefore, such composite materials can generally only be used for cascade recycling (use as low-grade waste).

In contrast, when the acetylated cellulose fibers of the present invention are used with a low-melting-point resin material, such as polypropylene, polyethylene, polystyrene, ABS, or a thermoplastic elastomer, which have a melting point lower than or as low as the molding temperature range for POM or the like, the acetylated cellulose fibers of the present invention are considered to be used as a material with excellent recyclability that can endure repeated molding processing.

(3-4) Observation of Dispersed State of Acetylated Cellulose

FIG. 1 shows SEM photographs of NBKP used as a raw material.

Figure 2:
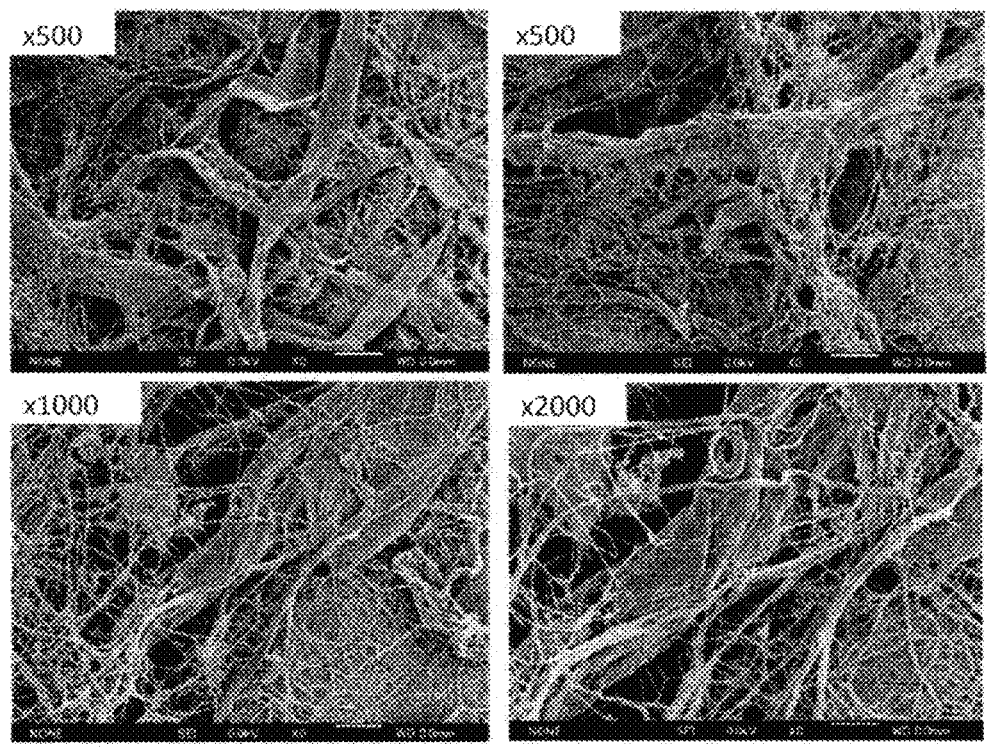
FIG. 2 shows SEM photographs of acetylated NBKP (DS=0.88).

FIG. 2 shows SEM photographs of acetylated NBKP (DS=0.88) obtained by acetylating NBKP as a raw material.

When NBKP is used, many fibers with a coarse fiber diameter of several tens to several hundreds of micrometers are sporadically observed, although fibers with a submicron-order diameter are also observed.

The defibration of acetylated NBKP advanced more than the defibration of NBKP; however, coarse fibers with a fiber diameter of several tens of micrometers or more are present.

cellulose obtained by extracting PA6 from the acetylated NBKP-added PA6.

In the X-CT image, the contour of acetylated cellulose fibers present on the order of micrometers, rather than untreated NBKP, is blurred, and the dispersion of white haze fibers of a size equal to the resolution (1.3 μm) is observed in great abundance. Cellulose with a size of 1.3 μm or less cannot be confirmed by X-CT.

In the SEM photograph of untreated NBKP-added PA6 (No. PA6-15), many fibers with a thickness of several tens of micrometers are observed, whereas cellulose on the order of submicrons or several tens of nanometers is barely observed.

In contrast, when acetylated NBKP-added PA6 (No. PA6-216) was used, most of the cellulose was dispersed as acetylated CNFs with a thickness of several tens to several hundreds of nanometers, although cellulose of about 3 μm was intermittently observed.

POM Matrix

Since the difference in density between POM and cellulose is small, the difference in contrast therebetween is small in X-CT photographing, which makes it difficult to identify cellulose.

Therefore, only SEM observation was performed.

Figure 7:
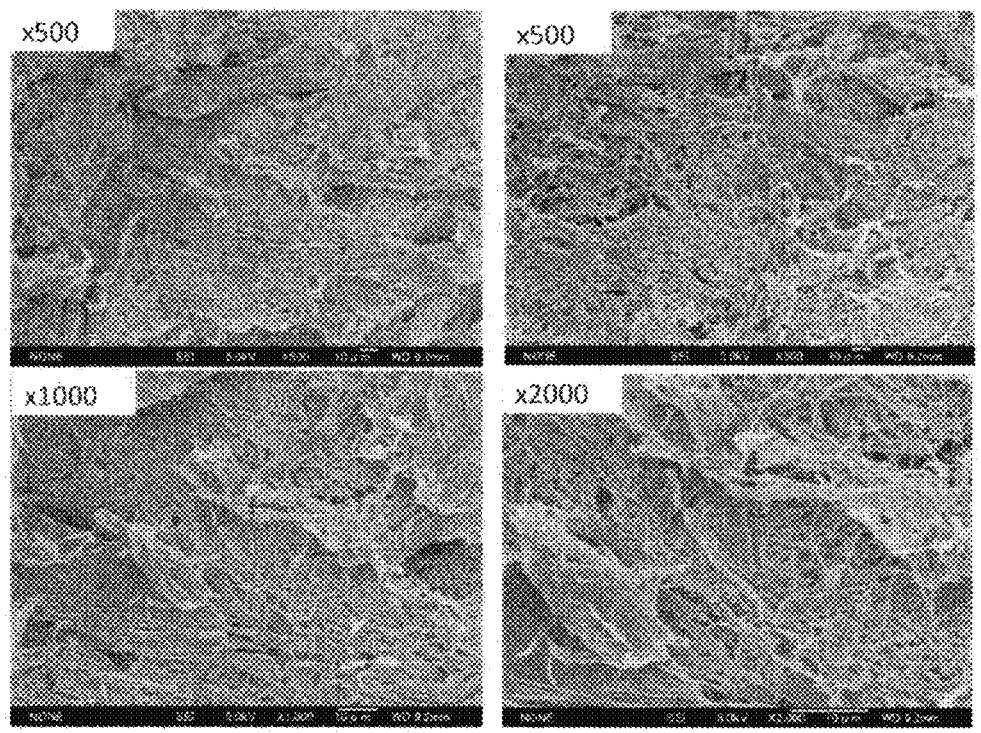
FIG. 7 shows SEM photographs of cellulose obtained by extracting untreated NBKP-added POM (No. POM-148).

FIG. 7 shows SEM photographs of cellulose obtained by extracting POM from untreated NBKP-added POM (No. POM-148).

Figure 8:
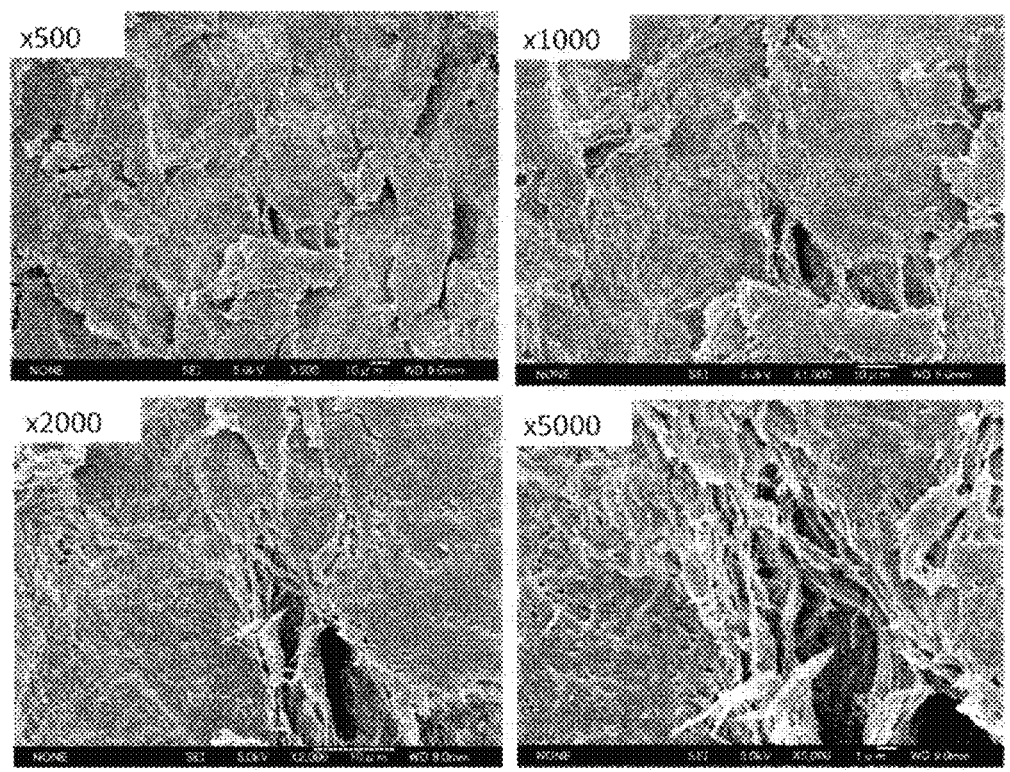
FIG. 8 shows SEM photographs of cellulose obtained by extracting POM from acetylated NBKP-added POM (No. POM-134).

FIG. 8 shows SEM photographs of cellulose obtained by extracting POM from acetylated NBKP-added POM (No. POM-134).

When the untreated NBKP-added POM (No. POM-148) was used, many coarse, fibrous masses with a size of several tens of micrometers or more were observed in the extract.

In contrast, when acetylated NBKP-added POM (No. POM-134, DS=1.17) was used, an extract in which the resin swelled in the form of a gel, rather than in the form of fibers, was obtained. The observation photograph actually shows a resin-like configuration, and POM was not completely extracted.

This is presumably because it becomes difficult to extract POM from the fibers due to the interaction of many acetyl groups present on the cellulose surface with POM. An amplification observation of the crack portion of the extract shows that fine fibers of a size equivalent to or smaller than the acetylated NBKP-added PA6 (No. PA6-216) were present.

Figure 9:
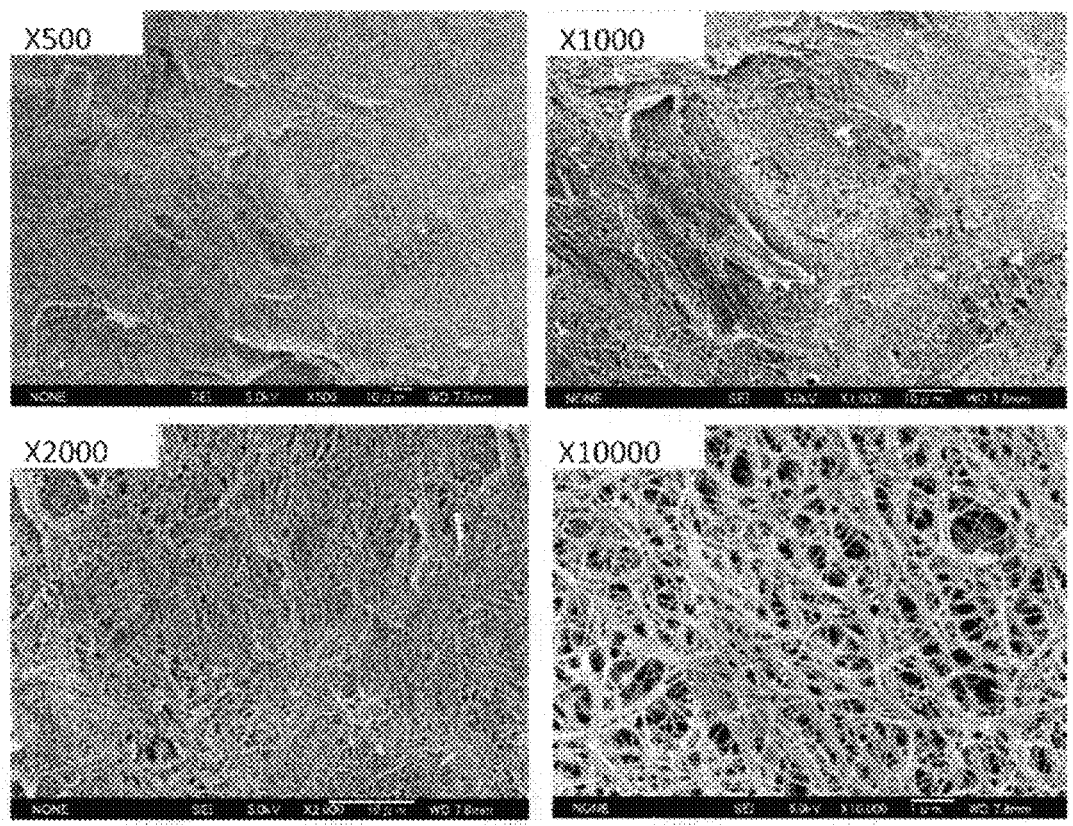
FIG. 9 shows SEM photographs of cellulose obtained by extracting POM acetylated NBKP-added POM (No. POM-129) with a low DS (DS=0.46).

FIG. 9 shows SEM photographs of cellulose obtained by extracting POM from acetylated NBKP-added POM having a low DS (DS=0.46) (No. POM-129).

In this case, POM was extracted almost completely. The compatibility of acetylated NBKP and POM can be determined to not be particularly high.

Figure 10:
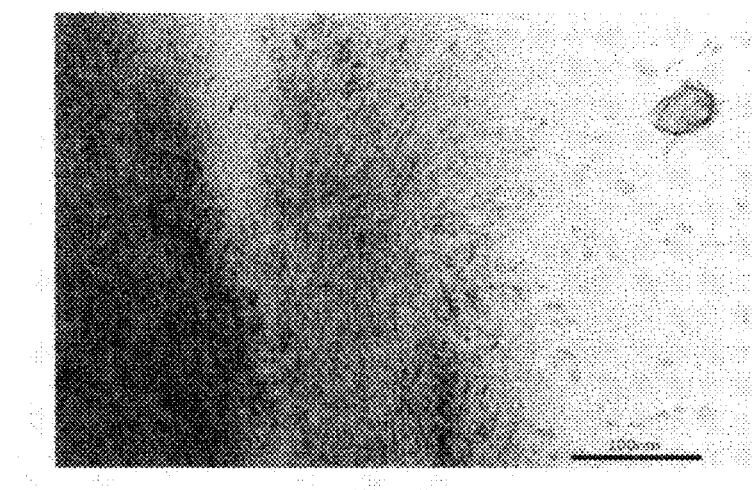
FIG. 10 shows a transmission electron microscope photograph of acetylated NBKP-added POM (No. POM-128) with a low DS (DS=0.40).

FIG. 10 shows a transmission electron microscope photograph of acetylated NBKP-added POM (No. POM-128) having a low DS (DS=0.40). The compatibility of such acetylated NBKP with POM is considered to not be particularly as high as that of acetylated NBKP having a DS of 1.17.

However, even when NBKP having a low DS of 0.40 was used, the state in which bundles of cellulose fibers were impregnated with POM was observed, and the fiber diameter was several nanometers.

PP Matrix

Figure 11:
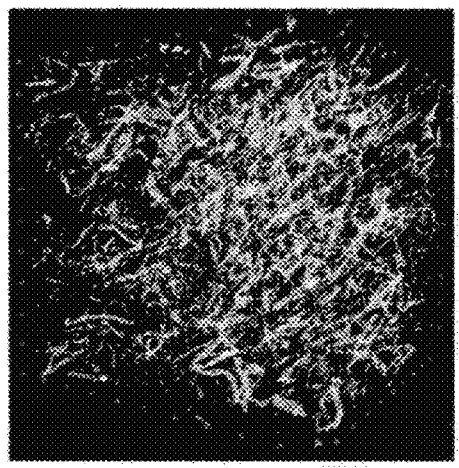
FIG. 11 shows an X-CT image of untreated NBKP-added PP (No. PP-116).

FIG. 11 shows an X-CT image of untreated NBKP-added PP (No. PP-116).

Figure 12:
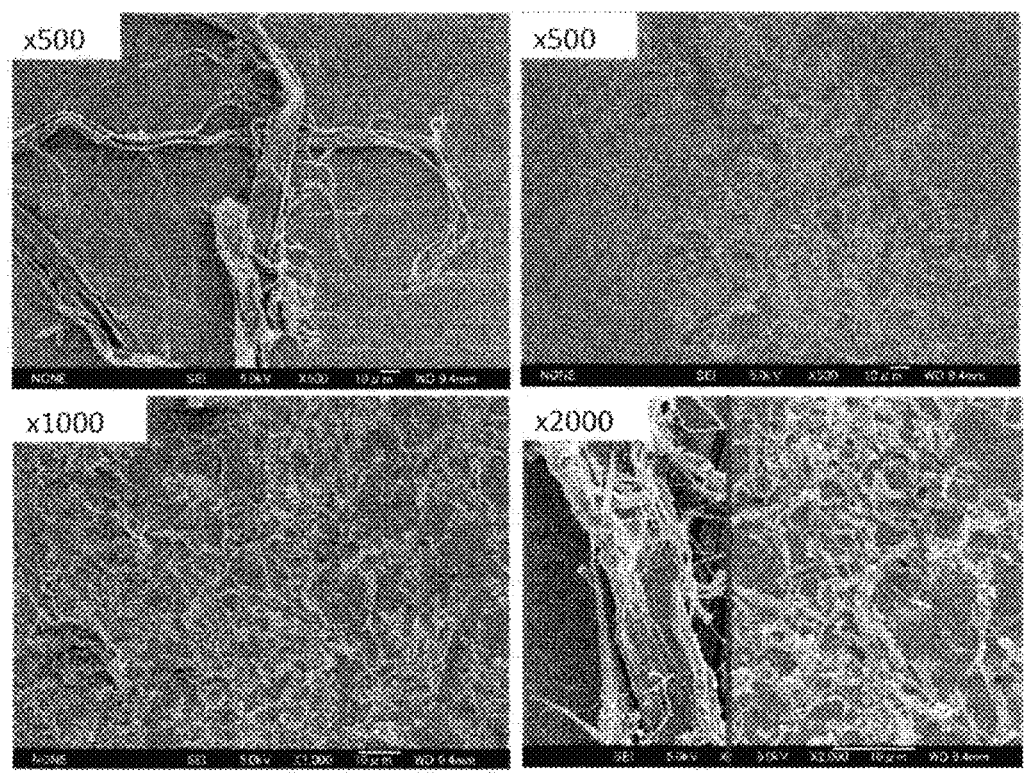
FIG. 12 shows SEM photographs of cellulose obtained by extracting PP from untreated NBKP-added PP (No. PP-116).

FIG. 12 shows SEM photographs of cellulose obtained by extracting PP from the untreated NBKP-added PP.

Figure 13:
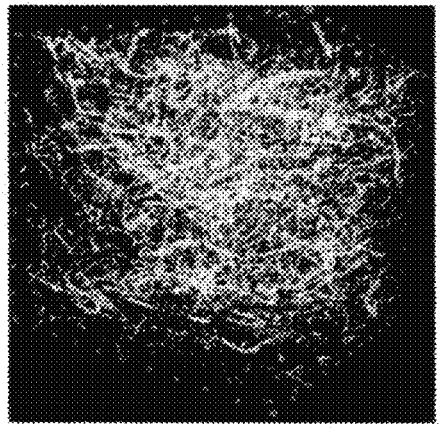
FIG. 13 shows an X-CT image of acetylated NBKP-added PP (No. PP-367).

FIG. 13 shows an X-CT image of acetylated NBKP-added PP having a high DS (DS=1.84) (No. PP-367).

Figure 14:
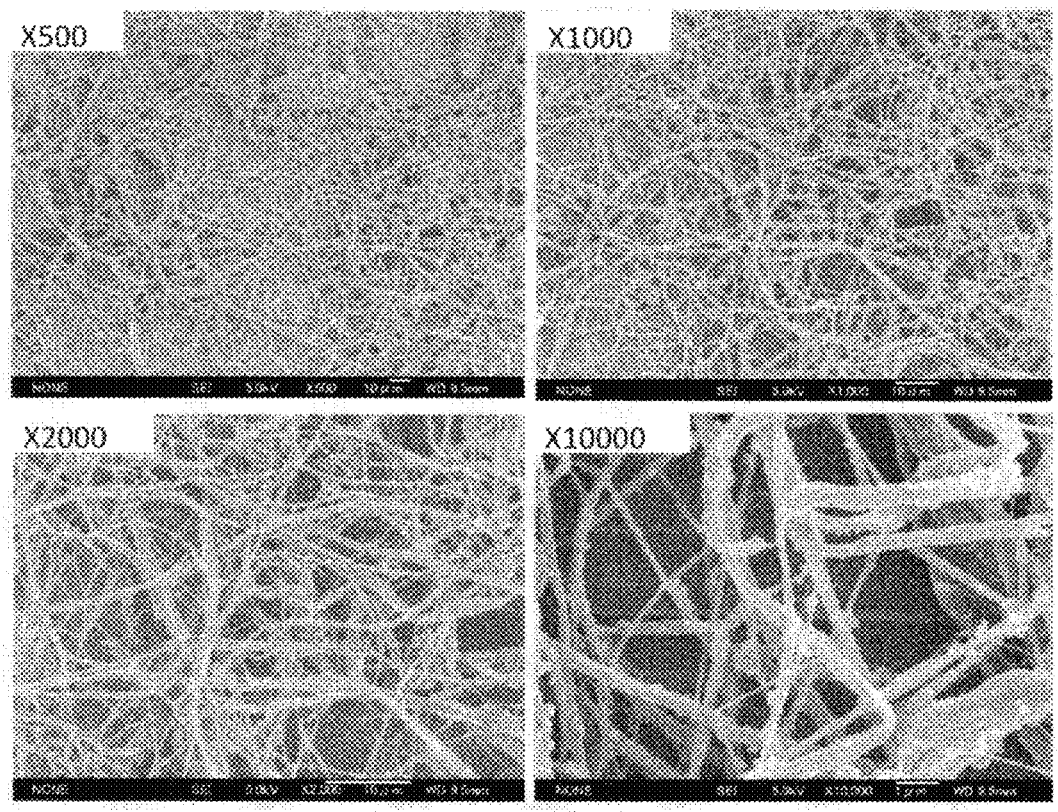
FIG. 14 shows SEM photographs of cellulose obtained by extracting PP from acetylated NBKP-added PP (No. PP-367).

FIG. 14 shows SEM photographs of cellulose obtained by extracting PP from acetylated NBKP-added PP.

The X-CT image shows that the contour of acetylated cellulose fiber present on the order of micrometers, rather than untreated NBKP, is blurred, and finer cellulose was dispersed.

The SEM photographs show that in untreated NBKP-added PP (No. PP-116), coarse fibers with a size of several tens of micrometers and fibers with a size of several micrometers that were in the process of defibration were present. However, the fiber length of the fibers in the process of defibration was significantly reduced, and short fibers were formed.

Figure 15:
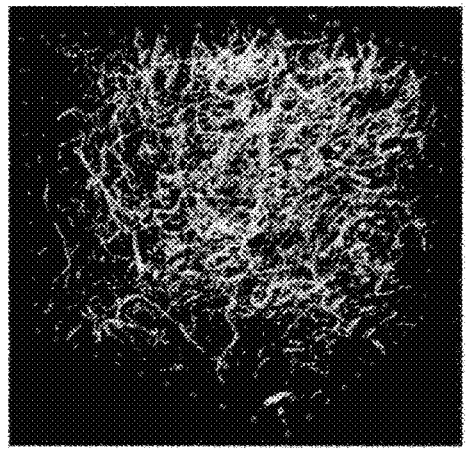
FIG. 15 shows an X-CT image of acetylated NBKP-added PP (No. PP-304) with a low DS (DS=0.46).
Figure 16:
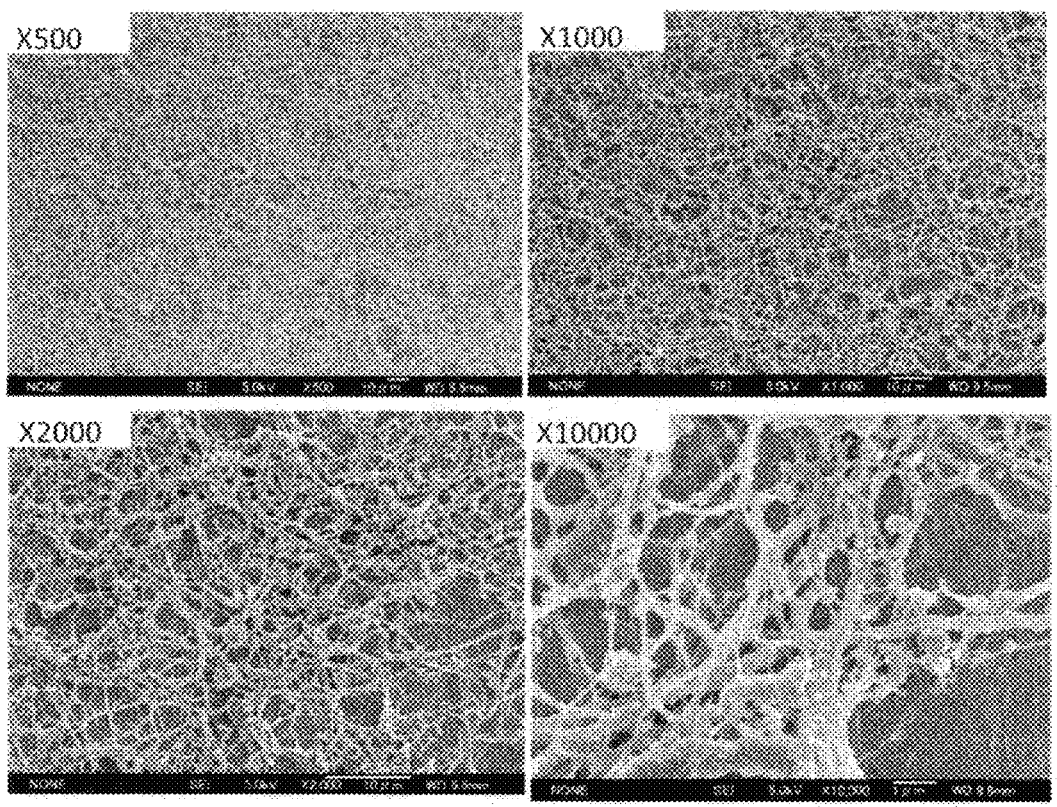
FIG. 16 is an SEM photograph of cellulose obtained by extracting PP from acetylated NBKP-added PP (No. PP-304) with a low DS (DS=0.46).

FIG. 15 shows an X-CT image of acetylated NBKP-added PP having a low DS (DS=0.46) (No. PP-304). FIG. 16 shows an SEM photograph of cellulose obtained by extracting PP from the acetylated NBKP-added PP having a low DS.

When acetylated NBKP-added PP having a high DS (DS=1.84) (No. PP-367) was used, fibers of about several hundreds of nanometers to about 1 micrometer accounted for a large proportion thereof. From observation, the fiber length of the acetylated NBKP-added PP was significantly longer than the fiber length of untreated NBKP-added PP (No. PP-116) or acetylated NBKP-added PP having a low DS (DS=0.46) (No. PP-304) shown in FIGS. 15 and 16.

It can be concluded from the above results that, as compared with untreated NBKP, acetylated NBKP can be easily defibrated by a shear force during melt-kneading with a twin screw extruder, and dispersed at a nanometer scale in the resin; and that the dispersion size partially reaches the molecular composite material region.

The results further show that when highly hydrophobic PP is used to form a composite, a higher degree of acetylation (DS) and increased hydrophobicity can improve physical properties. The results suggest that higher compatibility enhances defibration in the melt-kneading step, and prevents breakage of fibers.

(3-5) Compatibility of Acetylated Cellulose and Resin Material

Tables 21 to 33 show the general overviews of acetylated cellulose-added resin composite materials.

The tables show DS, solubility parameter (SP), and crystallinity of each acetylated cellulose, and the peak region of flexural properties of each resin. Further, the SP of each resin is also shown.

In Tables 21 to 28, the relationship between DS (x) and SP (y) of acetylated NBKP is y=−2.3x+15.7.

The SP value of acetylated cellulose was calculated by linear approximation from the SP value of cellulose and SP value of diacetylated cellulose disclosed in the literature.

Crystallinity was determined by compressing each cellulose into tablets, and calculating the crystallinity by a wide-angle X-ray scattering method. For the SP value of each resin, "Jitsuyo Polymer Alloy Sekkei" ("Practical Design of Polymer Alloys") written by Fumio Ide, Kogyo Chosakai Publishing, Inc., first edition, published on Sep. 1, 1996, was cited.

When the literature describes the SP of a resin as a range of SP values, the average of the upper and lower limit values is used as the SP of the resin, and the above relationship between the DS (x) and SP (y) of the AcCNF was obtained.

For the SP of resins not disclosed in the above literature (authored by Fumio Ide) (SP of MAPP), calculation was made according to the Fedors method (Robert F. Fedors, Polymer Engineering and Science, February 1974, vol. 14, No. 2, 147-154) to obtain the SP. Further, as the SP value of PLA, the SP value disclosed in JP2011-231285A was used.

Tables 25 to 28 show index values of the physical property values shown in Tables 21 to 24, based on the values of the unmodified NBKP-resin composition.

Tables 29 to 31 show the SP values of acetylated ligno pulps obtained by calculation in accordance with the Fedors method (Robert F. Fedors, Polymer Engineering and Science, February 1974, vol. 14, No. 2, 147-154) (see the "SP value calculation method of acetylated ligno pulp (LP)" described above).

Table 31 shows index values of numerical values of the PA6-reinforcing materials shown in Table 29, based on the values of the unmodified ligno pulp-resin composition.

Table 32 summarizes Tables 25 to 28.

Table 33 summarizes Table 31.

TABLE 21

DS, SP, and physical property values of PA6 and POM matrix materials/NBKP

| Acetylated NBKP | | | | Matrix: PA6 (SP = 12.2) | | | | Matrix: POM (SP = 11.1) | | | |
| --- | --- | --- | --- | --- | --- | --- | --- | --- | --- | --- | --- |
| DS | SP | Crystallinity (%) | Fiber state | SP of AcCNF/ SP of resin | Flexural modulus (MPa) | Bending strength (MPa) | Izod impact strength (kJ/m²) | SP of AcCNF/ SP of resin | Flexural modulus (MPa) | Bending strength (MPa) | Izod impact strength (kJ/m²) |
| 0 | 15.7 | 77.4 | Low DS, | 1.29 | 3450 | 117 | 2.58 | 1.41 | 3220 | 93 | 2.54 |
| 0.29 | 15.0 | 74.7 | High | 1.23 | 4910 | 152 | 2.78 | 1.35 | — | — | — |
| 0.30 | 15.0 | — | crystallinity | 1.23 | — | — | — | 1.35 | — | — | — |
| 0.32 | 15.0 | — | | 1.23 | — | — | — | 1.35 | — | — | — |
| 0.41 | 14.8 | — | | 1.21 | — | — | — | 1.33 | — | — | — |

TABLE 21-continued

DS, SP, and physical property values of PA6 and POM matrix materials/NBKP

| | | | | Matrix: PA6 (SP = 12.2) | | | | Matrix: POM (SP = 11.1) | | | |
|---|---|---|---|---|---|---|---|---|---|---|---|
| | Acetylated NBKP | | | SP of AcCNF/ | Flexural | Bending | Izod impact | SP of AcCNF/ | Flexural | Bending | Izod impact |
| DS | SP | Crystallinity (%) | Fiber state | SP of resin | modulus (MPa) | strength (MPa) | strength (kJ/m$^2$) | SP of resin | modulus (MPa) | strength (MPa) | strength (kJ/m$^2$) |
| 0.46 | 14.6 | 73.3 | | 1.20 | 5330 | 159 | 2.94 | 1.32 | 5170 | 122 | 4.18 |
| 0.56 | 14.4 | 73.2 | Intermediate | 1.18 | 5340 | 157 | 2.72 | 1.30 | — | — | — |
| 0.64 | 14.2 | 73.1 | DS, | 1.17 | 5430 | 154 | 2.96 | 1.28 | 5260 | 128 | 3.53 |
| 0.86 | 13.7 | — | High | 1.12 | — | — | — | 1.23 | — | — | — |
| 0.87 | 13.7 | — | crystallinity | 1.12 | — | — | — | 1.23 | — | — | — |
| 0.88 | 13.7 | 72.1 | | 1.12 | 5140 | 151 | 3.08 | 1.23 | — | — | — |
| 1.17 | 13.0 | 69.5 | High DS, | 1.07 | 4800 | 144 | 2.85 | 1.17 | 5590 | 129 | 3.35 |
| 1.47 | 12.3 | — | Intermediate | 1.01 | — | — | — | 1.11 | — | — | — |
| 1.57 | 12.1 | — | crystallinity | 0.99 | — | — | — | 1.09 | — | — | — |
| 1.84 | 11.5 | 55.6 | High DS, | 0.94 | 3630 | 114 | 2.74 | 1.03 | 4700 | 119 | 4.14 |
| 2.02 | 11.1 | — | Low | 0.91 | — | — | — | 1.00 | — | — | — |
| 2.52 | 9.9 | 42.7 | crystallinity | 0.81 | — | — | — | 0.89 | — | — | — |
| 2.64 | 9.6 | — | | 0.79 | — | — | — | 0.86 | — | — | — |

TABLE 22

DS, SP, and physical property values of PP and MAPP matrix materials/NBKP

| | | | | Matrix: PP (SP = 8.1) | | | | Matrix: MAPP (SP = 8.2) | | | |
|---|---|---|---|---|---|---|---|---|---|---|---|
| | Acetylated NBKP | | | SP of AcCNF/ | Flexural | Bending | Izod impact | SP of AcCNF/ | Flexural | Bending | Izod impact |
| DS | SP | Crystallinity (%) | Fiber state | SP of resin | modulus (MPa) | strength (MPa) | strength (kJ/m$^2$) | SP of resin | modulus (MPa) | strength (MPa) | strength (kJ/m$^2$) |
| 0 | 15.7 | 77.4 | Low DS, | 1.94 | 2260 | 58.4 | 1.99 | 1.91 | 2310 | 60.3 | 1.90 |
| 0.29 | 15.0 | 74.7 | High | 1.86 | — | — | — | 1.83 | — | — | — |
| 0.30 | 15.0 | — | crystallinity | 1.86 | — | — | — | 1.83 | — | — | — |
| 0.32 | 15.0 | | | 1.85 | — | — | — | 1.82 | 2760 | 68.4 | 1.99 |
| 0.41 | 14.8 | — | | 1.83 | — | — | — | 1.80 | — | — | — |
| 0.46 | 14.6 | 73.3 | | 1.81 | 2460 | 60.5 | 3.05 | 1.79 | — | — | — |
| 0.56 | 14.4 | 73.2 | Intermediate | 1.78 | — | — | — | 1.76 | — | — | — |
| 0.64 | 14.2 | 73.1 | DS, High | 1.76 | — | — | — | 1.74 | — | — | — |
| 0.86 | 13.7 | — | crystallinity | 1.69 | — | — | — | 1.67 | — | — | — |
| 0.87 | 13.7 | — | | 1.69 | — | — | — | 1.67 | — | — | — |
| 0.88 | 13.7 | 72.1 | | 1.69 | — | — | — | 1.67 | 3070 | 76.3 | 2.14 |
| 1.17 | 13.0 | 69.5 | High DS, | 1.61 | — | — | — | 1.59 | — | — | — |
| 1.47 | 12.3 | — | Intermediate | 1.52 | — | — | — | 1.50 | — | — | — |
| 1.57 | 12.1 | — | crystallinity | 1.49 | — | — | — | 1.47 | 2890 | 71.2 | 1.92 |
| 1.84 | 11.5 | 55.6 | High DS, | 1.42 | 2670 | 66.3 | 1.91 | 1.40 | — | — | — |
| 2.02 | 11.1 | — | Low | 1.37 | — | — | — | 1.35 | — | — | — |
| 2.52 | 9.9 | 42.7 | crystallinity | 1.22 | 2800 | 67.10 | 1.98 | 1.21 | 2570 | 64.00 | 2.09 |
| 2.64 | 9.6 | — | | 1.19 | — | — | — | 1.17 | — | — | — |

TABLE 23

DS, SP, and physical property values of PLA and ABS matrix materials/NBKP

| | | | | Matrix: PLA (SP = 11.4) | | | | Matrix: ABS (SP: undetermined) | | | |
|---|---|---|---|---|---|---|---|---|---|---|---|
| | Acetylated NBKP | | | SP of AcCNF/ | Flexural | Bending | Izod impact | SP of AcCNF/ | Flexural | Bending | Izod impact |
| DS | SP | Crystallinity (%) | Fiber state | SP of resin | modulus (MPa) | strength (MPa) | strength (kJ/m$^2$) | SP of resin | modulus (MPa) | strength (MPa) | strength (kJ/m$^2$) |
| 0 | 15.7 | 77.4 | Low DS, | 1.38 | 4250 | 95.7 | 2.81 | — | 2730 | 71.1 | 3.39 |
| 0.29 | 15.0 | 74.7 | High | 1.32 | — | — | — | — | — | — | — |
| 0.30 | 15.0 | — | crystallinity | 1.32 | — | — | — | — | 2950 | 75.4 | 3.41 |
| 0.32 | 15.0 | — | | 1.32 | 5600 | 117 | 2.48 | — | — | — | — |

TABLE 23-continued

DS, SP, and physical property values of PLA and ABS matrix materials/NBKP

| | Acetylated NBKP | | | Matrix: PLA (SP = 11.4) | | | | Matrix: ABS (SP: undetermined) | | | |
|---|---|---|---|---|---|---|---|---|---|---|---|
| DS | SP | Crystallinity (%) | Fiber state | SP of AcCNF/ SP of resin | Flexural modulus (MPa) | Bending strength (MPa) | Izod impact strength (kJ/m$^2$) | SP of AcCNF/ SP of resin | Flexural modulus (MPa) | Bending strength (MPa) | Izod impact strength (kJ/m$^2$) |
| 0.41 | 14.8 | — | | 1.30 | — | — | — | — | — | — | — |
| 0.46 | 14.6 | 73.3 | | 1.28 | — | — | — | — | — | — | — |
| 0.56 | 14.4 | 73.2 | Intermediate | 1.26 | — | — | — | — | — | — | — |
| 0.64 | 14.2 | 73.1 | DS, High | 1.25 | — | — | — | — | — | — | — |
| 0.86 | 13.7 | — | crystallinity | 1.20 | — | — | — | — | — | — | — |
| 0.87 | 13.7 | — | | 1.20 | — | — | — | — | 3780 | 87.3 | 2.83 |
| 0.88 | 13.7 | 72.1 | | 1.20 | 6400 | 119 | 2.69 | — | — | — | — |
| 1.17 | 13.0 | 69.5 | High DS, | 1.14 | — | — | — | — | — | — | — |
| 1.47 | 12.3 | — | Intermediate | 1.08 | — | — | — | — | — | — | — |
| 1.57 | 12.1 | — | crystallinity | 1.06 | 5590 | 118 | 2.26 | — | 3630 | 87.6 | 2.82 |
| 1.84 | 11.5 | 55.6 | High DS, | 1.01 | — | — | — | — | — | — | — |
| 2.02 | 11.1 | — | Low degree of | 0.97 | — | — | — | — | — | — | — |
| 2.52 | 9.9 | 42.7 | crystallinity | 0.87 | 4680 | 113 | 2.59 | — | — | — | — |
| 2.64 | 9.6 | — | | 0.84 | — | — | — | — | 3160 | 87.6 | 3.14 |

TABLE 24

DS, SP, and physical property values of PS and PE matrix materials/NBKP

| | Acetylated NBKP | | | Matrix: PS (SP = 8.85) | | | | Matrix: PE (SP = 8.00) | | | |
|---|---|---|---|---|---|---|---|---|---|---|---|
| DS | SP | Crystallinity (%) | Fiber state | SP of AcCNF/ SP of resin | Flexural modulus (MPa) | Bending strength (MPa) | Izod impact strength (kJ/m$^2$) | SP of AcCNF/ SP of resin | Flexural modulus (MPa) | Bending strength (MPa) | Izod impact strength (kJ/m$^2$) |
| 0 | 15.7 | 77.4 | Low DS, | 1.77 | 3530 | 28.8 | 1.78 | 1.96 | 1620 | 30.2 | 2.85 |
| 0.29 | 15.0 | 74.7 | High | 1.69 | — | — | — | 1.88 | — | — | — |
| 0.30 | 15.0 | — | crystallinity | 1.69 | 3980 | 55.6 | 2.00 | 1.88 | 2210 | 39.1 | 3.02 |
| 0.32 | 15.0 | — | | 1.69 | — | — | — | 1.88 | — | — | — |
| 0.41 | 14.8 | — | | 1.67 | — | — | — | 1.85 | — | — | — |
| 0.46 | 14.6 | 73.3 | | 1.65 | — | — | — | 1.83 | — | — | — |
| 0.56 | 14.4 | 73.2 | Intermediate | 1.63 | — | — | — | 1.80 | — | — | — |
| 0.64 | 14.2 | 73.1 | DS, High | 1.60 | — | — | — | 1.78 | — | — | — |
| 0.86 | 13.7 | — | crystallinity | 1.55 | 4110 | 63.7 | 2.22 | 1.71 | 2390 | 42.4 | 3.10 |
| 0.87 | 13.7 | — | | 1.55 | — | — | — | 1.71 | — | — | — |
| 0.88 | 13.7 | 72.1 | | 1.55 | — | — | — | 1.71 | — | — | — |
| 1.17 | 13.0 | 69.5 | High DS, | 1.47 | — | — | — | 1.63 | — | — | — |
| 1.47 | 12.3 | — | Intermediate | 1.39 | 4090 | 66.3 | 1.96 | 1.54 | 2230 | 41.1 | 3.38 |
| 1.57 | 12.1 | — | crystallinity | 1.37 | — | — | — | 1.51 | — | — | — |
| 1.84 | 11.5 | 55.6 | High DS, | 1.30 | — | — | — | 1.44 | — | — | — |
| 2.02 | 11.1 | — | Low | 1.25 | 3940 | 64.6 | 1.52 | 1.39 | 2090 | 39.9 | 3.10 |
| 2.52 | 9.9 | 42.7 | crystallinity | 1.12 | — | — | — | 1.24 | — | — | — |
| 2.64 | 9.6 | — | | 1.08 | — | — | — | 1.20 | — | — | — |

TABLE 25

Index values of PA6 and POM matrices, based on NBKP/resin composition

| | Index value | | | Matrix: PA6 (SP = 12.2) | | | | Matrix: POM (SP = 11.1) | | | |
|---|---|---|---|---|---|---|---|---|---|---|---|
| DS | SP | Crystallinity (%) | Fiber state | SP of AcCNF/ SP of resin | Flexural modulus (index) | Bending strength (index) | Izod impact strength (index) | SP of AcCNF/ SP of resin | Flexural modulus (index) | Bending strength (index) | Izod impact strength (index) |
| 0 | 15.7 | 77.4 | Low DS, | 1.29 | 1.00 | 1.00 | 1.00 | 1.41 | 1.00 | 1.00 | 1.00 |
| 0.29 | 15.0 | 74.7 | High | 1.23 | 1.42 | 1.30 | 1.08 | 1.35 | — | — | — |
| 0.30 | 15.0 | — | crystallinity | 1.23 | — | — | — | 1.35 | — | — | — |

TABLE 25-continued

Index values of PA6 and POM matrices, based on NBKP/resin composition

| | Index value | | | Matrix: PA6 (SP = 12.2) | | | | Matrix: POM (SP = 11.1) | | | |
|---|---|---|---|---|---|---|---|---|---|---|---|
| DS | SP | Crystallinity (%) | Fiber state | SP of AcCNF/ SP of resin | Flexural modulus (index) | Bending strength (index) | Izod impact strength (index) | SP of AcCNF/ SP of resin | Flexural modulus (index) | Bending strength (index) | Izod impact strength (index) |
| 0.32 | 15.0 | — | | 1.23 | — | — | — | 1.35 | — | — | — |
| 0.41 | 14.8 | — | | 1.21 | — | — | — | 1.33 | — | — | — |
| 0.46 | 14.6 | 73.3 | | 1.20 | 1.54 | 1.36 | 1.14 | 1.32 | 1.61 | 1.31 | 1.65 |
| 0.56 | 14.4 | 73.2 | Intermediate | 1.18 | 1.55 | 1.34 | 1.05 | 1.30 | — | — | — |
| 0.64 | 14.2 | 73.1 | DS, High | 1.17 | 1.57 | 1.32 | 1.15 | 1.28 | 1.63 | 1.38 | 1.39 |
| 0.86 | 13.7 | — | crystallinity | 1.12 | — | — | — | 1.23 | — | — | — |
| 0.87 | 13.7 | — | | 1.12 | — | — | — | 1.23 | — | — | — |
| 0.88 | 13.7 | 72.1 | | 1.12 | 1.49 | 1.29 | 1.19 | 1.23 | — | — | — |
| 1.17 | 13.0 | 69.5 | High DS, | 1.07 | 1.39 | 1.23 | 1.10 | 1.17 | 1.74 | 1.39 | 3.35 |
| 1.47 | 12.3 | — | Intermediate | 1.01 | — | — | — | 1.11 | — | — | — |
| 1.57 | 12.1 | — | crystallinity | 0.99 | — | — | — | 1.09 | — | — | — |
| 1.84 | 11.5 | 55.6 | High DS, | 0.94 | 1.05 | 0.97 | 1.06 | 1.03 | 1.46 | 1.28 | 1.63 |
| 2.02 | 11.1 | — | Low | 0.91 | — | — | — | 1.00 | — | — | — |
| 2.52 | 9.9 | 42.7 | crystallinity | 0.81 | — | — | — | 0.89 | — | — | — |
| 2.64 | 9.6 | — | | 0.79 | — | — | — | 0.86 | — | — | — |

TABLE 26

Index values of PP and MAPP matrices, based on NBKP/resin composition

| | Index values | | | Matrix: PP (SP = 8.1) | | | | Matrix: MAPP (SP = 8.2) | | | |
|---|---|---|---|---|---|---|---|---|---|---|---|
| DS | SP | Crystallinity (%) | Fiber state | SP of AcCNF/ SP of resin | Flexural modulus (index) | Bending strength (index) | Izod impact strength (index) | SP of AcCNF/ SP of resin | Flexural modulus (index) | Bending strength (index) | Izod impact strength (index) |
| 0 | 15.7 | 77.4 | Low DS, | 1.94 | 1.00 | 1.00 | 1.00 | 1.91 | 1.00 | 1.00 | 1.00 |
| 0.29 | 15.0 | 74.7 | High | 1.86 | — | — | — | 1.83 | — | — | — |
| 0.30 | 15.0 | — | crystallinity | 1.86 | — | — | — | 1.83 | — | — | — |
| 0.32 | 15.0 | — | | 1.85 | — | — | — | 1.82 | 1.19 | 1.13 | 1.05 |
| 0.41 | 14.8 | — | | 1.83 | — | — | — | 1.80 | — | — | — |
| 0.46 | 14.6 | 73.3 | | 1.81 | 1.09 | 1.04 | 1.53 | 1.79 | — | — | — |
| 0.56 | 14.4 | 73.2 | Intermediate | 1.78 | — | — | — | 1.76 | — | — | — |
| 0.64 | 14.2 | 73.1 | DS, High | 1.76 | — | — | — | 1.74 | — | — | — |
| 0.86 | 13.7 | — | crystallinity | 1.69 | — | — | — | 1.37 | — | — | — |
| 0.87 | 13.7 | — | | 1.69 | — | — | — | 1.67 | — | — | — |
| 0.88 | 13.7 | 72.1 | | 1.69 | — | — | — | 1.67 | 1.33 | 1.27 | 1.13 |
| 1.17 | 13.0 | 69.5 | High DS, | 1.61 | — | — | — | 1.59 | — | — | — |
| 1.47 | 12.3 | — | Intermediate | 1.52 | — | — | — | 1.50 | — | — | — |
| 1.57 | 12.1 | — | crystallinity | 1.49 | — | — | — | 1.47 | 1.25 | 1.18 | 1.01 |
| 1.84 | 11.5 | 55.6 | High DS, | 1.42 | 1.18 | 1.14 | 0.96 | 1.40 | — | — | — |
| 2.02 | 11.1 | — | Low | 1.37 | — | — | — | 1.35 | — | — | — |
| 2.52 | 9.9 | 42.7 | crystallinity | 1.22 | 1.24 | 1.15 | 0.99 | 1.21 | 1.11 | 1.06 | 1.10 |
| 2.64 | 9.6 | — | | 1.19 | — | — | — | 1.17 | — | — | — |

TABLE 27

Index values of PLA and ABS matrices, based on NBKP/resin composition

| | Index value | | | Matrix: PLA (SP = 11.4) | | | | Matrix: ABS (SP: undetermined) | | | |
|---|---|---|---|---|---|---|---|---|---|---|---|
| DS | SP | Crystallinity (%) | Fiber state | SP of AcCNF/ SP of resin | Flexural modulus (index) | Bending strength (index) | Izod impact strength (index) | SP of AcCNF/ SP of resin | Flexural modulus (index) | Bending strength (index) | Izod impact strength (index) |
| 0 | 15.7 | 77.4 | Low DS, | 1.38 | 1.00 | 1.00 | 1.00 | — | 1.00 | 1.00 | 1.00 |
| 0.29 | 15.0 | 74.7 | High | 1.32 | — | — | — | — | — | — | — |
| 0.30 | 15.0 | — | crystallinity | 1.32 | — | — | — | — | 1.08 | 1.06 | 1.01 |
| 0.32 | 15.0 | — | | 1.32 | 1.32 | 1.22 | 0.88 | — | — | — | — |
| 0.41 | 14.8 | — | | 1.30 | — | — | — | — | — | — | — |
| 0.46 | 14.6 | 73.3 | | 1.28 | — | — | — | — | — | — | — |

TABLE 27-continued

Index values of PLA and ABS matrices, based on NBKP/resin composition

| | Index value | | | Matrix: PLA (SP = 11.4) | | | | Matrix: ABS (SP: undetermined) | | | |
|---|---|---|---|---|---|---|---|---|---|---|---|
| DS | SP | Crystallinity (%) | Fiber state | SP of AcCNF/ SP of resin | Flexural modulus (index) | Bending strength (index) | Izod impact strength (index) | SP of AcCNF/ SP of resin | Flexural modulus (index) | Bending strength (index) | Izod impact strength (index) |
| 0.56 | 14.4 | 73.2 | Intermediate | 1.26 | — | — | — | — | — | — | — |
| 0.64 | 14.2 | 73.1 | DS, High | 1.25 | — | — | — | — | — | — | — |
| 0.86 | 13.7 | — | crystallinity | 1.20 | — | — | — | — | — | — | — |
| 0.87 | 13.7 | — | | 1.20 | — | — | — | — | 1.38 | 1.23 | 0.83 |
| 0.88 | 13.7 | 72.1 | | 1.20 | 1.51 | 1.24 | 0.96 | — | — | — | — |
| 1.17 | 13.0 | 69.5 | High DS, | 1.14 | — | — | — | — | — | — | — |
| 1.47 | 12.3 | — | Intermediate | 1.08 | — | — | — | — | — | — | — |
| 1.57 | 12.1 | — | crystallinity | 1.06 | 1.32 | 1.23 | 0.80 | — | 1.33 | 1.23 | 0.83 |
| 1.84 | 11.5 | 55.6 | High DS, | 1.01 | — | — | — | — | — | — | — |
| 2.02 | 11.1 | — | Low | 0.97 | — | — | — | — | — | — | — |
| 2.52 | 9.9 | 42.7 | crystallinity | 0.87 | 1.10 | 1.18 | 0.92 | — | — | — | — |
| 2.64 | 9.6 | — | | 0.84 | — | — | — | — | 1.16 | 1.23 | 0.93 |

TABLE 28

Index values of PS and PE matrices, based on NBKP/resin composition

| | Index value | | | Matrix: PS (SP = 8.85) | | | | Matrix: PE (SP = 8.00) | | | |
|---|---|---|---|---|---|---|---|---|---|---|---|
| DS | SP | Crystallinity (%) | Fiber state | SP of AcCNF/ SP of resin | Flexural modulus (index) | Bending strength (index) | Izod impact strength (index) | SP of AcCNF/ SP of resin | Flexural modulus (index) | Bending strength (index) | Izod impact strength (index) |
| 0 | 15.7 | 77.4 | Low DS, | 1.77 | 1.00 | 1.00 | 1.00 | 1.96 | 1.00 | 1.00 | 1.00 |
| 0.29 | 15.0 | 74.7 | High | 1.69 | — | — | — | 1.88 | — | — | — |
| 0.30 | 15.0 | — | crystallinity | 1.69 | 1.13 | 1.93 | 1.12 | 1.88 | 1.36 | 1.29 | 1.06 |
| 0.32 | 15.0 | — | | 1.69 | — | — | — | 1.88 | — | — | — |
| 0.41 | 14.8 | — | | 1.67 | — | — | — | 1.85 | — | — | — |
| 0.46 | 14.6 | 73.3 | | 1.65 | — | — | — | 1.83 | — | — | — |
| 0.56 | 14.4 | 73.2 | Intermediate | 1.63 | — | — | — | 1.80 | — | — | — |
| 0.64 | 14.2 | 73.1 | DS, High | 1.60 | — | — | — | 1.78 | — | — | — |
| 0.86 | 13.7 | — | crystallinity | 1.55 | 1.16 | 2.21 | 1.25 | 1.71 | 1.38 | 1.23 | 0.83 |
| 0.87 | 13.7 | — | | 1.55 | — | — | — | 1.71 | — | — | — |
| 0.88 | 13.7 | 72.1 | | 1.55 | — | — | — | 1.71 | — | — | — |
| 1.17 | 13.0 | 69.5 | High DS, | 1.47 | — | — | — | 1.63 | — | — | — |
| 1.47 | 12.3 | — | Intermediate | 1.39 | 1.16 | 2.30 | 1.10 | 1.54 | 1.38 | 1.36 | 1.19 |
| 1.57 | 12.1 | — | crystallinity | 1.37 | — | — | — | 1.51 | — | — | — |
| 1.84 | 11.5 | 55.6 | High DS, | 1.30 | — | — | — | 1.44 | — | — | — |
| 2.02 | 11.1 | — | Low | 1.25 | 1.12 | 2.24 | 0.853 | 1.39 | 1.29 | 1.32 | 1.09 |
| 2.52 | 9.9 | 42.7 | crystallinity | 1.12 | — | — | — | 1.24 | — | — | — |
| 2.64 | 9.6 | — | | 1.08 | — | — | — | 1.20 | — | — | — |

TABLE 29

DS, SP, and physical property values of PA6 and POM matrix material/ligno pulp

| | | | | Matrix: PA6 (SP = 12.2) | | | | Matrix: POM (SP = 11.1) | | | |
|---|---|---|---|---|---|---|---|---|---|---|---|
| DS | SP | Crystallinity (%) | Fiber state | SP of AcCNF/ SP of resin | Flexural modulus (MPa) | Bending strength (MPa) | Izod impact strength (kJ/m²) | SP of AcCNF/ SP of resin | Flexural modulus (MPa) | Bending strength (MPa) | Izod impact strength (kJ/m²) |
| Acetylated ligno pulp NUKP | | | | | | | | | | | |
| 0 | 15.6 | 78.3 | Low DS, | 1.28 | 3850 | 130 | 3.28 | | | | — |
| 0.41 | 14.7 | 75.0 | High crystallinity | 1.20 | 5110 | 154 | 3.28 | | | | |
| 0.61 | 14.2 | 76.7 | Intermediate | 1.16 | 4970 | 150 | 2.47 | | | | |
| 0.85 | 13.7 | 74.4 | DS, High crystallinity | 1.12 | 4600 | 141 | 2.12 | | | | |

TABLE 29-continued

DS, SP, and physical property values of PA6 and POM matrix material/ligno pulp

| | | | | Matrix: PA6 (SP = 12.2) | | | | Matrix: POM (SP = 11.1) | | | |
|---|---|---|---|---|---|---|---|---|---|---|---|
| DS | SP | Crystallinity (%) | Fiber state | SP of AcCNF/ SP of resin | Flexural modulus (MPa) | Bending strength (MPa) | Izod impact strength (kJ/m$^2$) | SP of AcCNF/ SP of resin | Flexural modulus (MPa) | Bending strength (MPa) | Izod impact strength (kJ/m$^2$) |
| Acetylated ligno pulp GP(150-1) | | | | | | | | | | | |
| 0 | 15.3 | 78.7 | Low DS, | 1.25 | 3990 | 132 | 3.06 | | | | |
| 0.42 | 14.4 | 75.5 | High crystallinity | 1.18 | 5000 | 150 | 2.87 | | | | |
| 0.56 | 14.1 | — | Intermediate | 1.16 | 4790 | 149 | 3.09 | | | | |
| 0.97 | 13.2 | 73.1 | DS, High crystallinity | 1.08 | 4380 | 139 | 2.25 | | | | |
| Acetylated ligno pulp GP(150-3-a) | | | | | | | | | | | |
| 0 | 15.5 | 83.1 | Low DS, | 1.27 | 3950 | 127 | 3.60 | | — | | |
| 0.45 | 14.5 | 78.8 | High crystallinity | 1.19 | 5090 | 151 | 3.29 | | — | | |
| 0.56 | 14.3 | — | Intermediate | 1.17 | — | — | — | | — | | |
| 0.60 | 14.2 | — | DS, High | 1.16 | — | — | — | | — | | |
| 0.62 | 14.1 | 78.0 | crystallinity | 1.16 | 4990 | 149 | 3.47 | | | | |
| 0.75 (150-3) | 13.8 | — | | 1.13 | 5380 | 161 | 2.95 | 1.24 | 5100 | 128 | 3.31 |
| 0.95 | 13.4 | 75.4 | | 1.10 | 4350 | 136 | 2.15 | | | | |

\* —: No data

TABLE 30

DS, SP, and physical property values of PP and MAPP matrix materials/ligno pulp

| | | | | Matrix: PP (SP = 8.1) | | | | Matrix: MAPP (SP = 8.2) | | | |
|---|---|---|---|---|---|---|---|---|---|---|---|
| DS | SP | Crystallinity (%) | Fiber state | SP of AcCNF/ SP of resin | Flexural modulus (MPa) | Bending strength (MPa) | Izod impact strength (kJ/m$^2$) | SP of AcCNF/ SP of resin | Flexural modulus (MPa) | Bending strength (MPa) | Izod impact strength (kJ/m$^2$) |
| Acetylated ligno pulp NUKP | | | | | | | | | | | |
| 0 | 15.6 | 78.3 | Low DS, | | — | | | | — | | |
| 0.41 | 14.7 | 75.0 | High crystallinity | | | | | | | | |
| 0.61 | 14.2 | 76.7 | Intermediate | | | | | | | | |
| 0.85 | 13.7 | 74.4 | DS, High crystallinity | | | | | | | | |
| Acetylated ligno pulp GP(150-1) | | | | | | | | | | | |
| 0 | 15.3 | 78.7 | Low DS, | | — | | | | — | | |
| 0.42 | 14.4 | 75.5 | High crystallinity | | | | | | | | |
| 0.56 | 14.1 | — | Intermediate | | | | | | | | |
| 0.97 | 13.2 | 73.1 | DS, High crystallinity | | | | | | | | |
| Acetylated ligno pulp GP(150-3-a) | | | | | | | | | | | |
| 0 | 15.5 | 83.1 | Low DS, | | — | | | | — | | |
| 0.45 | 14.5 | 78.8 | High crystallinity | | | | | | | | |
| 0.56 | 14.3 | — | Intermediate | | | | | 1.74 | 2730 | 70.2 | 2.88 |
| 0.60 | 14.2 | — | DS, High | 1.75 | 2620 | 66.0 | 2.68 | | | | |
| 0.62 | 14.1 | 78.0 | crystallinity | | — | | | | | | |
| 0.75 (150-3) | 13.8 | — | | | | | | | | | |
| 0.95 | 13.4 | 75.4 | | | | | | | | | |

TABLE 31

Index values of PA6 matrix, based on ligno pulp/resin composition

Matrix: PA6 (SP = 12.2)

| DS | SP | Crystallinity (%) | Fiber state | SP of AcCNF/ SP of resin | Flexural modulus (index) | Bending strength (index) | Izod impact strength (index) |
|---|---|---|---|---|---|---|---|
| Acetylated ligno pulp NUKP | | | | | | | |
| 0 | 15.6 | 78.3 | Low DS, | 1.28 | 1.00 | 1.00 | 1.00 |
| 0.41 | 14.7 | 75.0 | High crystallinity | 1.20 | 1.33 | 1.18 | 1.00 |
| 0.61 | 14.2 | 76.7 | Intermediate | 1.16 | 1.29 | 1.15 | 0.75 |
| 0.85 | 13.7 | 74.4 | DS, High crystallinity | 1.12 | 1.19 | 1.08 | 0.65 |
| Acetylated ligno pulp GP(150-1) | | | | | | | |
| 0 | 15.3 | 78.7 | Low DS, | 1.25 | 1.00 | 1.00 | 1.00 |
| 0.42 | 14.4 | 75.5 | High crystallinity | 1.18 | 1.25 | 1.14 | 0.94 |
| 0.56 | 14.1 | — | Intermediate | 1.16 | 1.20 | 1.13 | 1.01 |
| 0.97 | 13.2 | 73.1 | DS, High crystallinity | 1.08 | 1.10 | 1.05 | 0.74 |
| Acetylated ligno pulp GP(150-3-a) | | | | | | | |
| 0 | 15.5 | 83.1 | Low DS, | 1.27 | 1.00 | 1.00 | 1.00 |
| 0.45 | 14.5 | 78.8 | High crystallinity | 1.19 | 1.29 | 1.19 | 0.91 |
| 0.56 | 14.3 | — | Intermediate | 1.17 | — | — | — |
| 0.60 | 14.2 | — | DS, High | 1.16 | — | — | — |
| 0.62 | 14.1 | 78.0 | crystallinity | 1.16 | 1.26 | 1.17 | 0.96 |
| 0.75 (150-3) | 13.8 | — | | 1.13 | 1.36 | 1.27 | 0.82 |
| 0.95 | 13.4 | 75.4 | | 1.10 | 1.10 | 1.07 | 0.60 |

TABLE 32

General overview of acetylated NBKP-added resin composite materials

| Acetylated cellulose | | | | Peak region of flexural properties Of each resin matrix | | | | |
|---|---|---|---|---|---|---|---|---|
| DS | SP | Crystallinity (%) | Fiber state | PA6 SP = 12.2 | POM SP = 11.1 | PP SP = 8.10 | MAPP SP = 8.20 | PLA SP = 11.4 |
| 0 | 15.7 | 77.4 | Low DS, | | | | | |
| 0.29 | 15.0 | 74.7 | High crystallinity | | | | | |
| 0.30 | 15.0 | — | | | | | | |
| 0.32 | 15.0 | — | | | | | ↑ | |
| 0.41 | 14.8 | — | | | | | | ↓ |
| 0.46 | 14.6 | 73.3 | | ↑ | | | | |
| 0.56 | 14.4 | 73.2 | Intermediate | | | | | |
| 0.64 | 14.2 | 73.1 | DS, High | | ↑ | ↑ | | |
| 0.86 | 13.7 | — | crystallinity | | | | | |
| 0.87 | 13.7 | — | | | | | | |
| 0.88 | 13.7 | 72.1 | | ↓ | | | | |
| 1.17 | 13.0 | 69.5 | High DS, | | ↓ | ↓ | | |
| 1.47 | 12.3 | — | Intermediate | | | | | |
| 1.57 | 12.1 | — | crystallinity | | | | ↓ | |
| 1.84 | 11.5 | 55.6 | High DS, | | | | | |
| 2.02 | 11.1 | — | Low | | | | | |
| 2.52 | 9.9 | 42.7 | crystallinity | | ↑ | | | |
| 2.64 | 9.6 | — | | | ↓ | | | |

* —: No data; the SP value of ABS is not shown because it is undetermined.

TABLE 33

General overview of acetylated ligno pulp-added resin composite materials

| DS | SP | Crystallinity | Fiber state | Bending peak region of matrix PA6 SP = 12.2 |
|---|---|---|---|---|
| Acetylated ligno pulp NUKP | | | | |
| 0 | 15.6 | 78.3 | Low DS | |
| 0.41 | 14.7 | 75.0 | High crystallinity | ↑ |
| 0.61 | 14.2 | 76.7 | intermediate DS | ↓ |
| 0.85 | 13.7 | 74.4 | High crystallinity | |
| Acetylated ligno pulp GP (150-1) | | | | |
| 0 | 15.3 | 78.7 | Low DS | |
| 0.42 | 14.4 | 75.5 | High crystallinity | ↑ |
| 0.56 | 14.1 | — | Intermediate DS | ↓ |
| 0.97 | 13.2 | 73.1 | High crystallinity | |
| Acetylated ligno pulp GP (150-1) | | | | |
| 0 | 15.5 | 83.1 | Low DS | |
| 0.45 | 14.5 | 78.8 | High crystallinity | ↑ |
| 0.56 | 14.3 | — | Intermediate DS | |
| 0.60 | 14.2 | — | High crystallinity | |
| 0.62 | 14.1 | 78.0 | | |
| 0.75 (150-3) | 13.8 | — | | |
| 0.95 | 13.4 | 75.4 | | ↓ |

When NBKP is added to PA6 having the highest SP (SP=12.2), the highest flexural properties can be obtained by adding acetylated NBKP with a DS of about 0.46 to 0.88, an SP of about 14.6 to 13.7, and a crystallinity of about 72.1%.

When NBKP is added to PLA having the second highest SP value (SP=11.4), high flexural properties can be obtained by adding acetylated NBKP with a DS of about 0.32 to 1.57 and an SP of about 15.7 to 0.32, and a crystallinity of about 55.6% or more.

When NBKP is added to POM having the third-highest SP (SP=11.1), the highest flexural properties can be obtained by adding acetylated cellulose with a DS of about 0.64 to 1.17, an SP of about 14.2 to 13.0, and a crystallinity of about 69.5% or more.

When PP having the lowest SP (SP=8.1) is used, the peak is considered to exist at a DS of about 2.52 or more. The crystallinity does not affect flexural properties.

When MAPP (SP=8.2) is used, the highest flexural properties can be obtained by adding acetylated cellulose with a DS of about 0.64 to 1.17, an SP of about 14.2 to 13.0, and a crystallinity of about 55.6% or more.

In summary, when a polar resin material, such as PA6, POM, or PLA, is used, the compatibility of the resin material with cellulose can be sufficiently enhanced by acetylation to a DS of about 1.2, and a material with the highest flexural strength can be obtained by maintaining the crystallinity of cellulose at about 70% or more, i.e., maintaining a high strength of cellulose fibers.

Since PP, which is a nonpolar material, has low SP, acetylated cellulose that has high crystallinity and high fiber strength with a DS of about 1.0 has an excessively low interface strength, and thus has insufficient flexural properties. The acetylated NBKP/PP composite material must have a high DS, even when the crystallinity is lowered.

When other nonpolar materials, PS and PE, were used, no distinct DS peak values of flexural properties was observed.

On the other hand, a similar tendency was also observed in ligno pulp (NUKP, GP150-1, or GP150-3a)-added PA6. Adding acetylated ligno pulp with a DS of about 0.41 to 0.75, an SP of about 13.8 to 14.7, and a crystallinity of about 75.0% or more can provide the highest flexural properties. POM also has a similar tendency. Adding acetylated NUKP with a DS of 0.75 and an SP of 13.8 can provide the highest flexural properties.

When PP is used, the use of acetylated ligno pulp with a high DS is also considered to be necessary to achieve high flexural properties.

IV. Preparation of Acylated NUKP-Containing Polypropylene (PP) Composition and Strength Test for the Composition
(1) Preparation of Acylated NUKP The pulp slurry (NUKP) obtained in the above section "Preparation of refiner-treated needle-leaved tree-derived unbleached softwood pulp" was placed (in an amount of 5 g on a NUKP solids basis) in a 1-L four-necked flask equipped with a stirring blade, and then 500 mL of N-methyl-2-pyrrolidone (NMP) and 250 mL of toluene were added thereto. The resulting mixture was stirred to disperse NUKP in NMP/toluene.

After a condenser was attached to the flask, the dispersion was heated to 150° C. in a nitrogen atmosphere to distill off water contained in the dispersion together with toluene. The dispersion was then cooled to 40° C., and 15 mL of pyridine (about 2 equivalents per equivalent of hydroxyl groups of NUKP) and 16.2 mL of myristoyl chloride (a modifying agent, an esterifying reagent) (about 2 equivalents per equivalent of hydroxyl groups of NUKP) were added.

The increase of generated ester groups was sequentially measured by infrared absorption spectrum (see the Note below) to track the reaction, and the reaction was allowed to proceed in a nitrogen atmosphere for 90 minutes.

(Note): A small amount of the reaction suspension mixture was successively removed, and ethanol was added. The resulting mixture was centrifuged to obtain a precipitate. This precipitate was washed with ethanol and dried, and then pulverized.

Changes in degree of substitution (DS) of ester groups of the obtained product can be tracked by measuring infrared absorption spectrum. The DS of ester groups can be calculated according to the following formula.

$$DS=0.0113X-0.0122$$

(wherein X represents the absorption peak area of ester carbonyl around 1,733 cm$^{-1}$; the spectral value at 1,315 cm$^{-1}$ was normalized to 1).

The reaction suspension was diluted with 200 mL of ethanol, and centrifuged at 7,000 rpm for 20 minutes. The supernatant was removed to obtain a precipitate. These operations (addition of ethanol, dispersion, centrifugation, and removal of a supernatant) were performed in the same manner, except that acetone was used in place of the solvent ethanol. Similar operations were further repeated twice using NMP in place of the solvent acetone to obtain a slurry of myristoylated NUKP.

NUKPs (acylated NUKPs) modified with various modified groups shown in the Table below (Table 34) were prepared in the same manner as above. Table 34 shows the reaction conditions and obtained acylated NUKP.

Explanation of Crystallinity of Acylated NUKP in Table 34

Although the crystallinity of these acylated NUKPs has not been measured, the crystallinity is assumed to be around 70%. The reason is as follows.

The crystallinity of unacetylated pulps and unacetylated ligno pulps (DS=0) was in the range of about 77 to 83%; more specifically, crystallinity of NBKP was 77.4%, that of NUKP was 78.3%, that of GP150-1-a was 78.7%, and that of GP150-3-a was 83.1% (see Tables 6 and 7 above).

In contrast, crystallinity of acetylated pulps and acetylated ligno pulps with a DS of 0.4 to 0.6 was in the range of about 73 to 78%; more specifically, the crystallinity of acetylated NBKP (DS=0.46) was 73.3%, that of acetylated NUKP (DS=0.61) was 76.7%, that of acetylated GP150-1-a (DS=0.42) was 75.5%, and that of acetylated GP150-3-a (DS=0.62) was 78% (see Tables 6 and 7 below).

When the pulps and lingo pulps are thus acetylated by the acylation method used in the present invention, crystallinity of pulps and ligno pulps is slightly reduced, but only a small reduction is observed at a DS of around 0.4 to 0.6. Accordingly, regardless of the lignin content of pulp, cellulose and lignocellulose on the surface of pulp fibers are considered to have been modified.

The crystallinity of myristoylated NBKP (DS=0.42) was 68%.

It is known that when the cellulose fiber surface is acylated, crystallinity barely changes regardless of the type of acyl group used (e.g., acetyl, butyryl, or valeryl) (M. Balardo et al., Surface Chemical Modification of Natural Cellulose Fibers, J. Appl Polym Sci, 83, 38 to 45 (2002)).

The above results suggest that the NUKPs shown in Table 34 also have a crystallinity of around 70%, regardless of the type of acyl group used.

TABLE 34

Production conditions of acylated NUKP

| CNF modifying group | Agent | Reaction conditions | Degree of substitution |
|---|---|---|---|
| Bornane phenoxyacetyl | Bornane phenoxyacetic acid chloride | Room temperature, 2 hours | 0.57 |
| Bornane phenoxyhexanoyl | Bornane phenoxyhexane chloride | 60° C., 5 hours | 0.45 |
| 1,1,3,3-Tetramethylbutyl-phenoxyacetyl | 1,1,3,3-Tetramethyl-butylphenoxyacetic acid chloride | Room temperature, 1 hour | 0.52 |
| Phenoxyacetyl | Phenoxyacetic acid chloride | Room temperature, 1 hour | 0.57 |
| 3,5,5,-Trimethylhexanoyl | 3,5,5-Trimethylhexanoic acid chloride | Room temperature, 5 hours | 0.47 |
| Myristoyl | Myristoyl chloride | 40° C., 5 hours | 0.48 |

SP Calculation of Various Acylated NUKPs (i) First, the SP value of acylated cellulose was calculated as follows.

SP (Y) of acylated cellulose with a DS of $X = -(a-b)X/2+a$
wherein
a: SP value of cellulose (literature value: 15.65 cal/cm)$^{1/2}$,
b: SP of acylated cellulose with a DS of 2
  = (SP value of cellulose diacylate determined by the Fedors method)×(Correction factor)
Correction factor=(SP value of cellulose diacetate in the literature, i.e., 11.13)/(SP value of cellulose diacetate determined by the Fedors method, i.e., 12.41)

(ii) $SP_{xyl}$ (SP value of xylan), $SP_{lig}$ (SP value of lignin), $SP_{xyl\,acyl}$ (SP value of xylan diacylate), and $SP_{ligac}$ (SP value of lignin diacetate) were calculated by the Fedors method (Robert F. Fedors, Polymer Engineering and Science, February, 1974, vol. 14, No. 2, 147-154).

(iii) Using the above data, SP values of various acylated NUKPs were calculated by the method disclosed in the section "Method for calculating SP values of acetylated ligno pulp (LP)."

(2) Production of Chemically Modified NUKP-Containing Resin (Polypropylene) Composition The myristoylated NUKP slurry (containing 15 g of solids) was stirred under reduced pressure using a Trimix (produced by Inoue Manufacturing, Inc.), and dried. A polypropylene (PP) resin (Novatec MA-04A, produced by Japan Polypropylene Corporation) was added thereto to make a total solids content of 150 g. The resulting mixture was kneaded and granulated under the conditions described below to obtain a resin composition.

The content of myristoylated NUKP in the resin composition was 10 mass %.

Kneader: "TWX-15," manufactured by Technovel Corporation
Kneading conditions: temperature: 180° C.
  discharge: 600 g/H
  screw rotation speed: 200 rpm
Production of Resin Molded Article The resin compositions obtained above were injection-molded under the following injection-molding conditions to prepare test specimens (myristoylated NUKP-containing PP molded articles).

Injection molding machine: "NP7 type," produced by Nissei Plastic Industrial Co., Ltd.
Molding conditions: molding temperature: 190° C. mold tool temperature: 40° C.
Injection rate: 50 cm$^3$/second
Strength Test The elastic modulus and tensile strength of each of the obtained test specimens were measured using an electromechanical universal testing machine (produced by Instron) at a testing rate of 1.5 mm/min (load cell 5 kN). The support span was 4.5 cm.

Using the other acetylated NUKPs described above, polypropylene compositions containing these acetylated NUKPs and test specimens thereof were prepared similarly, and the elastic modulus and tensile strength thereof were measured. Table 35 shows measurement results.

TABLE 35

Strength test results of acylated NUKP-containing polypropylene (PP) compositions

| Fiber/PP compositional ratio in the composition (mass ratio) | NUKP modifying group (acyl group) | Acylated DS | SP of PP, NUKP or acylated NUKP (cal/cm$^3$)$^{1/2}$ | Ratio R (Ratio of SP of fibers to SP of resin) | Tensile elastic modulus of resin complex (MPa) | Tensile strength of resin complex (MPa) |
|---|---|---|---|---|---|---|
| PP alone | ... | ... | 8.1 | ... | 1.83 | 41.5 |
| NUKP/PP = 10/90 | None | 0 | 15.6 | 1.93 | 2.20 | 36.9 |
| Acylated NUKP/PP = 10/90 | Bornane phenoxyacetyl | 0.57 | 13.96 | 1.72 | 3.52 | 47.9 |
| | Bornane phenoxyhexanoyl | 0.48 | 14.13 | 1.74 | 3.30 | 39.6 |
| | 1,1,3,3-tetramethyl butylphenoxyacetyl | 0.52 | 13.98 | 1.73 | 3.16 | 44.8 |
| | Phenoxyacetyl | 0.62 | 14.22 | 1.76 | 2.37 | 40.7 |
| | 3,5,5-Trimethylhexanoyl | 0.47 | 14.03 | 1.73 | 2.79 | 47.9 |
| | Myristoyl | 0.48 | 14.00 | 1.73 | 2.50 | 48.6 |

(3) Fibrillatability of Acylated NUKP in the Resin

An NUKP-containing PP molded article was observed using an X-ray CT scanner (SKYSCAN1172, produced by SkyScan).

The X-CT image of an acylated NUKP-containing PP molding article shows that the higher the elastic modulus, the more blurred the contour of fibers present on the order of micrometers; and a white-haze image was observed. More specifically, kneading with a PP resin is considered to advance defibration of acylated NUKP and microfibrillation.

To examine the fibrillatability more quantitatively, the percentage (%) of the area having a luminance of 40 or more, a size of 50 pixels (1 pixel: 0.72 micron) or more in the cross section of images of an X-ray CT scanner was determined, and the average (N=300) was defined as the percentage (%) of fiber aggregates and used as an index of fibrillatability (a smaller value means advanced defibration and microfibrillation).

Table 36 shows the percentage (%) of aggregates in each acylated NUKP-containing PP molding article.

Table 36 shows index values of the elastic modulus of acylated NUKP-containing molded articles shown in Table 35, relative to the elastic modulus of the molded article of PP alone or unmodified NUKP-containing PP molded article. Further, Table 36 further shows the ratio R of the solubility parameter of each acylated NUKP to the solubility parameter of polypropylene (PP) (SP: 8.1 (cal/cm)$^{1/2}$) (SP of acylated NUKP/SP of PP).

higher fibrillatability in descending order. The fibrillatability of phenoxyacetyl NUKP is considered to be the lowest. Even in this case, about 95% was defibrated to a fiber width of about 700 nm or less.

Table 36 shows that when ratio R (SP of acylated NUKP/SP of PP) was in the range of 1.72 to 1.76, any of the acylated NUKP-containing PP molded articles had an increased elastic modulus, which is about 1.3 to 1.9 times higher than the elastic modulus of the PP alone and about 1.1 to 1.6 times higher than the elastic modulus of the unmodified NUKP-containing PP molded article.

(4) Preparation of Acetylated NUKP-Containing HDE Composition, PS Composition, and ABS Composition, and Strength Thereof Using acetylated NUKP (AcNUKP, DS: 0.41, crystallinity: about 75%) prepared in the same manner as above, compositions containing this acetylated NUKP, and a high-density polyethylene (HDPE) resin (trade name: Suntec HD, produced by Asahi Kasei Corporation), general-purpose polystyrene (GPPS, produced by Toyo Engineering Corporation, trade name: PSJ polystyrene) or an acrylonitrile-butadiene-styrene resin (ABS, produced by Asahi Kasei Corporation, trade name: Stylac ABS) were prepared in the same manner as above to prepare test specimens.

TABLE 36

Increase ratio of elastic modulus of acylated NUKP-containing polypropylene (PP) compositions and percentage (%) of fiber aggregates in the compositions

| Fiber composition in the PP composition (mass ratio) | NUKP modifying group (acryl group) | Ratio R (ratio of SP of acetylated NUKP to SP of PP) | Tensile elastic modulus of resin complex (MPa) | Increase ratio of elastic modulus (index based on PP) | Increase ratio of elastic modulus (index based on unmodified NUKP-containing PP) | Fiber aggregate (%) |
|---|---|---|---|---|---|---|
| PP alone | ... | ... | 1.83 | 1 | ... | ... |
| NUKP/PP = 10/90 | None | 1.93 | 2.20 | 1.21 | 1 | 7.94 |
| Acylated NUKP/PP = 10/90 | Bornane phenoxyacetyl | 1.72 | 3.52 | 1.92 | 1.60 | 1.61 |
| | Bornane phenoxyhexanoyl | 1.74 | 3.30 | 1.80 | 1.50 | 1.30 |
| | 1,1,3,3-tetramethyl butylphenoxyacetyl | 1.73 | 3.16 | 1.73 | 1.44 | 2.01 |
| | Phenoxyacetyl | 1.76 | 2.37 | 1.30 | 1.08 | 5.32 |
| | 3,5,5-Trimethylhexanoyl | 1.73 | 2.79 | 1.52 | 1.27 | 2.12 |
| | Myristoyl | 1.73 | 2.50 | 1.37 | 1.14 | 0.61 |

Among the evaluated samples, myristoylated NUKP exhibited the highest fibrillatability, bornane phenoxyhexanoyl NUKP exhibited the second highest fibrillatability, bornane phenoxyacetyl NUKP, 1,1,3,3-tetramethylphenoxyacetyl NUKP, and 3,5,5-trimethylhexanoyl NUKP had The tensile elastic modulus and tensile strength of each of these test specimens were measured using an electromechanical universal testing machine (produced by Instron). Table 37 shows the results.

TABLE 37

Strength test results of resins containing acetylated NUKP

| Fiber content of the composition (mass %) | Fiber (NUKP) | | | HDPE composition (Sp of HDPE = 8.0 (cal/cm$^3$)$^{1/2}$) | | |
|---|---|---|---|---|---|---|
| | Acylated DS | Crystallinity of fibers (%) | SP of fibers | SP of fibers/SP of resin | (Tensile) elastic modulus MPa | (Tensile) strength MPa |
| 0 | ... | ... | ... | ... | 0.82 | 23.4 |
| 10 | 0 | 78.3 | 15.3 | 1.91 | 1.52 | 28.4 |

TABLE 37-continued

Strength test results of resins containing acetylated NUKP

| | | | | | |
|---|---|---|---|---|---|
| 0.41 | 75 | 14.7 | 1.84 | 2.18 | 37.8 |

| Fiber content of the composition (mass %) | PS composition (SP of PS = 8.85 (cal/cm$^3$)$^{1/2}$) | | | ABS composition (SP of ABS = 11.2 (cal/cm$^3$)$^{1/2}$) | | |
|---|---|---|---|---|---|---|
| | SP of fibers/ SP of resin | (Tensile) elastic modulus MPa | (Tensile) strength MPa | SP of fibers/ SP of resin | (Tensile) elastic modulus MPa | (Tensile) strength MPa |
| 0 | ... | 3.13 | 59.4 | ... | 2.45 | 51.3 |
| 10 | 1.73 | 3.58 | 56.6 | 1.37 | 3.05 | 52.3 |
| | 1.66 | 3.99 | 49.8 | 1.31 | 3.83 | 67.7 |

(5) Relationship Between the Increase in Elastic Modulus of Acetylated NUKP-Containing Resin and the Ratio of SP of Resin to SP of Acetylated NUKP Table 38 shows SP values of NUKP and acetylated NUKP (DS: 0.41), ratio of the SP value of NUKP or acetylated NUKP to the SP value of resin used therewith (HDPE, PS, or ABS), and increase ratio of elastic modulus of each acetylated NUKP-containing resin.

Specifically, Table 38 shows (a) the increase ratio of the elastic modulus of each fiber-containing composition to the elastic modulus of the resin alone, and (b) the increase ratio of the elastic modulus of each acetylated NUKP-containing composition to the elastic modulus of the unmodified NUKP-containing resin composition.

Regardless of the type of resin composition, when the ratio of the SP of fibers (acetylated NUKPs) to the SP of the resin is within the range of 1.31 to 1.84, the acetylated NUKP-containing composition had an increased elastic modulus, which is at least 1.1 times higher than the elastic modulus of the chemically unmodified NUKP-containing composition.

TABLE 38

Increase in elastic modulus of acylated NUKP of acetylated NUKP-containing resin (HDPE, PS, ABS) compositions

| Fiber content of resin composition (mass %) | Fiber(NUKP) | | | Ratio of (SP of fibers) to (SP of HDPE) | Increase ratio of elastic modulus of AcNUKP-containing HDPE composition | |
|---|---|---|---|---|---|---|
| | Acetylated DS | Crystallinity (%) | SP value | | (a) Based on HDPE alone | (b) Based on unmodified NUKP-containing HDPE |
| 0 (resin alone) | ... | ... | ... | ... | 1 | ... |
| 10 | 0 | 78.3 | 15.3 | 1.91 | 1.85 | 1 |
| | 0.41 | 75 | 14.7 | 1.84 | 2.66 | 1.43 |

| Fiber content of resin composition (mass %) | (Ratio of) SP of fibers to (SP of PS) | Increase in elastic modulus of acylated NUKP-containing PS composition | | Ratio of (SP of fibers) to (SP of ABS) | Increase in elastic modulus of acylated NUKP-containing ABS composition | |
|---|---|---|---|---|---|---|
| | | (a) Based on PS alone | (b) Based on unmodified NUKP-containing PS | | (a) Based on ABS alone | (b) Based on unmodified NUKP-containing ABS |
| 0 (resin alone) | ... | 1 | ... | ... | 1 | ... |
| 10 | 1.73 | 1.14 | 1 | 1.37 | 1.24 | 1 |
| | 1.66 | 1.27 | 1.11 | 1.31 | 1.56 | 1.26 |

(Note): The SP Value of ABS Resin (acrylonitrile/butadiene/styrene=26/14/60 (mass ratio), produced by Asahi Chemical Industry Co., Ltd., trade name: Stylac ABS-101) is 11.2.

This SP value was calculated by using SP values of polyacrylonitrile, polybutadiene, and polystyrene, and prorating at a mass ratio of polyacrylonitrile/polybutadiene/polystyrene of 26/14/60 (JPH6-220332A, Applicant: Asahi Chemical Industry Co., Ltd.).

V. Reference Example 1

Preparation of Acylated NBKP-Containing High-Density Polyethylene (HDPE) Composition and Strength Test Thereof (1) Preparation of Acylated NBKP-0

A slurry of needle-leaved tree bleached kraft pulp (NBKP) (having the following chemical composition: cellulose: 80 mass %, glucomannan: 12 mass %, xylan: 6 mass %, arabinan/galactan: 2 mass %, and lignin: 0 mass %; this pulp is herein referred to as "NBKP-0" to distinguish the pulp from the lignin-containing NBKP described above) (slurry concentration: 2 mass %) was passed through a single-disc refiner (produced by Kumagai Riki Kogyo Co., Ltd.) and repeatedly subjected to refiner treatment until a Canadian standard freeness (CSF) value of 100 mL or less was achieved.

Water was added to NBKP-0 (150 g of solids) after the refiner treatment to prepare an aqueous suspension having a pulp slurry concentration of 0.75 mass %. The obtained slurry was subjected to a mechanical defibration treatment using a bead mill (NVM-2, produced by Aimex Co., Ltd.) (zirconia beads with a diameter of 1 mm); amount of beads filled: 70%; rotating speed: 2,000 rpm; number of times of treatment: two times) to obtain a slurry of NBKP-0 nanofibrils. The obtained slurry was concentrated using a centrifuge (produced by Kokusan Co., Ltd.) to obtain a 20 mass % NBKP-0 nanofibril slurry.

The NBKP-0 nanofibril slurry (5 g of solids) was placed in a 1-L four-necked flask equipped with a stirring blade. 500 mL of N-methyl-2-pyrrolidone (NMP) and 250 mL of toluene were added and stirred to disperse NUKP-0 nanofibrils in NMP/toluene.

After a condenser was attached to the flask, the dispersion was heated to 150° C. in a nitrogen atmosphere to distill off water contained in the dispersion together with toluene. Subsequently, the dispersion was cooled to 40° C., and then 15 mL of pyridine (2 equivalents per equivalent of hydroxyl groups of NBKP-0) and 16.2 mL of myristoyl chloride (a modifying agent, an esterifying reagent) (1 equivalent per equivalent of hydroxyl groups of NBKP-0) were added. A reaction was allowed to proceed in a nitrogen atmosphere for 120 minutes, thus obtaining chemically modified NBKP-0 nanofibrils (myristoylated NBKP-0 nanofibrils).

The reaction was tracked by sequentially measuring the degree of substitution (DS) of ester groups of the product by infrared (IR) absorption spectrum. When the DS had reached about 0.4, the reaction suspension was diluted with 200 mL of ethanol after 90 minutes and centrifuged at 7,000 rpm for 20 minutes to remove the supernatant, thus obtaining a precipitate. The above operation (addition of ethanol, dispersion, centrifugal separation, and removal of a supernatant) was repeated in the same manner, except that acetone was used in place of ethanol. The operation was further repeated twice using NMP in place of acetone to obtain an esterified NBKP-0 nanofibril slurry.

NBKP-0 nanofibrils (acylated NBKP-0 nanofibrils) modified with various modifying groups were prepared in the same manner as above.

Table 39 shows the reaction conditions and obtained acylated NBKP-0 nanofibrils.

The crystallinity of myristoylated NBKP-0 (DS=0.42) was 68%. Although the crystallinity of other acylated NBKP-0 was not measured, the crystallinity of other acylated NBKP-0 is presumed to be around 70%, for the same reason as stated above in the acylated NUKP.

TABLE 39

Production conditions and degree of substitution (DS) of acylated NBKP-0 nanofibrils

| Modified group of NBKP-0 nanofibrils | Esterifying reagent | Reaction conditions | Degree of substitution (DS) |
|---|---|---|---|
| Acetyl | Acetic anhydride | 80° C., 5 hours | 0.41 |
| Pivaloyl | Pivaloyl chloride | 60° C., 10 hours | 0.39 |
| Myristoyl | Myristoyl chloride | 25° C., 2 hours | 0.42 |
| Stearoyl | Stearoyl chloride | 25° C., 2 hours | 0.41 |
| Cyclo-hexylcarbonyl | Cyclohexane carboxylic acid chloride | 40° C., 3 hours | 0.42 |
| 4-t-butylcyclo-hexylcarbonyl | 4-t-butylcyclo-hexanecarboxylic acid chloride | 60° C., 3 hours | 0.44 |

(2) Calculation of SP of acylated NBKP-0

As described above, NBKP-0 is composed of 80 mass % of cellulose, 12 mass % of glucomannan, 6 mass % of xylan, and 2 mass % of arabinan/galactan.

The chemical formula ($-C_6H_{10}O_5-$) of the repeating unit of a glucomannan sugar chain is the same as that of cellulose. This chemical formula accounts for 92% of the entire composition. The other sugar chains contained therein also have a repeating unit having a structure similar to that of cellulose.

Therefore, as SP of NBKP-0, the SP value of cellulose (literature value) was used.

The SP value of acylated NBKP-0 was calculated as follows.

SP (Y) of acylated cellulose with a DS of X=−(a−b)X/2+a
a: SP value of cellulose (literature value: 15.65 cal/cm)$^{1/2}$)
b: SP of acylated cellulose with a DS of 2=(SP value of cellulose diacylate determined by the Fedors method)× (correction factor)
Correction factor=(SP literature value of cellulose diacetate, i.e., 11.13)/(SP value of cellulose diacetate determined by the Fedors, i.e., 12.41)

(3) Production of Acylated NBKP-0-Nanofibril-Containing Resin (High-Density Polyethylene) Composition A slurry of myristoylated NBKP-0-nanofibrils (containing 15 g of a solid content) was stirred using a Trimix (produced by Inoue Manufacturing, Inc.) under reduced pressure, and dried. After 135 g of a high-density polyethylene (HDPE) resin (SUNTEC HD, produced by Asahi Kasei Corporation) was added (total solids content: 150 g), the resulting mixture was kneaded under the following conditions, and granulated to form a resin composition.

The content of myristoyl NBKP-0-nanofibrils in the resin composition was 10 mass %.

Kneader: TWX-15 produced by Technovel Corporation
    Kneading Conditions: Temperature: 140° C.,
        Discharge: 600 g/H,
        Screw rotation speed: 200 rpm Production of Molded Articles of the Resin Composition The resin composition obtained above was injection-molded under the injection-molding conditions to obtain dumbbell resin molded articles (test specimens for a strength test, thickness: 1 mm).

Injection molding machine: "NP7" produced by Nissei Plastic Industrial Co., Ltd.

Molding conditions: molding temperature: 160° C. mold temperature: 40° C.

Injection rate: 50 cm$^3$

Strength Test

The elastic modulus and tensile strength of the obtained test specimens were measured using an electromechanical universal testing machine (produced by Instron) at a testing rate of 1.5 mm/min (load cell 5 kN).

In the measurement, the support span was 4.5 cm.

Resin compositions containing the other acylated NBKP-0-nanofibrils and test specimens thereof were also prepared, and the elastic modulus and tensile strength of the obtained test specimens were measured in the same manner.

Table 40 shows the measurement results.

TABLE 40

Strength test results of acylated NBKP-0 nanofibril-containing HDPE compositions

| Sample | DS of acylated composition | Elastic modulus (GPa) | Tensile strength (MPa) |
|---|---|---|---|
| HDPE | ... | 0.82 | 23.4 |
| Unmodified NBKP-0 nanofibril-containing HDPE composition | 0 | 1.47 | 34.2 |
| Acetyl NBKP-0 nanofibril-containing HDPE composition | 0.41 | 1.69 | 39.6 |
| Pivaloyl NBKP-0 nanofibril-containing HDPE composition | 0.39 | 2.97 | 51.2 |
| Myristoyl NBKP-0 nanofibril-containing HDPE composition | 0.42 | 2.25 | 50.4 |
| Stearoyl NBKP-0 nanofibril-containing HDPE composition | 0.41 | 1.94 | 48.1 |
| Cyclohexyl carbonyl NBKP-0 nanofibril-containing HDPE composition | 0.42 | 2.46 | 47.2 |
| 4-t-butylcyclohexylcarbonyl NBKP-0 nanofibril-containing HDPE composition | 0.44 | 2.74 | 48.2 |

Relationship Between an Increase in Elastic Modulus of Acylated NBKP-0-Nanofibril and the Ratio of SP of Resin (HPDE) to SP of Acylated NBKP-0-Nanofibrils (HDPE)

Table 41 shows SP values of various types of acylated NBKP-0; the ratio of the SP value of acylated NBKP-0 to the SP value of a resin (HDPE) (indicated as fiber SP/resin SP in the table); (a) increase ratio in elastic modulus (increase ratio in elastic modulus of each acylated NBKP-0 containing composition to HDPE); and (b) increase ratio in elastic modulus of each acylated NBKP-0 containing composition to an unmodified NBKP-0-containing composition.

As shown in Table 41, when acylated NBKP-0 having fiber SP/resin (HDPE) SP ratio in the range of 1.76 to 1.84 was used, the elastic modulus of the HDPE composition containing the acylated NBKP-0 was at least 2 times higher than the elastic modulus of HDPE alone, and at least 1.15 times higher than the elastic modulus of the unmodified NBKP-0-containing HDPE composition.

TABLE 41

Increase in elastic modulus of acylated NBKP-0-containing HDPE compositions

| | | | | Elastic modulus | |
|---|---|---|---|---|---|
| Sample | Acylated DS | Fiber (acylated NBKP-0) SP (cal/cm$^3$)$^{0.5}$ | Ratio of fiber SP to resin SP | Elastic modulus (GPa) | Increase ratio (a) (based on HDPE alone) | Increase ratio (b) (based on unmodified fiber-containing HDPE) |
| HDPE (SP = 8.0) | ... | ... | ... | 0.82 | 1 | ... |
| Unmodified NBKP-0-containing HDPE composition | 0 | 15.7 | 1.96 | 1.47 | 1.79 | 1 |
| Acetyl NBKP-0-containing HDPE composition | 0.41 | 14.7 | 1.84 | 1.69 | 2.06 | 1.15 |
| Pivaloyl NBKP-0-containing HDPE composition | 0.39 | 14.5 | 1.81 | 2.97 | 3.62 | 2.02 |
| Myristoyl NBKP-0-containing HDPE composition | 0.42 | 14.2 | 1.78 | 2.25 | 2.74 | 1.53 |
| Stearoyl NBKP-0-containing HDPE composition | 0.41 | 14.2 | 1.78 | 1.94 | 2.37 | 1.32 |
| Cyclohexylcarbonyl NBKP-0-containing HDPE composition | 0.42 | 14.5 | 1.81 | 2.46 | 3.00 | 1.67 |
| 4-t-Butyl Cyclohexylcarbonyl NBKP-0-containing HDPE composition | 0.44 | 14.1 | 1.76 | 2.74 | 3.34 | 1.86 |

The invention claimed is:

1. A fiber-reinforced resin composition comprising chemically modified lignocellulose nanofibers (A) and a thermoplastic resin (B), wherein the chemically modified lignocellulose nanofibers and the thermoplastic resin satisfy the following conditions:
   (a) the ratio R of the solubility parameter ($SP_{cnf}$) of the chemically modified lignocellulose nanofibers (A) to the solubility parameter ($SP_{pol}$) of the thermoplastic resin (B) ($SP_{cnf}/SP_{pol}$) is in the range of 1.03 to 1.88; and
   (b) the chemically modified lignocellulose nanofibers (A) have a crystallinity of 42.7% to 78.8%;
wherein the solubility parameter ($SP_{cnf}$) is determined by Fedors method.

2. The fiber-reinforced resin composition according to claim 1, wherein the crystallinity of the chemically modified lignocellulose nanofibers in the condition (b) is in the range of 55.6% to 78.8%.

3. The fiber-reinforced resin composition according to claim 1, wherein one or more hydroxyl groups in sugar chains constituting the chemically modified lignocellulose nanofibers (A) are modified with alkanoyl.

4. The fiber-reinforced resin composition according to claim 1, wherein the thermoplastic resin (B) is at least one resin selected from the group consisting of polyamide, polyacetal, polypropylene, maleic anhydride-modified polypropylene, polylactic acid, polyethylene, polystyrene, and ABS resins.

5. The fiber-reinforced resin composition according to claim 1, wherein the thermoplastic resin (B) is at least one resin selected from the group consisting of polyamide, polyacetal, and polylactic acid; the ratio R in the condition (a) is in the range of 1.03 to 1.32; and the crystallinity of the chemically modified lignocellulose nanofibers in the condition (b) is in the range of 55.6% to 78.8%.

6. The fiber-reinforced resin composition according to claim 1, wherein the thermoplastic resin (B) is at least one resin selected from the group consisting of polypropylene, maleic anhydride-modified polypropylene, polyethylene, and polystyrene; and
   the ratio R in the condition (a) is in the range of 1.21 to 1.88.

7. The fiber-reinforced resin composition according to claim 1, wherein one or more hydroxyl groups in sugar chains constituting the chemically modified lignocellulose nanofibers (A) are modified with acetyl.

8. The fiber-reinforced resin composition according to claim 7, wherein the solubility parameter ($SP_{cnf}$) of chemically modified lignocellulose nanofivers (A) is 9.9 to 15, and one or more hydroxyl groups in sugar chains constituting the chemically modified lignocellulose nanofibers (A) are substituted with acetyl at a substitution degree of 0.29 to 2.52.

9. The fiber-reinforced resin composition according to claim 8, wherein the chemically modified lignocellulose nanofibers (A) are present in an amount of 0.1 to 30 parts by mass per 100 parts by mass of the thermoplastic resin (B).

10. The fiber-reinforced resin composition according to claim 8, wherein the thermoplastic resin (B) is at least one resin selected from the group consisting of polyamide resins, polyacetal resins, polypropylene, maleic anhydride-modified polypropylene, polylactic acid, polyethylene, polystyrene, and ABS resins.

* * * * *